United States Patent
Kim et al.

(10) Patent No.: US 7,960,893 B2
(45) Date of Patent: *Jun. 14, 2011

(54) METHOD OF MAKING INTEGRATED STATOR, BRUSHLESS DIRECT-CURRENT MOTOR OF RADIAL CORE TYPE DOUBLE ROTOR STRUCTURE USING THE INTEGRATED STATOR, AND METHOD OF MAKING THE SAME

(75) Inventors: Byoung Kyu Kim, Seoul (KR); Jae Yeong Lee, Gyeonggi-Do (KR); Kyu Hyuk Jeong, Gyeonggi-Do (KR); Jong Hoon Lee, Incheon (KR)

(73) Assignee: Amotech Co., Ltd., Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/706,420

(22) Filed: Feb. 16, 2010

(65) Prior Publication Data

US 2010/0171378 A1 Jul. 8, 2010

Related U.S. Application Data

(62) Division of application No. 11/529,241, filed on Sep. 29, 2006, now Pat. No. 7,687,969.

(30) Foreign Application Priority Data

Apr. 6, 2006 (KR) .................. 10-2006-0031604

(51) Int. Cl.
*H02K 1/12* (2006.01)
*H02K 1/28* (2006.01)

(52) U.S. Cl. ........................ 310/266; 310/180
(58) Field of Classification Search ............ 310/43, 310/179–180, 184, 185, 194, 216.008, 216.057, 310/216.074, 218, 265–266
See application file for complete search history.

(56) References Cited

U.S. PATENT DOCUMENTS

| 5,979,194 | A  | * | 11/1999 | Matsumoto et al. ......... 68/12.04 |
| 6,343,492 | B1 | * | 2/2002  | Seagar et al. .................. 68/142 |
| 6,396,190 | B1 | * | 5/2002  | Ahn et al. ..................... 310/429 |
| 7,687,969 | B2 | * | 3/2010  | Kim et al. ..................... 310/266 |

FOREIGN PATENT DOCUMENTS

| JP | 10201993   | A | * | 8/1998 |
| JP | 2001016835 | A | * | 1/2001 |

* cited by examiner

*Primary Examiner* — Tran N Nguyen
(74) *Attorney, Agent, or Firm* — Rosenberg, Klein & Lee

(57) ABSTRACT

Provided are a radial core type brushless direct-current (BLDC) motor and a method of making the same, having an excellent assembly capability of division type stator cores in a double rotor structure BLDC motor. The BLDC motor includes a rotational shaft, an integrated double rotor including an inner rotor and an outer rotor, and a rotor supporter wherein a trench type space is formed between the inner rotor and the outer rotor, and an end extended from the inner rotor is connected with the outer circumferential surface of a bushing combined with the rotational shaft, and an integrated stator wherein one end of the stator is disposed in the trench type space and an extension axially extended from the other end of the integrated stator is fixed to the housing of the apparatus. In the integrated stator, U, V, W phase coil assemblies are formed of a number of core groups including a number of division type cores, wherein for each phase coil assembly, the division type core groups of the U, V, W phase coil assemblies are alternately disposed in an annular form in sequence of the phases, and the respective division type core groups are integrally formed into a single body in annular form by a stator support.

18 Claims, 39 Drawing Sheets

METHOD OF MAKING INTEGRATED STATOR, BRUSHLESS DIRECT-CURRENT MOTOR OF RADIAL CORE TYPE DOUBLE ROTOR STRUCTURE USING THE INTEGRATED STATOR, AND METHOD OF MAKING THE SAME

REFERENCE TO RELATED APPLICATION

This patent application is being filed as a Divisional patent application of Ser. No. 11/529,241, filed 29 Sep. 2006, currently pending.

BACKGROUND OF THE INVENTION

1. Field of the Invention

The present invention relates to a method of making an integrated stator, a radial core type brushless direct-current (BLDC) motor using the integrated stator, and a method of making the radial core type brushless direct-current (BLDC) motor, and more particularly, to a brushless direct-current (BLDC) motor having a radial core type double rotor structure which can greatly enhance productivity of assembling a stator in which coils are sequentially wound on a plurality of division type stator cores in a continuous winding method, and a plurality of interconnected stator core assemblies are automatically located and set using positioning grooves which are formed in a mold itself to then be injection-molded at an insert molding mode.

2. Description of the Related Art

BLDC motors are classified into a core type (or radial type), which has a generally cup-shaped (or cylindrical) structure, and a coreless type (or axial type), according to whether or not a stator core exists.

BLDC motors of a core type structure are classified into an internal magnet type including a cylindrical stator where coils are wound on a number of protrusions formed on the inner circumferential portion thereof in order to form an electronic magnet structure, and a rotor formed of a cylindrical permanent magnet, and an external magnet type including a stator where coils are wound up and down on a number of protrusions formed on the outer circumferential portion thereof, and a rotor formed of a cylindrical permanent magnet on the outer portion of which multiple poles are magnetized.

In a conventional external magnet type BLDC motor, a main path of a magnetic flux is a magnetic circuit which forms a closed circuit starting from a permanent magnet of a rotor and proceeding again toward the permanent magnet and a yoke via a gap and the stator core of a stator.

In a conventional internal magnet type BLDC motor, a plurality of T-shaped core portions on a stator core around which coils are wound, protrude inwards. Also, the inner longitudinal sections of the respective core portions form a circle of a predetermined diameter to thereby make the core portions form a cylinder. Also, a rotor having a cylindrical permanent magnet including a rotational shaft, or a ring-shaped permanent magnet attached to a cylindrical yoke including a central rotational shaft, is mounted in the inner portion of the cylinder surrounded by the core portions. The internal magnet type BLDC motor rotates in the same manner as that of the external magnet type BLDC motor.

The magnetic circuit in the above-described core type BLDC motor has a symmetrical structure in the radial direction around the rotational shaft. Accordingly, the core type BLDC motor has less axial vibrational noise, and is appropriate for low-speed rotation. Also, since a portion occupied by a gap with respect to the direction of the magnetic path is extremely small, a high magnetic flux density can be obtained even if a low performance magnet is used or the quantity of magnet to be used is reduced. As a result, a big torque and a high efficiency can be obtained.

However, such a core, that is, a yoke structure causes big loss of a yoke material when fabricating a stator. In addition, a special-purpose expensive dedicated winding machine should be used for winding coils around the yoke during mass-production, because the yoke structure is complicated. Also, since a mold for fabricating a stator is expensive, initial investment costs become high.

In the core type AC or BLDC motor, especially, in the core motor of the radial type, it is very important factor for determining a competitive power of motors, to make the stator core configured into a complete division type, since coils can be wound on division type cores with a high efficiency using a general purpose winding machine which is cheaper than a special-purpose expensive dedicated winding machine. On the contrary, since a low efficient winding is made using the expansive dedicated winding machine, in the case of an integrated stator core structure, a manufacturing cost for the motors becomes high.

In order to employ the advantages of the axial double rotor type and the radial core type and improve the disadvantages thereof, a radial core type double rotor structure BLDC motor has been proposed in Korean Patent No. 432954 to the same applicant.

In the Korean Patent No. 432954, rotors including respective permanent magnets are disposed in both the inner and outer sides of a stator core to thereby form flow of a magnetic path by the permanent magnets and the rotor yoke. It is thus possible to divide the stator core completely into a plurality of stator core portions. Accordingly, productivity of the stator core and power of the motor can be greatly heightened through an individual coil winding process.

Moreover, in the Korean Patent No. 432954, a plurality of division type core assemblies around which coils have been wound are prepared, and then the plurality of division type core assemblies around which coils have been wound are arranged and fixed on a printed circuit board (PCB). Then, the coils are connected and thereafter the plurality of division type core assemblies around which coils have been wound are molded in an annular form using an insert molding process using a thermosetting resin, to thus prepare an integrated stator.

However, when a plurality of individual cores are integrally assembled to thereby mutually connect coils, in the Korean Patent No. 432954, an assembling structure and method of the stator which can be effectively assembled have not been presented.

As described above, the coil winding of the individual division core is more greatly excellent in its productivity than that of the case of using the integrated (that is, single) core when implementing the stator core into a plurality of division type cores. However, there is a structural problem of lowering a productivity and durability thereof when the plurality of division type cores are assembled.

Taking such points into consideration, Korean Patent No. 545848 discloses a structure of enhancing an assembly productivity of a stator, including an annular core support plate which a plurality of stator core assemblies around a bobbin of which coils are wound are accommodated in and supported to at a regular interval, and a plurality of coils are wired by electric phases, and an automatic positioning/supporting unit for automatically positioning and supporting the plurality of stator core assemblies in and to the core support plate.

In the Korean Patent No. 545848, a plurality of division type core assemblies which are obtained by winding coils around each division type core are assembled in the core support plate, and the respective core assemblies are electrically interconnected in the core support plate. In this case, since the wound coils should be connected to connection pins and the connection pins should be coupled to conductive lines formed in the core support plate in the bobbin of each division type core, an assembly productivity is lowered.

Therefore, preferably, it is required to integrate a plurality of stator cores in which coils are wound with an insert molding process using a thermosetting resin without using the annular core support plate as described above.

In the meantime, a general large-sized motor has a structure in which a plurality of stator poles and a plurality of rotor poles are combined with each other. In the case of a division core type, a continuous winding which is made on a number of groups of cores composed of a plurality of division type cores is more preferable than an individual winding/assembly which is made on a plurality of division type cores in view of an assembly productivity.

However, the known general purpose winding machine has a structure of winding coils as a single bobbin is mounted in a single spindle to then make the spindle rotate. Accordingly, continuous windings cannot be made on a number of groups of cores composed of a plurality of division type cores, or a plurality of division type cores.

In the meantime, a stator core is generally made by molding a plurality of silicon steel plates of 0.35-0.5 mm thick in a predetermined shape, and laminating the molded results. In the case of an integrated core type, a magnetic flux density is not uniform at the air gap due to the influences of slots for winding coils to thereby generate a cogging torque phenomenon and a torque ripple phenomenon for which the torque is not regular. In order to reduce the cogging torque and the torque ripple, a number of slots should be formed in the stator cores, or auxiliary salient poles or auxiliary slots should be formed in the stator core. Otherwise, the stator core employs a skew structure.

However, the integrated stator core employing the skew structure has the problem that its coil winding is more difficult than that of the stator core which does not adopt the skew structure. When a skew is given to a core in the division type stator core structure so that the division type core itself is divided to form a structure of a motor, that is, a stator, it is impossible to perform coupling between the cores.

In the meantime, in the case of the motor disclosed in the Korean Patent No. 545848, a plurality of cooling holes for cooling the coils of the stator inserted between the rotor supporters are formed in the rotor supporters. The rotor supporters and bushings are connected therebetween with a plurality of radially extending ribs.

However, a plurality of radially extending ribs connecting between the rotor supporters and the bushings do not have enough support strength and thus there is a need to reinforce the plurality of radial ribs. The plurality of simple cooling holes for cooling the coils of the stator formed in the rotor supporters do not induce an effective flow of the air.

SUMMARY OF THE INVENTION

To solve the above problems, it is an object of the present invention to provide a method of making an integrated stator having an excellent assembly productivity, a brushless direct-current (BLDC) motor of a radial core type double rotor structure using the integrated stator, and a method of manufacturing the brushless direct-current (BLDC) motor, in which a plurality of interconnected stator cores are automatically positioned using a positioning structure which is formed in a mold itself to then be injection-molded using a thermosetting resin.

It is another object of the present invention to provide a brushless direct-current (BLDC) motor and a method of manufacturing the same, which minimizes inconveniences caused when a number of division type stator cores are located and set in a mold without having a separate positioning component, in which a number of division type stator cores corresponding to respective phases are sequentially wound with a single coil and interconnected with one another, using a sequential winding method, and simultaneously mutual link connection is achieved by an unevenness structure between adjoining division type core bobbins when a number of division type core bobbins around which coil is wound are temporarily assembled in the mold for an insert molding process.

It is still another object of the present invention to provide a brushless direct-current (BLDC) motor having a skew core structure stator in which a coil winding process is easy since a division type core structure is employed even though the skew core structure has been employed, and each skew core can be integrally molded in an insert molding process using a thermosetting resin so as to be easily assembled, thereby reducing a cogging torque and noise/vibration.

It is yet another object of the present invention to provide a brushless direct-current (BLDC) motor having an integrated double rotor structure which can enhance a cooling performance, in which a cooling hole is formed to have a cross-sectional area as wide as possible, vertically to the circumferential direction of a rotor supporter and a rib which connect inner and outer rotors and bushings, and a change in the size of the cooling hole is alternately given by design, to thereby reinforce a support strength of the rotor supporter and rib and simultaneously generate a turbulent flow and induce a flow of cooled air into a magnetic gap, that is, an air gap between the upper space of the stator and the inner and outer rotor and stator.

It is yet still another object of the present invention to provide a brushless direct-current (BLDC) motor having a stator structure capable of enhancing a cooling performance, in which a support is formed using a thermosetting resin along a semi-circular curve of a coil wound on a bobbin when a stator is integrally molded via an insert molding method using the thermosetting resin to thereby increase a contact area contacting air and simultaneously generate a turbulent flow during rotation of a rotor.

It is a further object of the present invention to provide a brushless direct-current (BLDC) motor having a stator structure capable of enhancing a cooling performance, in which a number of grooves including a number of bolt fitting holes and bolt positioning holes and a number of radial ribs are included in an extension for fixing a stator, to thereby maintain a support intensity, reduce a material cost, seek lightweight, and generate a turbulent flow together with cooling blades of an inner rotor during rotation of the rotor.

It is a still further object of the present invention to provide a brushless direct-current (BLDC) motor having a depression type rotor structure in which an axial coupler of a rotor combined with a rotating axis is disposed at the center of gravity of the inner side of the rotor, to thereby suppress vibration from occurring during rotation of the rotor to the minimum, simultaneously to shorten an axial length of a motor to the minimum, and effectively heighten a cooling efficiency of a stator and the rotor.

It is a yet further object of the present invention to provide a brushless direct-current (BLDC) motor having a stator structure in which a number of annular ribs are formed on the upper surface of a stator when the stator is injection-molded using a thermosetting resin, to thereby prevent a crack which can occur during the injection molding from being propagated.

It is a still yet further object of the present invention to provide a brushless direct-current (BLDC) motor of a radial core type for a washing machine in which a double rotor and a stator are integrally molded by an insert molding method using a thermosetting resin, respectively, to thereby heighten durability, reliability and waterproof capability.

It is another further object of the present invention to provide a brushless direct-current (BLDC) motor of a radial core type having an excellent safety from fire risk since a thermosetting resin enclosing a double rotor and a stator is a heat-resistant material.

To accomplish the above object of the present invention, according to an aspect of the present invention, there is provided a brushless direct-current (BLDC) motor having a radial core type double rotor structure using a three-phase driving mode, the BLDC motor comprising: a rotational shaft which is rotatably mounted in a housing of an apparatus; an integrated double rotor including an inner rotor and an outer rotor in which a plurality of N-pole and S-pole magnets are disposed alternately in annular form on different concentric circumferences in each rotor, and opposing magnets with a predetermined distance between the inner and outer rotors are disposed to have opposite polarities, and a rotor supporter which is molded using a thermosetting resin, so that the respective inner and outer rotors are annularly integrated except for the opposing magnet surfaces of the inner and outer rotors, a trench type space is formed between the inner rotor and the outer rotor, and an end extended from the inner rotor to the central portion is connected with the outer circumferential surface of a bushing combined with the rotational shaft; and an integrated stator wherein U, V, W phase coil assemblies formed of a number of core groups including a number of independent division type cores on the outer portion of which bobbins are respectively formed, wherein for each phase coil assembly, coils are sequentially wound around each division type core so that short jump wires are connected between the division type cores in each division type core group, and long jump wires are connected between the division type core groups, wherein the division type core groups of the U, V, W phase coil assemblies are alternately disposed in an annular form in sequence of the phases, wherein the respective division type core groups are integrally formed into a single body in annular form by a stator support except for the inner and outer side surfaces of the division type cores via an insert molding method using a thermosetting resin, and wherein one end of the integrated stator is disposed in the trench type space between the inner and outer rotors and an extension axially extended from the other end of the integrated stator is fixed to the housing of the apparatus.

Preferably, the rotor supporter comprises: a number of large-size holes and small-size holes which are alternately disposed in order to guide external air to a trench type space opposing an end of the stator between the inner and outer rotors in the inner side direction the inner rotor and in a magnetic gap direction between the inner and outer rotors and the stator, and a number of radial ribs which are disposed as axial couplers surrounding the outer circumferential surface of the bushing from the inner rotor to the central portion thereof.

Preferably, a number of grooves are periodically formed at portions where an annular molding support supporting the inner rotor among the rotor supporters, meets a number of the large-size holes along the circumferential direction.

Further, when the axial coupler is disposed in the center of gravity of the double rotor, vibration during rotation of the rotor can be minimized.

Further, the rotor in the motor is integrally formed with the rotor supporter at the lower portion of the inner rotor and/or outer rotor, and further comprises a number of cooling blades having any one of: a linear fan which is congruent with the axial direction for producing wind during rotation of the rotor; a Sirocco fan having circular grooves along the rotational direction of the rotor; a turbo fan in which grooves are formed in the opposite direction to the rotational direction of thereto; and a slanted fan which is slanted with respect to the axial direction.

Further, when a number of the division type cores are skewed within one pitch range which is defined as 360°/slot number, a cogging torque can be reduced.

Preferably, the motor is made of a 24-pole-27-core structure, wherein the stator is configured that U, V, W phase coil assemblies formed of three core groups including three division type cores on the outer portion of which bobbins are respectively formed, and wherein for each phase coil assembly, the division type core groups of the U, V, W phase coil assemblies are alternately disposed in an annular form in sequence of the phases.

Here, when the motor is applied to a washing machine, the rotational shaft is connected with a drum or a tub rotatable about its longitudinal axis for holding clothes to be washed in a washing machine.

According to another aspect of the present invention, there is provided a brushless direct-current (BLDC) motor having a radial core type double rotor structure using a three-phase driving mode, the BLDC motor comprising: an integrated double rotor including an inner rotor and an outer rotor in which N-pole and S-pole magnets of twenty-four poles are disposed alternately in an annular form on different concentric circumferences in each rotor, and opposing magnets with a predetermined distance between the inner and outer rotors are disposed to have opposite polarities, and a rotor supporter which is molded using a thermosetting resin, so that the respective inner and outer rotors are annularly integrated except for the opposing magnet surfaces of the inner and outer rotors, and a trench type space is formed between the inner rotor and the outer rotor, so that the rotor supporter is extended from the inner rotor to an axial coupler surrounding a bushing; a rotational shaft whose one end is coupled with the bushing and other end is rotatably mounted in a housing of an apparatus; and an integrated stator wherein U, V, W phase coil assemblies formed of three core groups including three independent division type cores on the outer portion of which bobbins are respectively formed, wherein for each phase coil assembly, the division type core groups of the U, V, W phase coil assemblies are alternately disposed in an annular form in sequence of the phases, wherein the respective division type core groups are integrally formed into a single body in annular form by a stator support except for the inner and outer side surfaces of the division type cores via an insert molding method using a thermosetting resin, wherein one end of the integrated stator is disposed in a trench type space between the inner and outer rotors, and wherein nine division type cores respectively included in the U, V, W phase coil assemblies are mutually connected by the sequentially wound coils.

According to still another aspect of the present invention, there is provided a double rotor type motor for use in a washing machine, the double rotor type motor comprising: an integrated double rotor including an inner rotor and an outer rotor in which a plurality of N-pole and S-pole magnets are disposed alternately in annular form on different concentric circumferences in each rotor, and opposing magnets with a predetermined distance between the inner and outer rotors are disposed to have opposite polarities, and a rotor supporter which is molded using a thermosetting resin, so that the respective inner and outer rotors are annularly integrated except for the opposing magnet surfaces of the inner and outer rotors, a trench type space is formed between the inner rotor and the outer rotor, so that the rotor supporter is extended from the inner rotor to an axial coupler surrounding a bushing; a rotational shaft one end of which is coupled with the bushing and two points of the other end of which are rotatably mounted in a housing of the washing machine; and an integrated stator wherein for each phase, coils are sequentially wound around each division type core in a sequential winding method, wherein the respective division type cores are integrally formed into a single body in an annular form by a stator support except for the inner and outer side surfaces of the division type cores via an insert molding method using a thermosetting resin, wherein one end of the integrated stator is disposed in the trench type space between the inner and outer rotors and an extension axially extended from the other end of the integrated stator is fixed to the housing of the washing machine, and wherein said axial coupler is disposed in a center of gravity of the double rotor.

According to yet another aspect of the present invention, there is provided a method of manufacturing a brushless direct-current (BLDC) motor having a radial core type double rotor structure using a three-phase driving mode, the BLDC motor manufacturing method comprising the steps of: integrally molding a number of division type core of an I-shape by an inset molding using a thermosetting resin to obtain a number of division type core bobbins around which coils are wound, respectively and which include first and second flanges at both ends thereof, and first and second coupling protrusions which are located in the lower portions of the first and second flanges; preparing three sets of coil assemblies corresponding to respective U, V, W phases including a number of the division type core bobbins in which coils are sequentially continuously wound between the first and second flanges of the respective division type core bobbins; temporarily assembling the first and second coupling protrusions of the respective division type core bobbins included in the three sets of the coil assemblies in a mold where a number of pairs of positioning grooves are formed in opposition to inner and outer walls of annular grooves; preparing an integrated stator by forming the coil assemblies in an annular form by an insert molding method using a thermosetting resin, except for the inner and outer side surfaces of each division type core; and assembling the integrated stator so as to be positioned between the double rotors in which an inner rotor and an outer rotor are aligned in a radial type.

Preferably, the motor is made of a 24-pole-27-core structure, and wherein the three-set coil assemblies preparation step comprises the sub-steps of: inserting eight division type core connection jigs between the nine division type core bobbins and assembling three core/jig assemblies formed by connecting the nine division type core bobbins in series; sequentially winding coils around each division type core bobbin in the three core/jig assemblies so that short jump wires are connected between the division type core bobbins in each division type core group and long jump wires are connected between the division type core groups, for the three division type core groups including the three division type core bobbins which are adjacent to each other; and separating the division type core connection jigs from the coil-wound core/jig assemblies and thus preparing three sets of coil assemblies corresponding to the respective U, V, W phases.

Here, the step of temporarily assembling a number of the division type core bobbins included in the three sets of coil assemblies in the mold, comprises the sub-steps of: disposing the division type core group of each phase in the mold where twenty-seven pairs of positioning fixing grooves are formed in sequence of the phases so as to then be temporarily assembled, for the three division type core groups including the three division type core bobbins which are adjacent to each other.

Here, the motor has a double rotor/single stator structure, and when the stator core is formed of a division type structure, the interval between the adjacent division type cores is set wider than the magnetic gap between the inner and outer rotors and the stator.

As described above, the present invention employs a double rotor structure in a radial core type BLDC motor, in which a number of division type core assemblies are automatically positioned and fixed, using a positioning structure formed in a mold itself when a stator core is perfectly divided into divided cores, and then is injection-molded by an insert molding method using a thermosetting resin, to thereby assemble a number of divided cores without using a separate core support plate and thus greatly enhance an assembly productivity.

In addition, in the double rotor structure of the present invention, a cooling hole is formed to have a cross-sectional area as wide as possible, vertically to the circumferential direction of a rotor supporter and a rib which connect inner and outer rotors and bushings, and a change in the size of the cooling hole is alternately given by design, to thereby reinforce a support strength of the rotor supporter and rib and simultaneously generate a large amount of wind and a turbulent flow and induce a flow of cooled air into a magnetic gap between the upper space of the stator and the inner and outer rotor and stator. Accordingly, heat generated from the rotor and the stator can be effectively cooled.

Further, in a stator structure according to the present invention, a support is formed using a resin along a semi-circular curve of a coil wound on a bobbin when a stator is integrally molded via an insert molding method using a thermosetting resin to thereby increase a contact area contacting air and simultaneously generate a turbulent flow during rotation of a rotor, to thereby be capable of enhancing a cooling performance.

Further, in a stator structure according to the present invention, a number of throughholes including a number of bolt fitting holes and bolt positioning holes and a number of radial ribs are included in a bearing housing, to thereby maintain a support intensity, reduce a material cost, seek lightweight, and generate a turbulent flow together with cooling blades of an inner rotor during rotation of the rotor, and to thus be capable of enhancing a cooling performance.

BRIEF DESCRIPTION OF THE DRAWINGS

The above and other objects and advantages of the present invention will become more apparent by describing the preferred embodiments thereof in more detail with reference to the accompanying drawings in which.

DETAILED DESCRIPTION OF THE INVENTION

Preferred embodiments of the present invention will be described in detail with reference to the accompanying drawings.

I. First Embodiment

A. Overall Structure of Motor

Figure 1A:
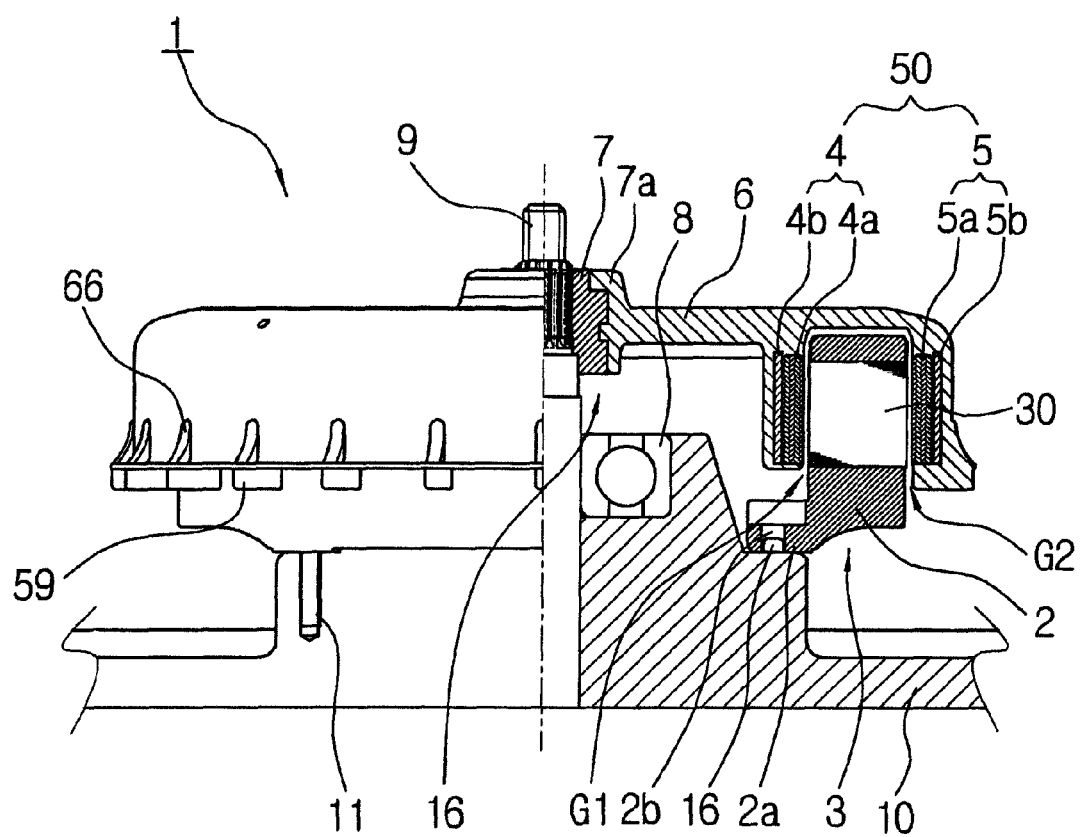
FIG. 1A is a partially cut-out cross-sectional view cut along the axial direction of a brushless direct-current (BLDC) motor of a radial core type having a structure of double rotors according to a first embodiment of the present invention.
Figure 1B:
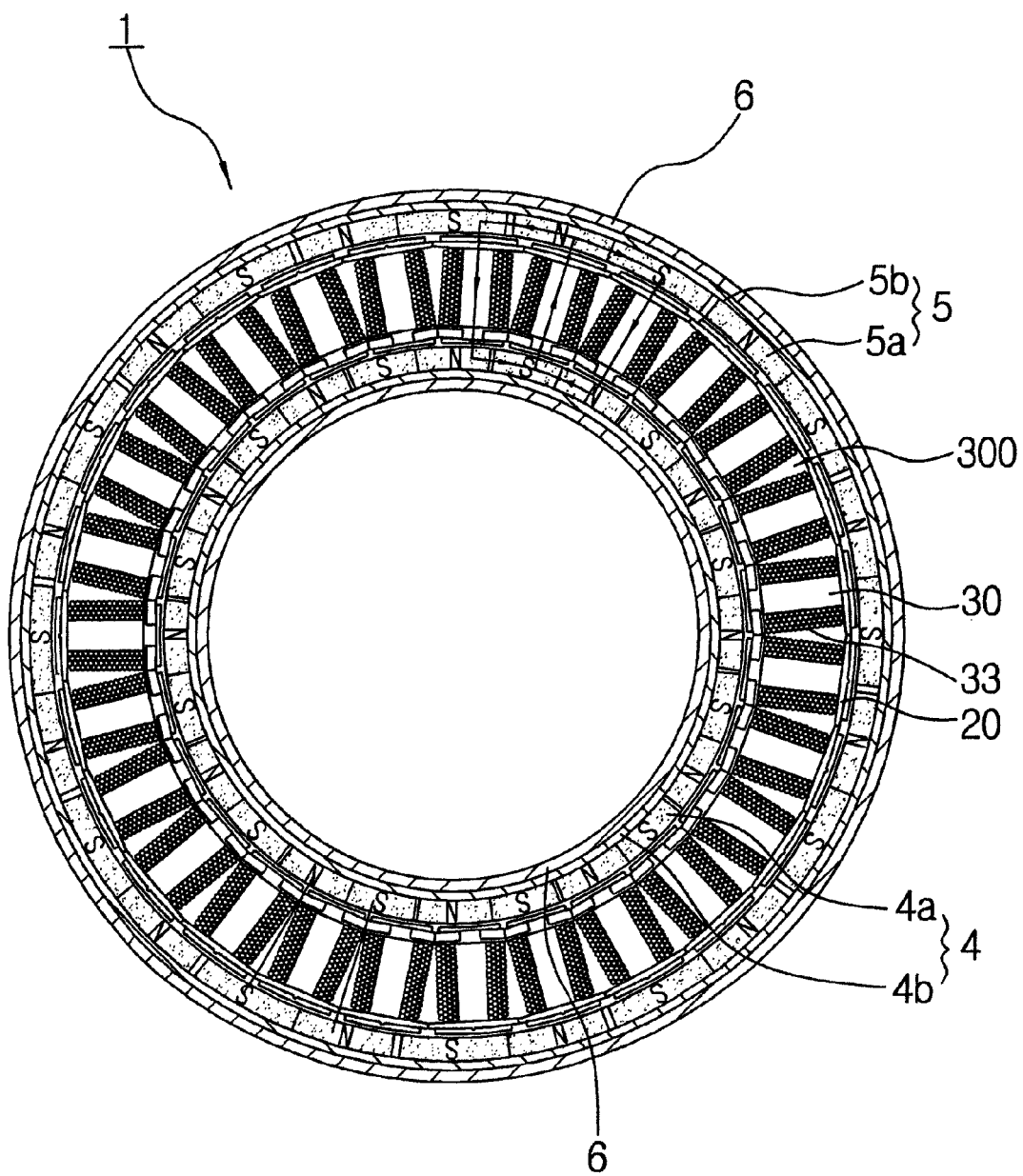
FIG. 1B is a cross-sectional view cut along the circumferential direction of the brushless direct-current (BLDC) motor of a radial core type having a structure of double rotors according to the first embodiment of the present invention, in order to illustrate a magnetic circuit.
Figure 1C:
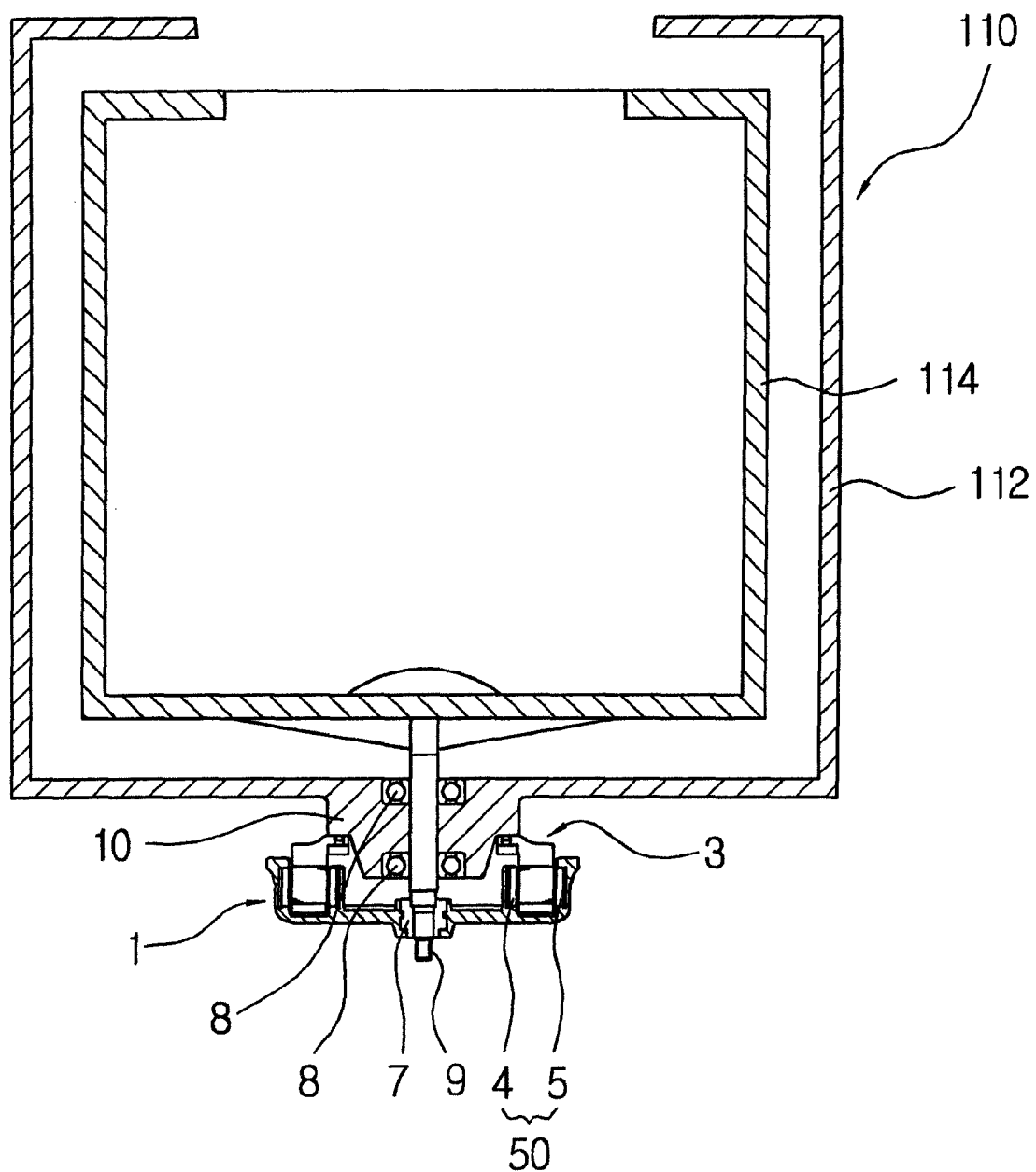
FIG. 1C is a cross-sectional view of washing machine using the brushless direct-current (BLDC) motor according to the first embodiment of the present invention.

FIG. 1A is a partially cut-out cross-sectional view cut along the axial direction of a brushless direct-current (BLDC) motor of a radial core type having a structure of double rotors according to a first embodiment of the present invention, FIG. 1B is a cross-sectional view cut along the circumferential direction of the brushless direct-current (BLDC) motor of a radial core type having a structure of double rotors according to the first embodiment of the present invention, in order to illustrate a magnetic circuit, and FIG. 1C is a cross-sectional view of washing machine using the brushless direct-current (BLDC) motor according to the first embodiment of the present invention.

In the embodiment shown in FIGS. 1A and 1C, a brushless direct-current (BLDC) motor 1 of a radial core type having a structure of double rotors is installed in especially, the lower portion, i.e., housing 10 of an outer tub 112 in a washing machine 110 and has a proper structure of making a perforated tub 114 of the washing machine 110 rotate in a forward/reverse direction. The perforated tub 114 is disposed inside outer tub 112 to hold clothes to be washed and is connected to a rotational shaft 9 of the BLDC motor 1. The perforated tub 114 may include an agitator or a pulsator. More particularly, the perforated tub 114 spins around its longitudinal axis during the spin-cycle of the washing machine 110 to remove water from the interior of the tub. However, the present invention is not limited thereto. For example, the BLDC motor is installed at the back side of a washing machine and has a proper structure of making a washing drum of the washing machine rotate in a forward/reverse direction. In addition, the BLDC motor can be applied to the other instruments other than the washing machine.

The BLDC motor 1 of the radial core type double rotor structure according to the first embodiment of the present invention includes a stator 3 in which a plurality of division cores 30 are integrally formed by an annular stator supporter 2 which is manufactured by an insert molding method using a thermosetting resin after coils have been wound around the outer circumference of bobbins (not shown), an inner rotor 4 which has predetermined magnetic gaps G1 and G2 on the inner and outer circumferential portions of the stator 3 in which a plurality of magnets 4a and ring-shaped inner yokes 4b are disposed in an annular form, an outer rotor 5 in which a plurality of magnets 5a and ring-shaped outer yokes 5b are disposed, and a rotational shaft 9 whose one end is connected to the central portion of a rotor support frame 6 through an involute serration bushing 7 and whose other end is rotatably supported through a pair of bearings 8 in the housing 10.

Figure 2A:
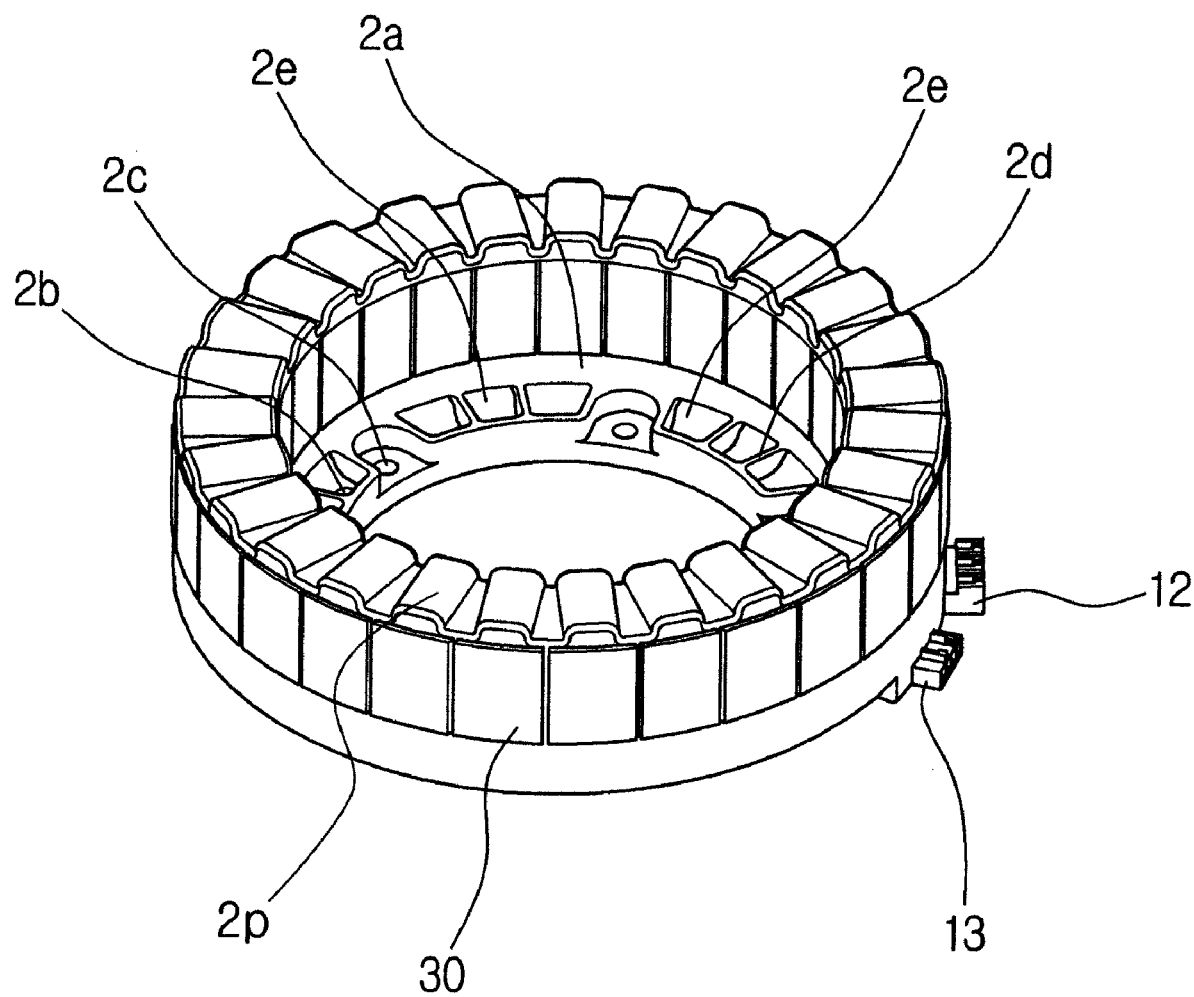
FIGS. 2A through 2C are a perspective view, a plan view, and a rear view of a stator which is used in the present invention, respectively.
Figure 2B:
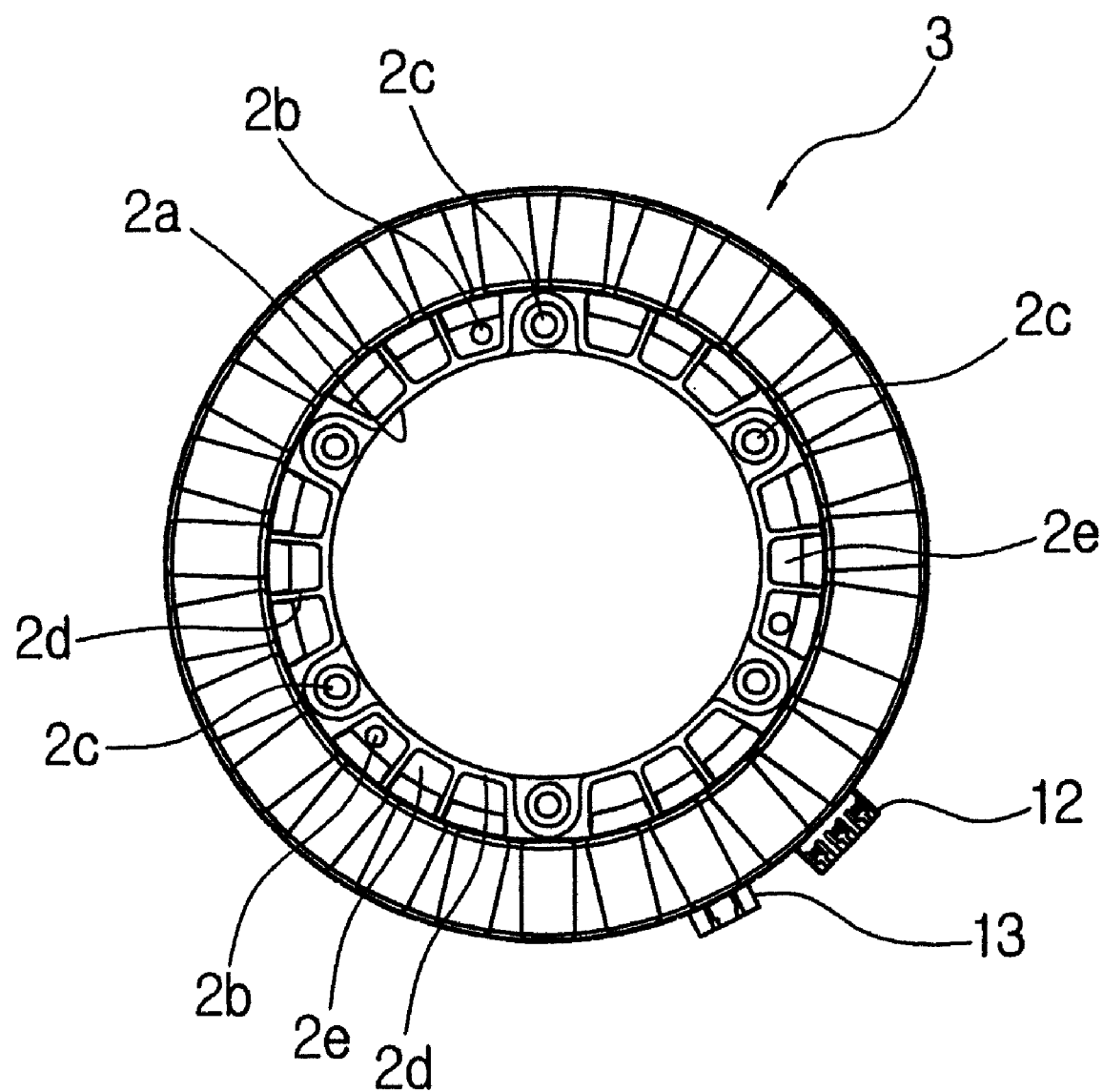
Figure 2C:
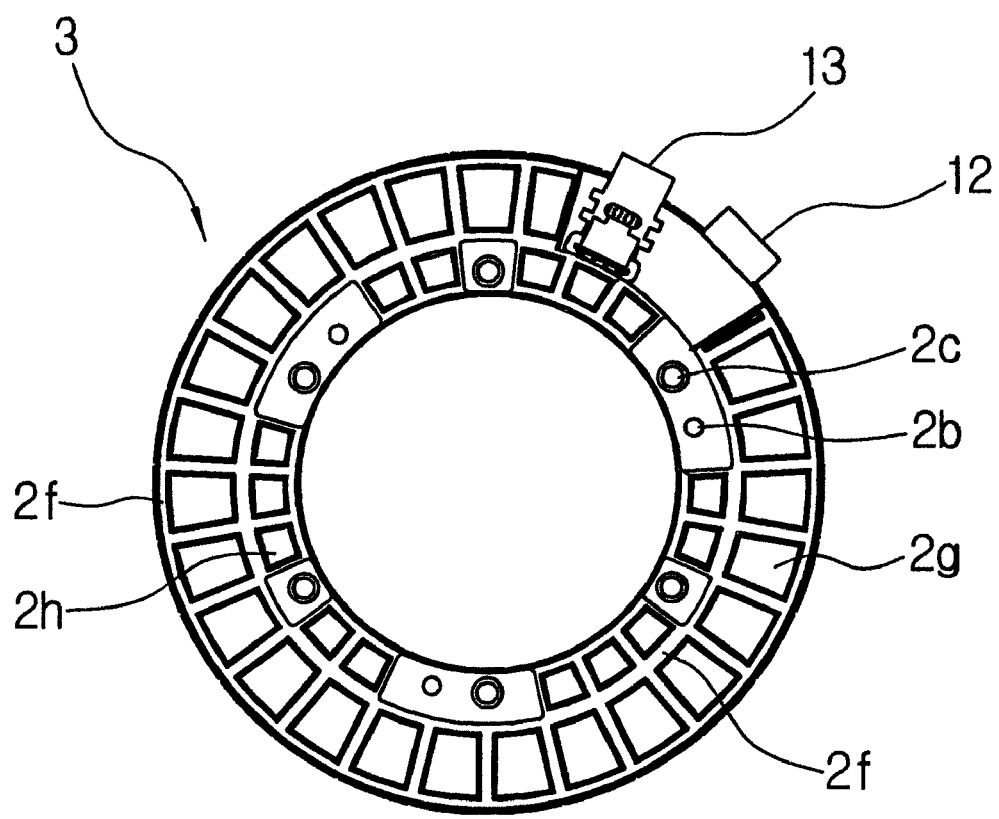

In the stator 3, a plurality of the division cores 30 which have been completely divided are integrally molded by an annular stator supporter 2 in an annular form. The stator supporter 2 includes an extension 2a extended toward the inner side thereof as shown in FIGS. 2A to 2C. The stator supporter 2 is supported by an anchoring bolt 11 in for example, the housing 10 of a washing machine 110. In this case, the bearings 8 are installed at the housing 10, for example, the outer tub 112 of a pulsator type washing machine and rotatably supports a double rotor 50 combined in the rotational shaft 9 through the bushing 7. In this case, the rotational shaft 9 is rotatably supported in the outer tub 112 of the washing machine 110, and is extended in order to operate the perforated tub (or washing tub) on the floor of which a pulsator is installed and which accommodates a laundry, or is extended in order to operate the drum of a drum-type washing machine, or the agitator of an agitator-type washing machine.

Therefore, the BLDC motor 1 forms the radial core type motor including the double rotor 50 in which the inner rotor 4 and the outer rotor 5 are supported by the rotor support frame 6, and the single stator 3.

B. Structure of Stator and Manufacturing Process

Figure 3A:
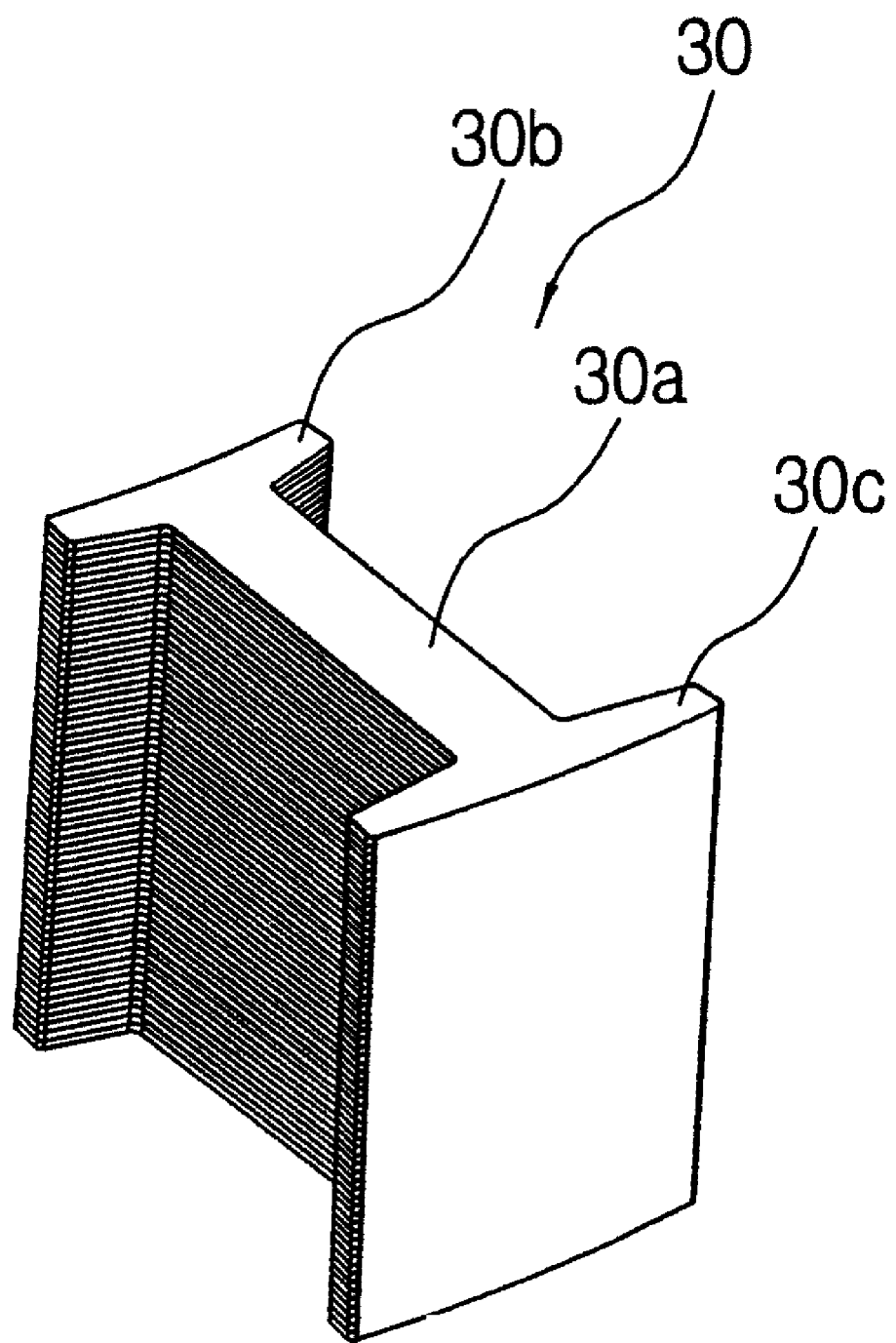
FIG. 3A is a perspective view of a division type core according to the present invention.
Figure 3B:
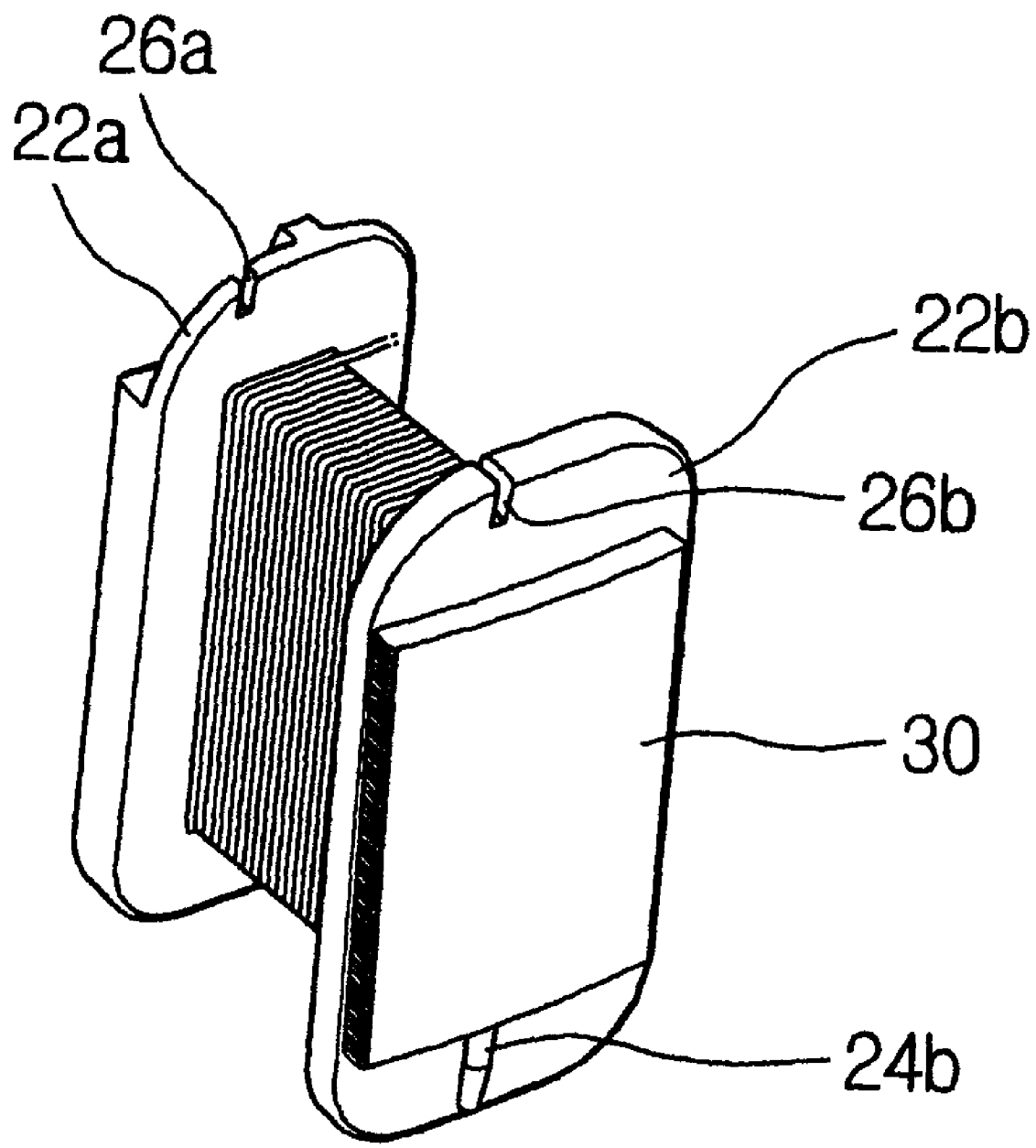
FIGS. 3B and 3C are a perspective view of one side and the other side of a divided core in which a bobbin is combined according to the present invention, respectively.
Figure 3C:
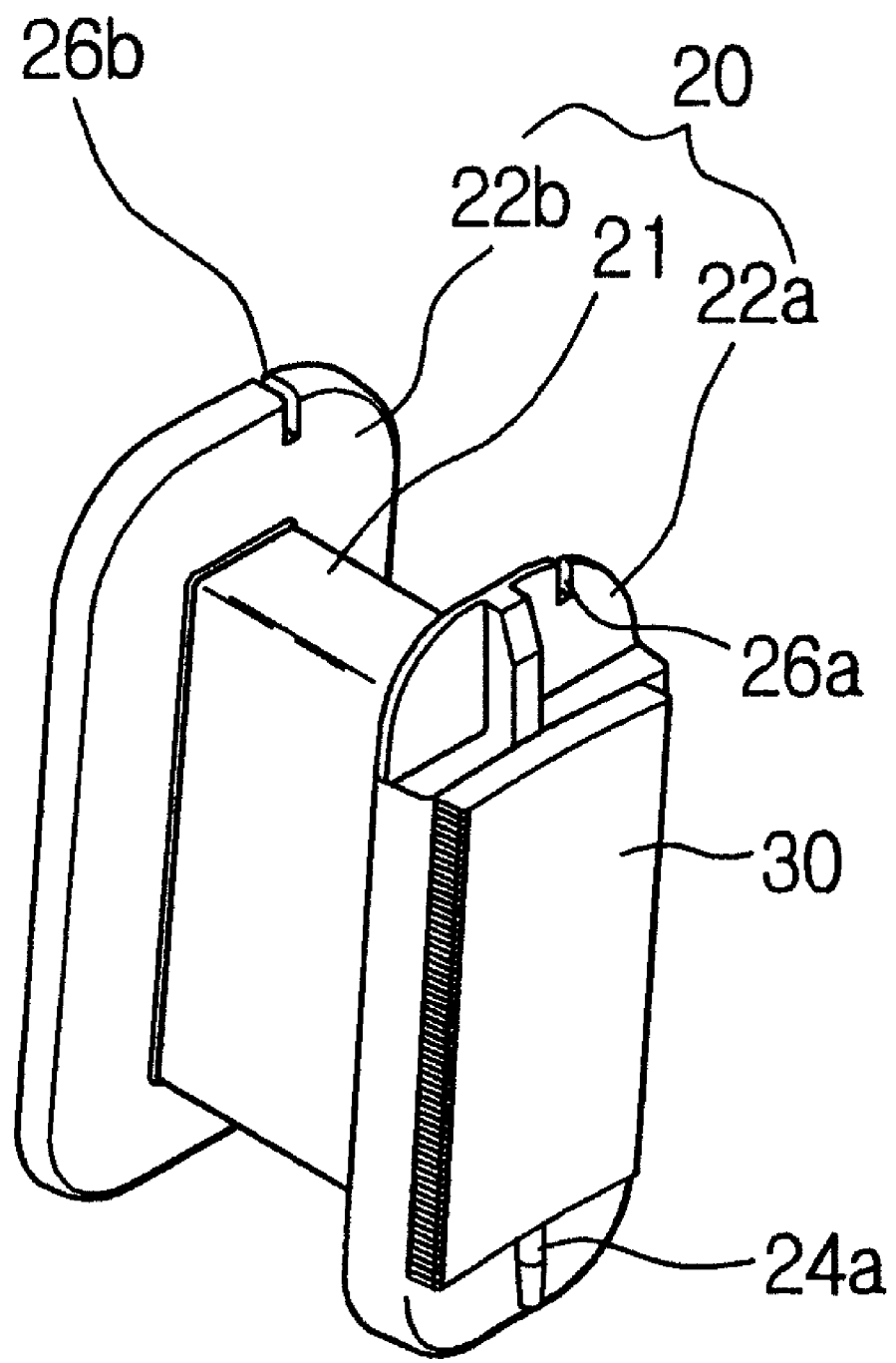

FIGS. 2A through 2C are a perspective view, a plan view, and a rear view of a stator which is used in the present invention, respectively. FIG. 3A is a perspective view of a division type core according to the present invention. FIGS. 3B and 3C are a perspective view of one side and the other side of a division type core in which a bobbin is combined according to the present invention, respectively.

Figure 5A:
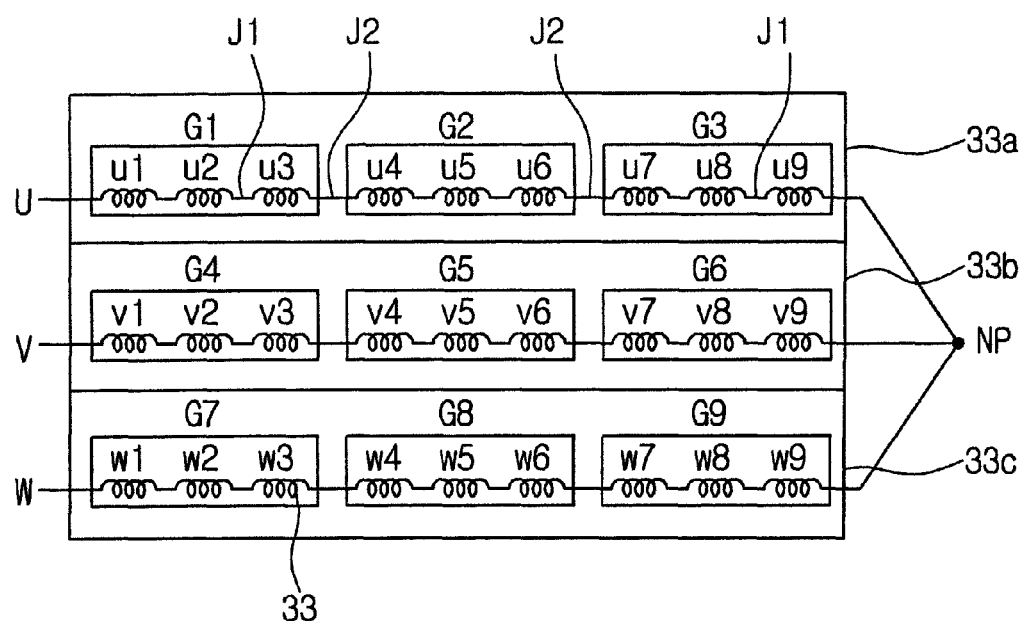
FIG. 5A is a circuit diagram of a three-phase driving mode stator coil of a 24-pole-27-core motor in which the present invention is applied.
Figure 5B:
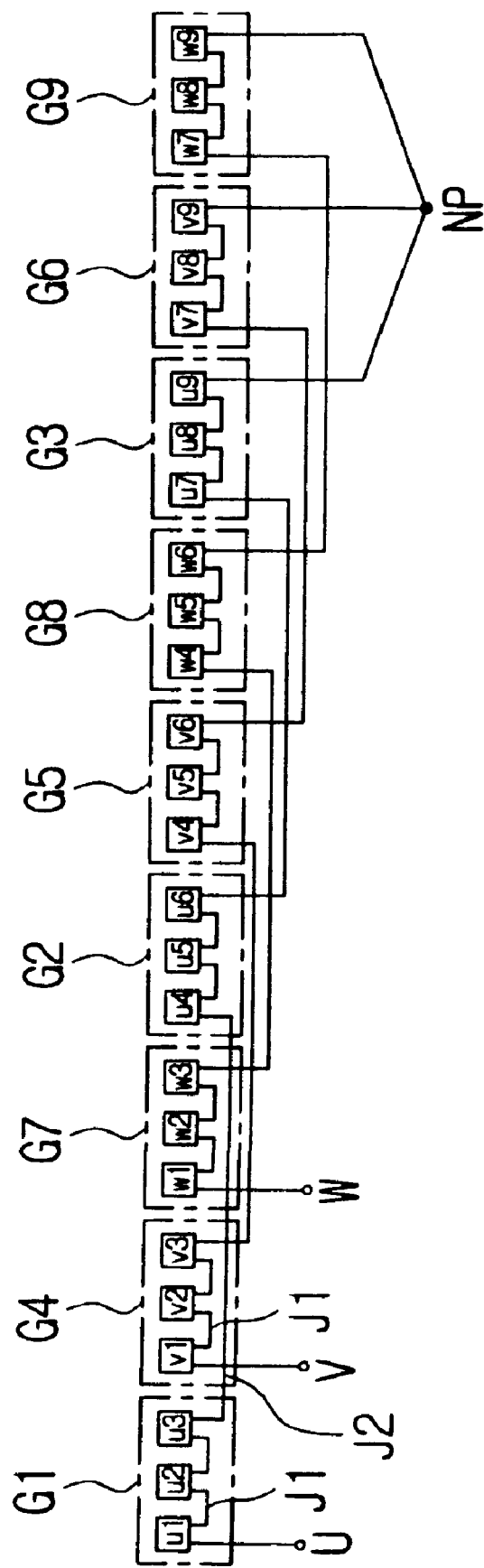
FIG. 5B is a circuit diagram for explaining an arrangement sequence at the time of assembling a stator core of FIG. 5A.

Moreover, FIG. 5A is a circuit diagram of a three-phase driving mode stator coil of a 24-pole-27-core motor in which the present invention is applied, and FIG. 5B is a circuit diagram for explaining an arrangement sequence at the time of assembling a division type core around which stator coils are wound of FIG. 5A.

The BLCD motor of the present invention can be implemented into for example, a 24-pole-27-core structure in the case of being applied to a large capacity washing machine. In this case, the inner rotor 4 and the outer rotor 5 are adhered to the outer side surface and the inner side surface of the annular inner and outer yokes 4b and 5b formed of 24-pole magnets 4a and 5a, respectively. The integrated stator 3 including twenty-seven division cores 30 (FIG. 3A) is inserted into the annular space between the double rotors.

Hereinbelow, the manufacturing process of the integrated stator 3 including the twenty-seven division cores 30 will be illustrated schematically first and then will be described in detail for each specific process.

First, twenty-seven division cores 30 (FIG. 3A) are molded at the outer side surface by an insert molding mode using a thermosetting resin, to thus form an insulation bobbin 20, as shown in FIGS. 3B and 3C. In this state, coils 33 are wound around the outer circumference of the bobbin 20. Copper (Cu) is used as the general material of the coil. However, it is possible to use aluminium (Al) where the specific gravity is ⅓ in comparison with Cu in order to reduce the weight of the motor, and the cost is relatively cheaper than Al.

Figure 9A:
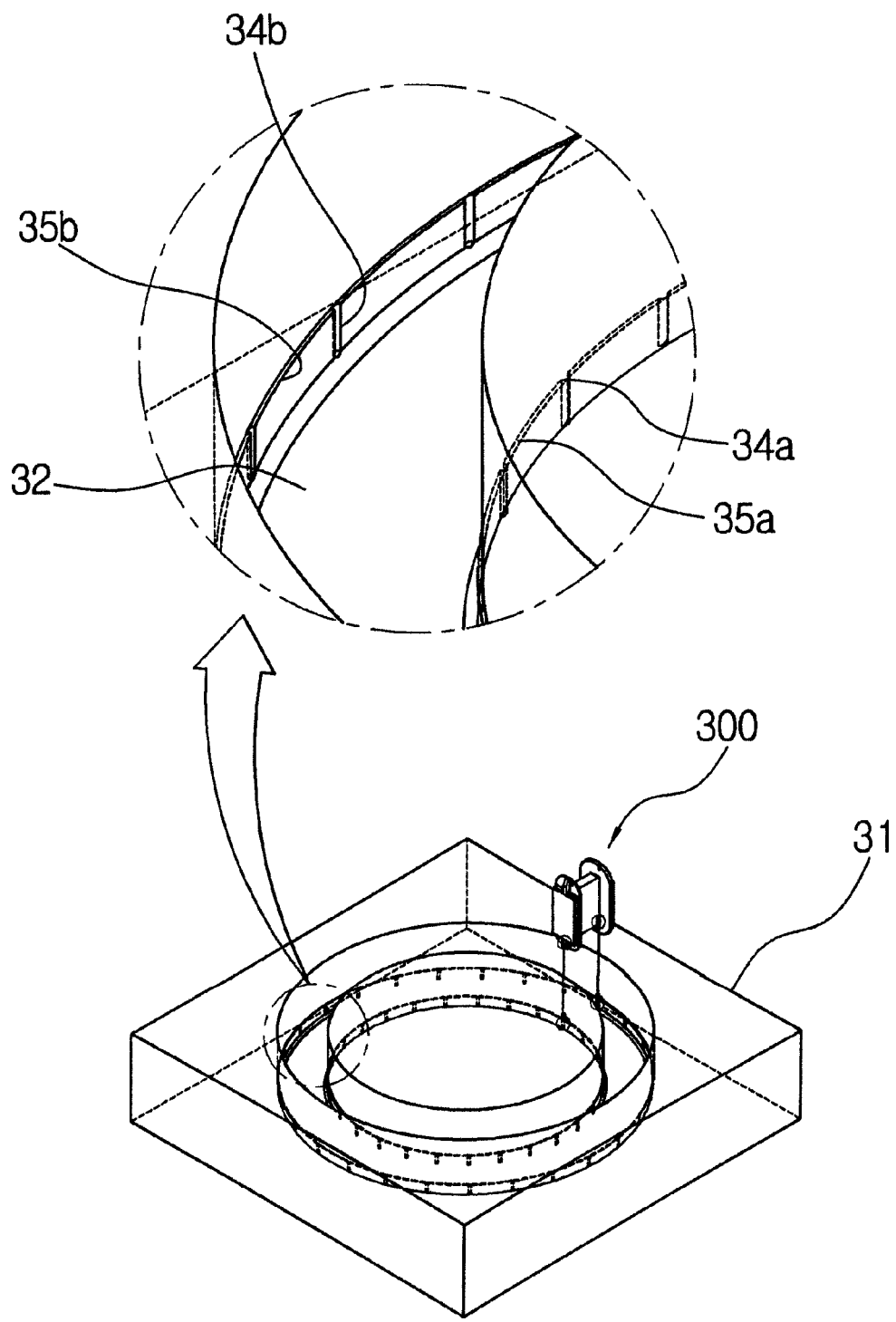
FIG. 9A is a diagram for illustrating a mold structure for injection-molding a plurality of divided core assemblies using an insert molding mode according to the present invention.

Thereafter, twenty-seven division type core assemblies 300 (FIG. 9B) around which coils are wound are temporarily assembled in an annular form inside the grooves 32 of the mold 31 and molded using a thermosetting resin, as shown in FIG. 9A, and accordingly the annular integrated stator 3 shown in FIGS. 2A to 2C is obtained.

Firstly, when the stator 3 operates at a three-phase driving mode, as shown in FIG. 5A, twenty-seven division type core assemblies 300 are divided into three sets of coil assemblies 33a-33c in which a stator coil 33 is sequentially wound around nine division cores u1-u9, v1-v9, and w1-w9 for each phase of U, V, W. The respective coil assemblies 33a-33c, that is, the nine division cores u1-u9, v1-v9, and w1-w9 form three core groups G1-G3, G4-G6, and G7-G9. In this case, the inputs of the division cores u1, v1, and w1 positioned in a first stage of the respective core groups G1-G3, G4-G6, and G7-G9 become the input terminals of the respective U, V, W phases and thus are connected to the terminal blocks 12 (FIG. 2A). The outputs from the division cores u9, v9, and w9 positioned in the final stage are mutually connected and form the neutral point (NP).

The twenty-seven division cores u1-u9, v1-v9, and w1-w9, are formed into three sets of coil assemblies 33a-33c in which coils are sequentially wound around the nine division cores u1-u9, v1-v9, and w1-w9 so as to include three core groups G1-G3, G4-G6, and G7-G9, respectively. Thereafter, when the coil assemblies 33a-33c are temporarily assembled in the annular grooves 32 of the mold 31, as shown in FIG. 5B, the three division cores are formed into a group and the core groups G1-G3, G4-G6, and G7-G9 of the respective U, V, W phases are alternately disposed in sequence of the respective phases. That is, when the driving current is switched and applied to the respective U, V, W phases, the nine division core groups G1-G9 are arranged in sequence of G1-G4-G7-G2-G5-G8-G3-G6-G9 so that the rotation of rotors 4 and 5 is made.

As described above, for example, the stator core group G1-G3 of the U phase, 3 is composed of three groups which become interconnected in which three division cores u1-u3, u4-u6, and u7-u9 in which the coils 33 are wound around the respective insulation bobbins 20 form the groups.

In this case, since the adjacent division cores, for example, u1 and u2, and u2 and u3 are disposed close to each other, in the nine division cores u1-u9, they are interconnected via short jump wires J1 whose length is relatively short. Because the assembly of the core groups of each phase is alternately made, as described above, in the core between the respective groups G1-G3, for example, u3 and u4, and u6 and u7 through the relatively long jump wires J2.

Successively when the stator coil 33 which will be described later a coil is sequentially wound around the nine division cores u1-u9, v1-v9, and w1-w9, the short jump wires J1 are secured between the adjacent division cores in the group, and the long jump wires J2 are secured between the division cores among the groups.

As shown in FIG. 3A, the division core 30 is formed of an I-shaped form. As shown in FIGS. 3B and 3C, a bobbin 20 which is made of an insulating material such as a plastic material is combined with the outer circumferential portion of the I-shaped division type core 30. The bobbin 20 is formed of a rectangular box portion 21 around which a coil is wound and which is formed in the middle portion, and inner and outer flanges 22a and 22b which are formed by being bent from the inner and outer sides of the rectangular box portion. The rectangular box portion between the flanges 22a and 22b is the space around which the coil 33 can be wound.

In the I-shaped division type core 30, the inner and outer flanges 30b and 30c are bent and extended to the inner and outer sides of the linear type body 30a, respectively. The inner flange 30b is rounded inwards, so as to maintain a predetermined interval from the annular inner and outer rotors (not illustrated), and the outer flange 30c is rounded outwards (FIG. 3A). In this case, it is preferable that the outer flange 30c has to be formed relatively larger than the inner flange 30b.

Moreover, the bobbin 20 and the I-shaped division core 30 is preferably assembled by an insert molding mode using a thermosetting resin in an integral form. However, it is not limited thereto, but can be assembled using the well-known modes.

In the case of the inner and outer flanges 22a and 22b of the bobbin 20, it is preferable that the outer flange 22b has to be formed relatively larger than the inner flange 22a. In order to fix the outgoing line of the coil 33 which has been wound around the bobbin, insertion grooves 26a and 26b for fixing coils are formed in the upper portion of the inner and outer flanges 22a and 22b. Moreover, a pair of inner and outer protrusions 24a and 24b are integrally formed on the outside of the lower portion of the inner and outer flanges 22a and 22b, in order to guide a plurality of division type core assemblies 300 around which the coil 33 is wound so as to be automatically assembled into fixing grooves 34a and 34b for positioning which are formed in the inner and outer walls of the annular groove 32 in the mold 31.

As shown in FIG. 9A, according to the present invention, twenty-seven pairs of fixing grooves 34a and 34b for position determination into which the inner and outer protrusions 24a and 24b formed in the bobbin 20 of twenty-seven division type core assemblies 300 are inserted and fixed, are formed in the corresponding positions of the inner and outer walls of the annular groove 32 in the mold 31. For this, stepped portions 35a and 35b are formed in the inner and outer walls of the annular groove 32 of the mold 31. The division type core assembly 300 shown in FIG. 9A shows a division core in which a coil is not wound for convenience of explanation.

Therefore, in the present invention, an insert molding process is not performed at the state where that a plurality of division type core assemblies are temporarily assembled in an annular core support plate which includes an automatic positioning/supporting unit in advance in order to integrate a plurality of the division type core assemblies as in the conventional art. However, the insert molding process can be performed at the state where a plurality of division type core assemblies are temporarily immediately assembled into fixing grooves 34a and 34b for position determination formed in the annular groove 32 in the mold 31.

Moreover, in the conventional art, a plurality of division type cores are not connected in advance in a sequential winding method, but a plurality of division type core assemblies obtained by winding a coil around each division type core are assembled in the core support plate, and then the respective division type core assemblies are mutually connected in order to connect the respective division type core assemblies electrically in the core support plate. In this case, there are problems that the wound coil should be connected with the connection pin and then the connection pin should be coupled with the conduction line formed in the core support plate, in order to make the electrical connection easy in the bobbin of each division core, to accordingly lower an assembly productivity.

However, in the present invention, it is possible to directly assemble a plurality of division type core assemblies 300 with fixing grooves 34a and 34b for position determination in the mold 31, to thereby remove the core support plate for temporary assembly.

Figure 9B:
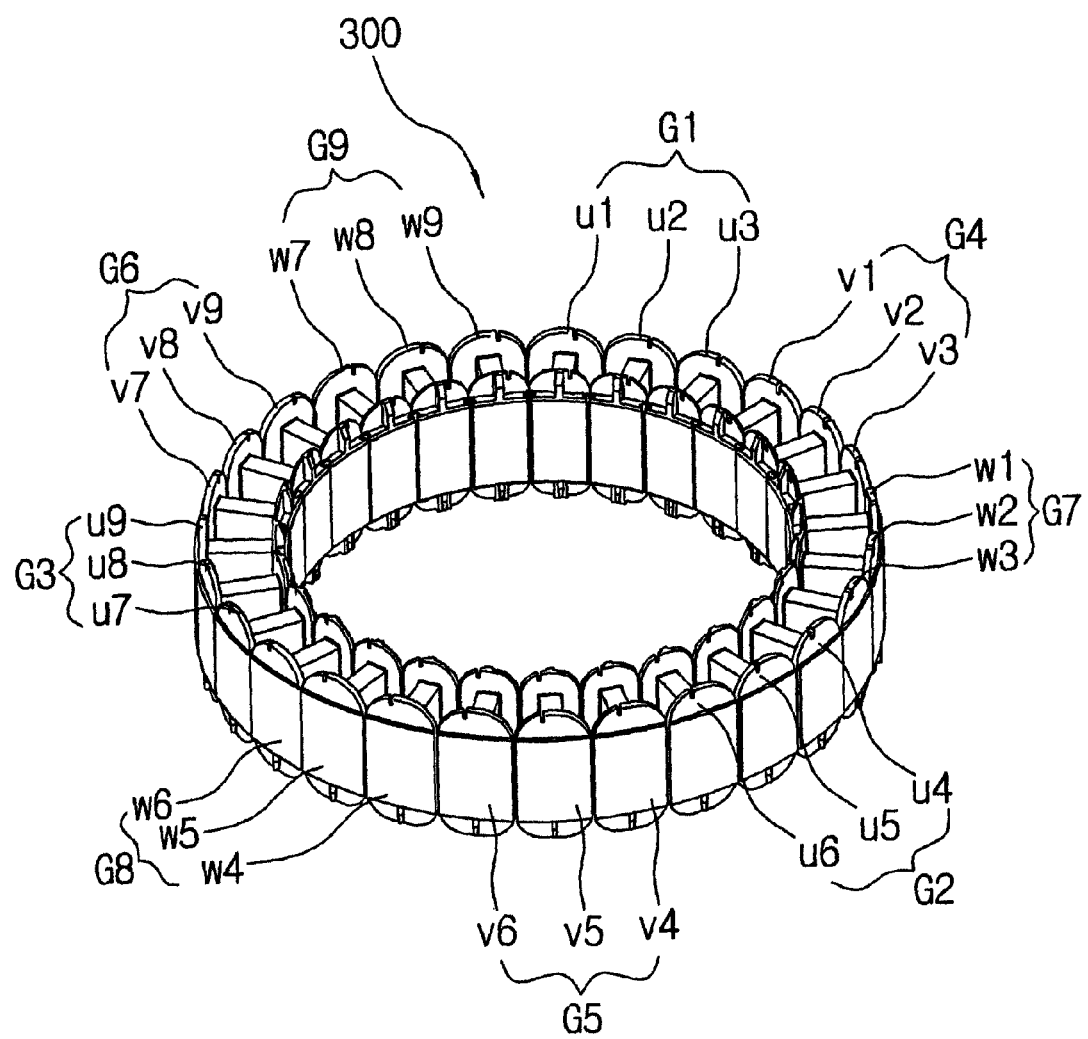
FIG. 9B is a perspective view showing the state where a plurality of divided core assemblies are arranged in an annular shape for an insert molding mode.

Moreover, twenty-seven division cores u1-u9, v1-v9, and w1-w9 form three core groups G1-G3, G4-G6, and G7-G9 for each phase as shown in FIGS. 5A and 5B. If the core groups G1-G3, G4-G6, and G7-G9 of the respective U, V, W phases are alternately arranged in sequence of the phases and are then temporarily assembled in sequence of G1-G4-G7-G2-G5-G8-G3-G6-G9, a plurality of the division type core assemblies 300 are formed as shown in FIG. 9B. FIG. 9B does not show the coil wound around the bobbin for convenience of explanation.

As shown in FIG. 9B, the neighbouring bobbins 20 are designed to contact each other between a plurality of the division type core assemblies 300. Accordingly, the possibility of being inclined or moved due to the tolerance or the thermal transformation of the components is minimized. Moreover, the whole intensity can be improved after the injection molding.

In this case, in the above preferred embodiment, the structure of directly assembling a plurality of division type core assemblies 300 in fixing grooves 34a and 34b for position determination in the mold 31 has been exemplified. However, instead of fixing grooves for position determination, it is possible to perform an insert molding process at the state where the mutual link connection is accomplished by an unevenness structure between the division core bobbins 20 when the neighboring bobbins 20 contact each other between a plurality of the division type core assemblies 300.

In this way, in order to form nine division cores u1-u9, v1-v9, and w1-w9 of each phase into three core groups G1-G3, G4-G6, and G7-G9, as shown in FIG. 5A, for example, it is necessary to sequentially wind the stator coil around nine division cores in the respective U, V, W phases. In the case that nine division cores u1-u9, v1-v9, and w1-w9 are sequentially wound in this manner, inconveniences caused by assembling the division type cores in the mold 31 without any positioning components can be minimized.

Moreover, in the present invention, fixing grooves 34a and 34b for position determination are formed in the mold 31. Since assembly positions of the radial direction and the columnar direction of the division type core assembly 300 are automatically determined, an unskilled person in the art can do the assembly work and simultaneously can easily maintain the support state for the insert molding in the subsequent processes. As a result, the assembly productivity is very excellent.

Moreover, the stator 3 comes close between the inner rotor 4 and the outer rotor 5 which are combined the inner and outer portions of the stator 3, but can maintain constant magnetic gaps G1 and G2, since the inner and outer flanges 30b and 30c of the division core 30 form incoming and outgoing curved surface at a predetermined curvature, respectively, and thus deviation from roundness of the inner and outer circumferential portions of a plurality of division type core assemblies 300 becomes high.

Figure 4A:
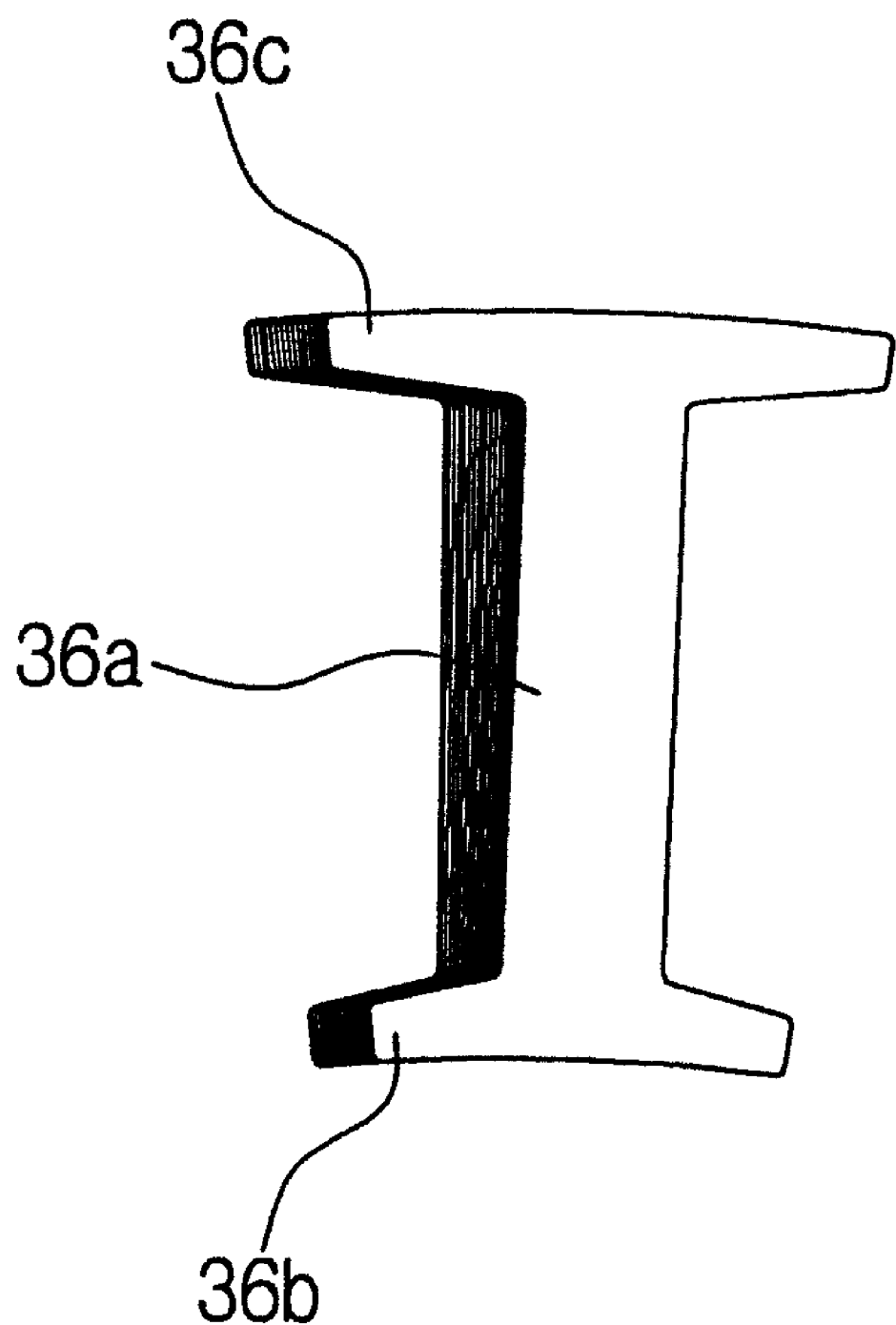
FIG. 4A is a plan view of a division type skew core according to the present invention.
Figure 4B:
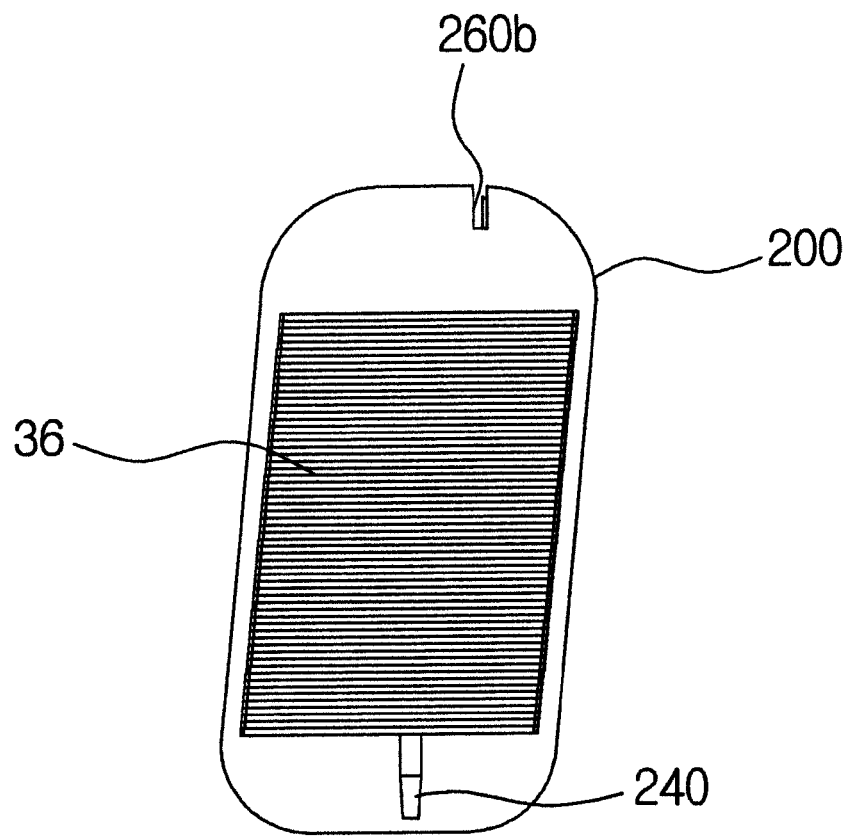
FIGS. 4B and 4C are a rear and plan views of a divided skew core in which a bobbin is combined according to the present invention, respectively.
Figure 4C:
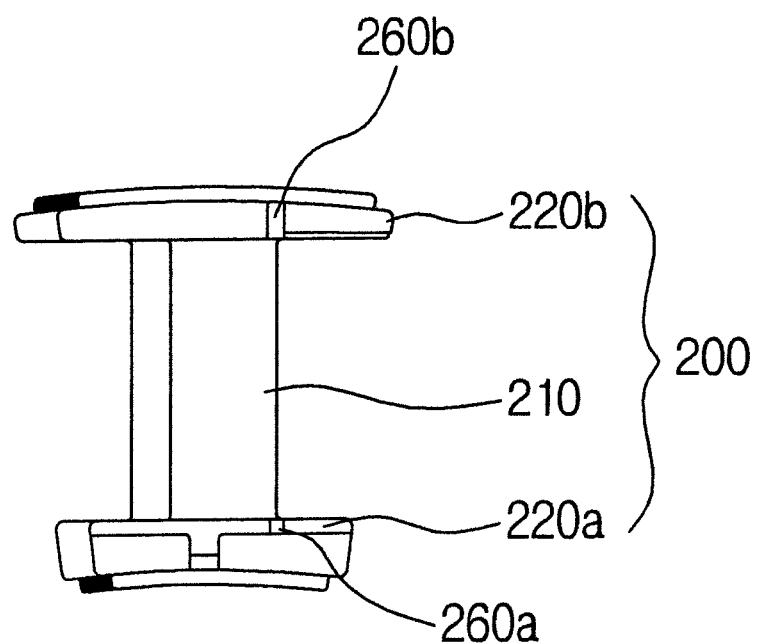

In the meantime, FIG. 4A is a plan view of a division type skewed core according to the present invention, and FIGS. 4B and 4C are a rear and plan views of a division type skew core in which a bobbin is combined according to the present invention, respectively.

As shown in FIG. 4A, a division skewed core 36 according to the present invention is formed of generally an I-shape. As shown in FIGS. 4B and 4C, a bobbin 200 which is made of an insulating material such as a plastic material is combined with the outer circumferential portion of the I-shaped division type skew core 36. The bobbin 200 is formed of a rectangular box portion 210 around which a coil is wound and which is formed in the middle portion, and inner and outer flanges 220a and 220b which are formed by being bent and extended from the inner and outer sides of the rectangular box portion. The rectangular box portion between the flanges 220a and 220b is the space around which the coil 33 can be wound.

In the I-shaped division type skewed core 36, the inner and outer flanges 36b and 36c are bent and extended to the inner and outer sides of the linear type body 36a, respectively. The inner flange 36b is rounded inwards, so as to maintain a predetermined interval from the annular inner and outer rotors (not illustrated), and the outer flange 36c is rounded outwards. In this case, it is preferable that the outer flange 36c has to be formed relatively larger than the inner flange 36b (FIG. 4A).

Moreover, it is preferable that the outer flange 220b of the bobbin 200 has to be formed relatively larger than the inner flange 220a. In order to fix the outgoing line of the coil 33 which has been wound around the bobbin, insertion grooves 26a and 26b for fixing coils are formed in the upper portion of the inner and outer flanges 220a and 220b. Moreover, inner and outer protrusions 240 are integrally formed on the outside of the lower portion of the inner and outer flanges 220a and 220b, in order to guide a plurality of division type core assemblies 300 so as to be automatically assembled into fixing grooves 34a and 34b for positioning in the mold 31.

In the division skewed core 36, the skew is given in 0~1 pitch range determined inversely proportionally to the slot number (that is, the core number) compared to the general division core in order to obtain an effect of reducing cogging torque, noise, and vibration. In this case, one pitch is determined as 360°/slot number. For example, it is set up as 13.3° in the case the division number of slots is twenty-seven.

The division skewed core 36 can secure a broader winding space in comparison with the structure of giving a skew to the integrated stator core since the division skewed core 36 is a division type core and thus the winding process of coils can be easily accomplished.

Furthermore, the core itself in the conventional division core forms the structure of the motor. Accordingly, if a skew is given to the conventional division core, it is impossible to interconnect the core. However, it is possible to use a skew type division core in the present invention since a thermosetting resin can integrated in place of the structure of the motor.

In the case of the division skewed core 36 according to the present invention, the coil winding and a plurality of division type core assemblies around which coils are wound are injection-molded into the insert molding mode, which is made identically to that of the division core 30.

As described above, even though the present invention employs the skewed core for the reduction of the cogging torque and the noise/vibration, the winding process of coils can be easily accomplished since it adopts a division type core structure. Moreover, since each skewed core in the present invention is integrally molded by the insert molding mode using the thermosetting resin, the present invention can easily solve the difficulties in the conventional division core in which the core itself forms the structure of the motor.

Hereinbelow, a winding process for the division cores will be described. When a coil is sequentially wound around nine division cores u1-u9, v1-v9, and w1-w9, short jump wires J1 are secured between the adjacent division cores in the group, and long jump wires J2 are secured between the groups of the division cores.

The forms and shapes of the division core 30 and the bobbin 20 determines accommodating grooves in connection jigs for mutually connecting and supporting the division cores to be described later. Accordingly, the type of the connection jigs is classified.

Figure 7A:
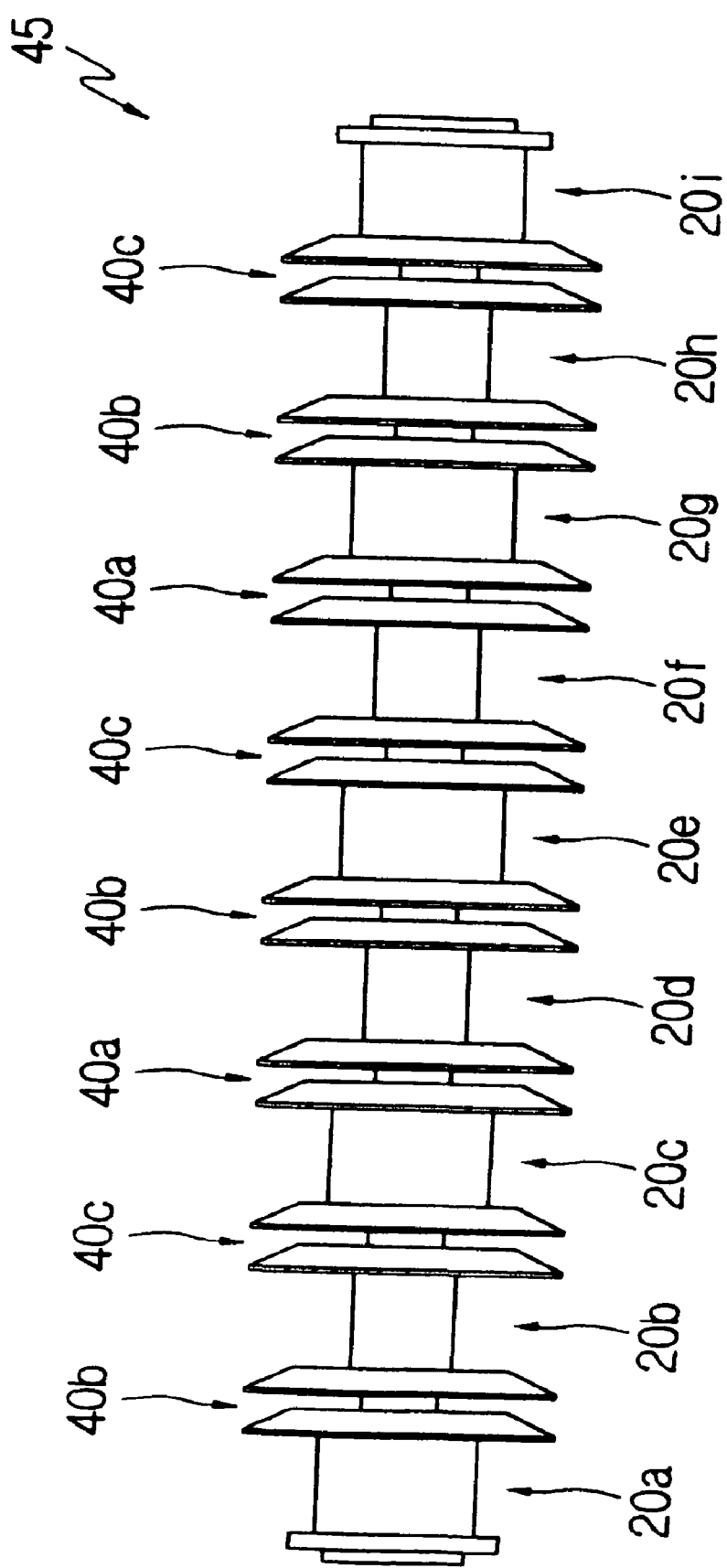
FIGS. 7A and 7B are a front view of a core/jig assembly showing the state where the connection jig and the divided core are assembled, and a perspective view schematically showing a continuous winding machine, respectively.
Figure 7B:
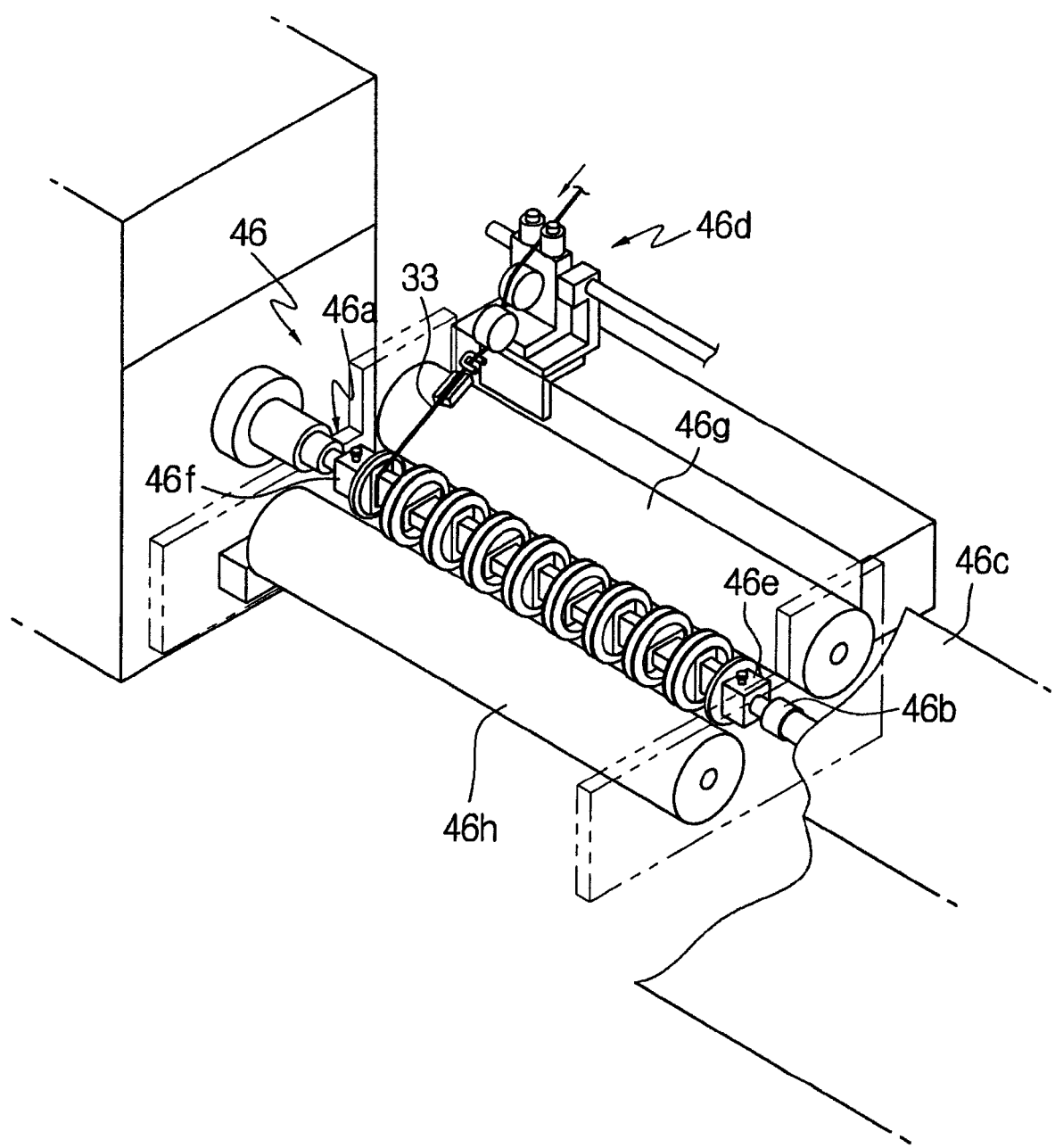

As shown in FIG. 7B, a continuous winding machine 46 of nine division cores, can be implemented using a general purpose winding machine having a single spindle. The continuous winding machine 46 winds the stator coil 33 around the bobbin 20, and includes a spindle 46a forming the rotational shaft of a spindle motor, a tailstock 46c which is rotatably installed in a transferable flow supporting portion 46b which can move to the left and right in the same axial direction as that of the rotational shaft 46e of the spindle 46a, and supports the bobbin around which the coil is wound, together with the spindle 46a, and which includes the rotational shaft 46e which rotates according to rotation of the spindle 46a, and a traverse device 46d which supplies the coil 33 while moving in the space between the inner and outer flanges 22a and 22b of the bobbin 20 along the axial direction to the left and right so that the coil is uniformly arranged and wound around the bobbin when the bobbin is rotated according to rotation of the spindle 46a. In FIG. 7B, a reference alphabetical numeral 46f denotes a chucking lever which is installed at the head of the spindle 46a and fixes the tip-end of the coil 33 which is withdrawn from the traverse device, and reference alphabetical numerals 46h and 46g denotes dummy rollers, respectively.

Figure 6A:
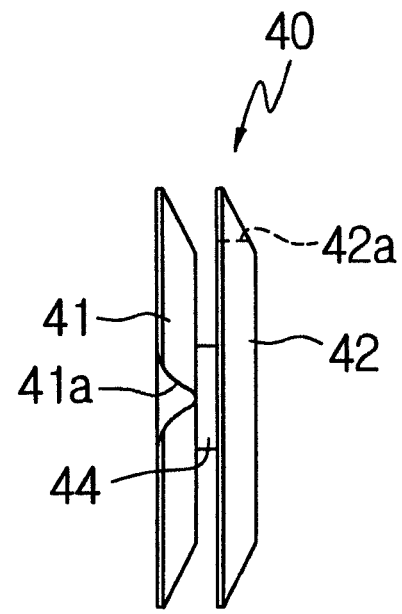
FIGS. 6A through 6C are a front view, a left side view, and a right side view showing a connection jig connecting divided cores according to the present invention, respectively.
Figure 6B:
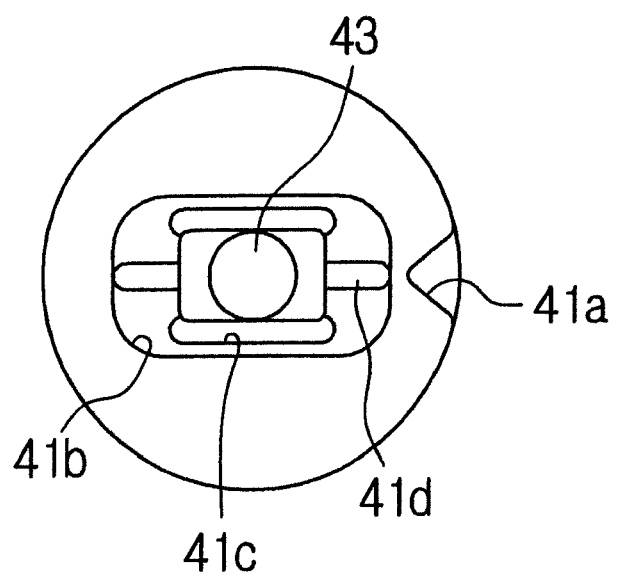
Figure 6C:
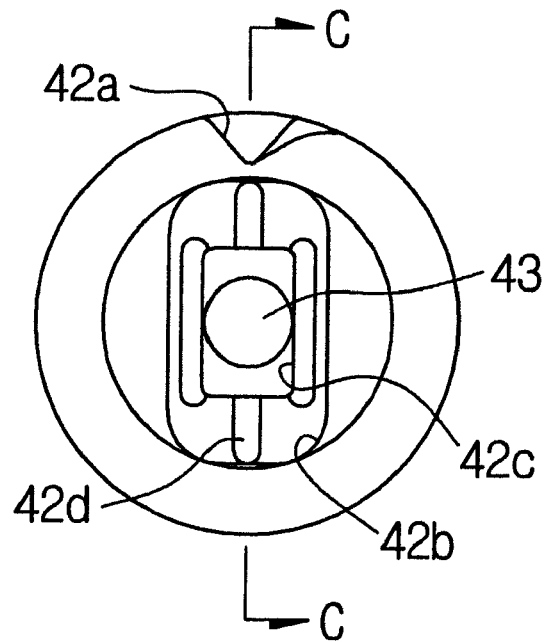
Figure 6D:
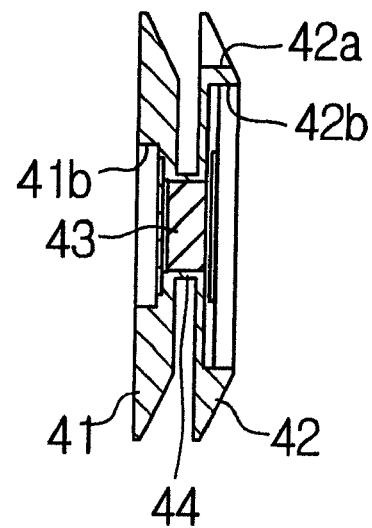
FIG. 6D is a cross-sectional view cut along a line C-C of FIG. 6C.

When the continuous winding of the coil is performed using the continuous winding machine 46, the respective bobbins 20a-20i of the nine division cores 30 are firstly assembled into a core/jig assembly 45 in which the cores and jigs are connected in series as shown in FIG. 7A, using eight connection jigs 40a-40c as shown in FIGS. 6A to 6D, and then the assembled core/jig assembly 45 is set up in the continuous winding machine 46 in order to wind the coil 33 around the nine bobbins 20a-20i sequentially and continuously.

FIGS. 6A through 6C are a front view, a left side view, and a right side view showing a connection jig connecting division type cores according to the present invention, respectively, and FIG. 6D is a cross-sectional view cut along a line C-C of FIG. 6C.

As shown, in the case of a connection jig 40, inner and outer circular plates 41 and 42 are connected with each other through a connector 44 keeping a predetermined distance therebetween, and inner and outer accommodating grooves 41b and 42b into which inner and outer flanges 22a and 22b of the bobbin 20 are inserted are formed on the inner and outer circular plates 41 and 42 in the opposite surfaces thereof, respectively. Moreover, a magnet 43 for fixing a pair of division cores 30 respectively combined in the accommodating grooves is pressingly inserted and coupled on the central portion of the connector 44 passing through both the accommodating grooves 41b and 42b.

Moreover, the left side surface of the inner circular plate 41 is made of a flat shape excluding the accommodating groove 41b, and the right side surface thereof is made of inclined planes and a flat plane. The left side surface of the outer circular plate 42 is made of a flat shape, and the right side surface thereof is made of inclined planes and a flat shape excluding the accommodating groove 42b.

The inner and outer accommodating grooves 41b and 42b include core accommodating grooves 41c and 42c for accommodating inner and outer flanges 30b and 30c of the division core 30 which is protruded from the inner and outer flanges 22a and 22b of the bobbin 20, and air exhaust grooves 41d and 42d.

Moreover, the inner and outer accommodating grooves 41b and 42b are arranged perpendicularly to each other. Inner and outer guide grooves 41a and 42a for guiding the wound coil 33 to be passed over to the bobbin of the next stage are formed on the outer circumferential surface extended from the axis of the connection jig 40 in parallel with the longitudinal direction of the inner and outer accommodating grooves 41b and 42b.

The form and shape of the connection jig 40 are slightly different from those of the inner and outer flanges 30b and 30c of the division core 30 and those of the inner and outer flanges 22*a* and 22*b* of the bobbin 20. Accordingly, the forms and shapes of both the accommodating grooves 41*b* and 42*b* differ from each other. That is, the accommodating grooves are classified into three types.

That is, as described above, the outer side surfaces of the inner and outer flanges 30*b* and 30 of the division core 30 are formed of curved surfaces. Projections 24*a* and 24*b* which guide the division core to be automatically assembled with positioning grooves 34*a* and for position determination in a mold 31 are protruded from the lower portion of the inner flange 22*a* among the inner and outer flanges 22*a* and 22*b* of the bobbin 20. Moreover, the respective lengths from the flanges 30*b* and 30*c* of the division core 30 to the top and bottom of the flanges 22*a* and 22*b* of the bobbin 20, are formed so that the length up to the bottom of the flanges 22*a* and 22*b* of the bobbin 20 is longer than the length up to the top thereof.

Therefore, the connection jig 40 is classified into a first type connection jig 40*a* in which the inner flange 22*a* of the bobbin is combined in one side accommodating groove 41*b*, and the outer flange 22*b* of the bobbin is combined in the other side accommodating groove 42*b*, a second type connection jig 40*b* in which the inner flange 22*a* of the bobbin is respectively combined in both the accommodating grooves 41*b* and 42*b*, and a third type connection jig 40*c* in which the outer flange 22*b* of the bobbin is respectively combined in both the accommodating grooves 41*b* and 42*b*.

In order to form a core/jig assembly 45, nine bobbins 20*a*-20*i* are assembled in series with eight connection jigs 40*a*, 40*b*, and 40*c* which are made in the order of a second type-a third type-a first type-a second type-a third type-a first type-a second type-a third type, as shown in FIG. 7A.

In the meantime, in the spindle 46*a* of the continuous winding machine 46 is formed an accommodating groove in which the outer flange 22*b* of the bobbin is combined is formed. In a supporting shaft 46*b* of the tailstock 46*c* is formed an accommodating groove in which the inner flange 22*a* of the bobbin is combined. The core/jig assembly 45 is combined with and supported to both ends of the inner and outer flanges 22*a* and 22*b*.

Then, when the coil is wound around the core/jig assembly 45, firstly the core/jig assembly 45 rotates according to rotation of the spindle motor and thus the coil 33 is wound around a first bobbin 20*a*. In this case, the traverse device 46*d* is moved to the right side by a predetermined set one pitch corresponding to the diameter of the coil whenever the spindle 46*a* is made to rotate once so that the coil 33 is uniformly wound in a rectangular box portion 21 between the inner and outer flanges 22*a* and 22*b* of the first bobbin 20*a*. In this manner, if the stroke travel of the traverse device 46*d* is sequentially made by a previously set width of the bobbin, and the next spindle rotation is made, the pitch movement of the traverse device 46*d* is made in the opposite direction. That is, the coil winding is arranged one layer by one layer.

In this way, if a predetermined number of coil turns, for example, fifty coil turns are wound, the spindle motor temporarily stops at the position of the inner guide groove 41*a* of the first connection jig 40*b*.

Figure 8A:
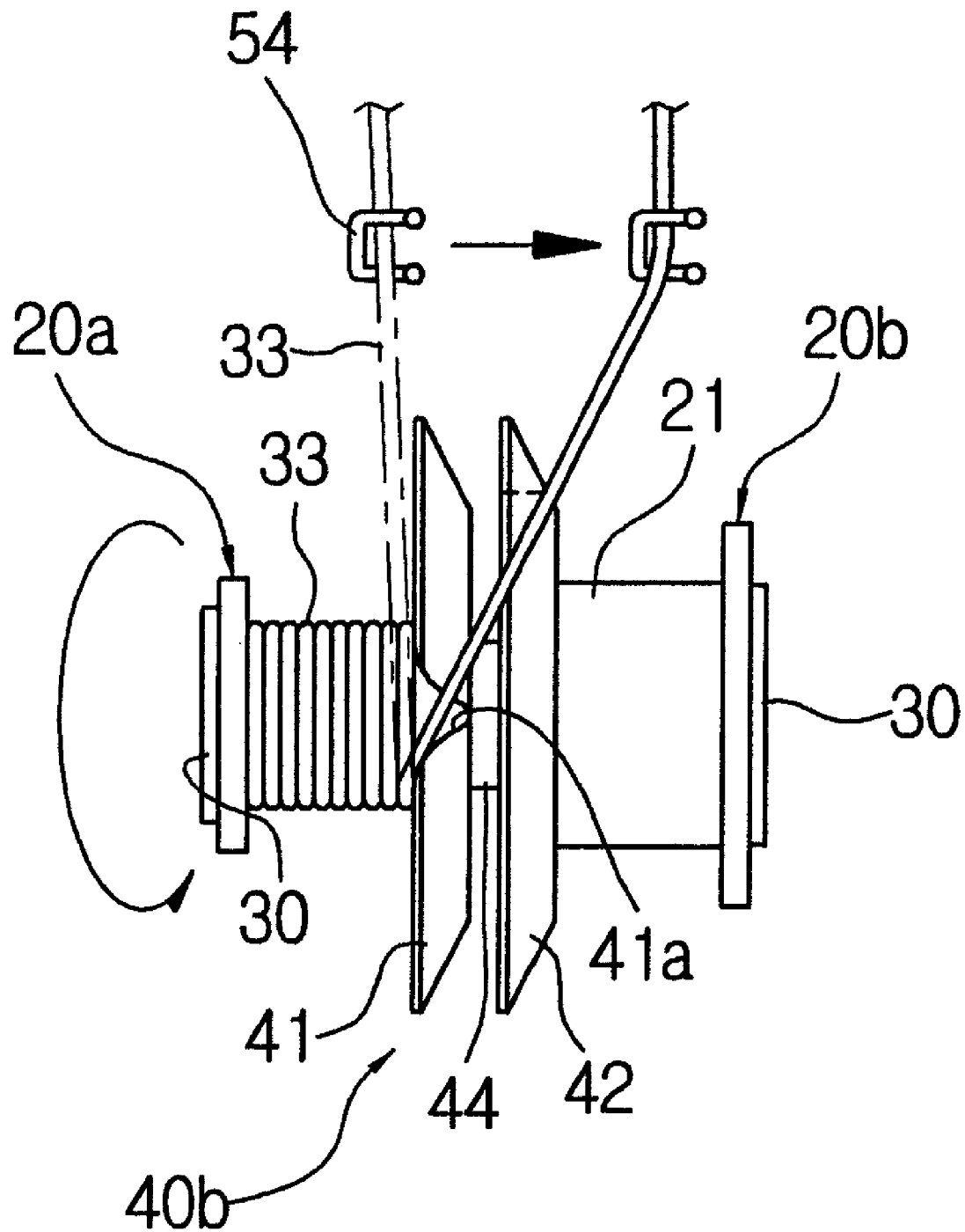
FIGS. 8A and 8B are diagrams for illustrating the operation in which the coil winding is made while securing the short jump wire between adjacent cores in a core group, respectively.
Figure 8B:
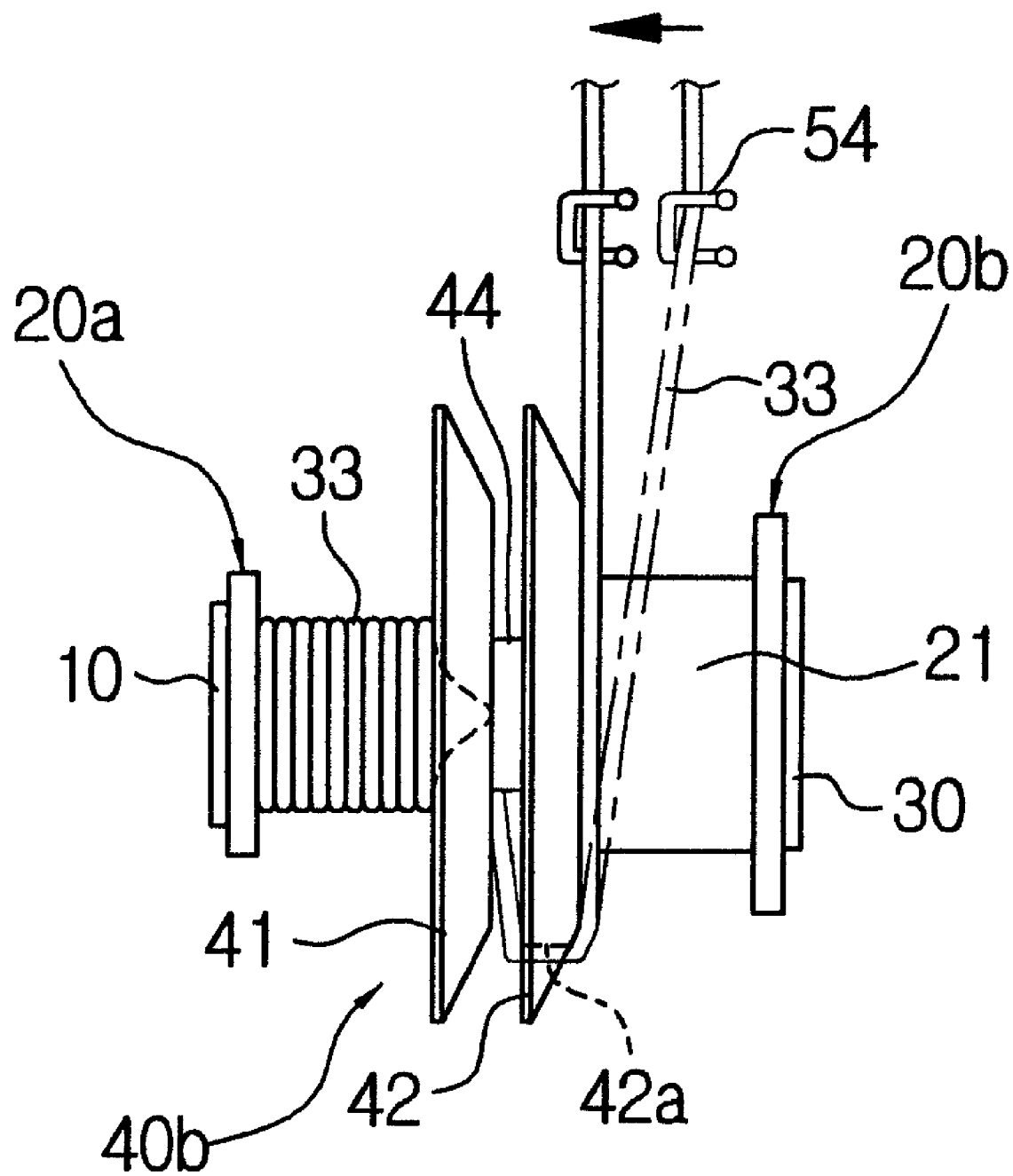

Then, after the traverse device 46*d* is moved to the intermediate position of a second bobbin 20*b* as shown in FIG. 8A, the spindle 46*a*, that is, the core/jig assembly 45 is made to rotate by 180° as shown in FIG. 8B. In the case that the core/jig assembly 45 is made to rotate, the coil 33 staying at the first bobbin 20*a* moves to and is positioned the second bobbin 20*b* through the inner and outer guide grooves 41*a* and 42*a* of the first connection jig 40*b*. Consequently, the short jump wires J1 between the adjacent bobbins of the core group are secured.

Then, at the state where the traverse device 46*d* is moved to the initial position of the second bobbin 20*b*, coil winding is performed by fifty coil turns identically with the coil winding of the first bobbin 20*a*. The spindle motor temporarily stops at the position of the inner guide groove 41*a* of the inner circular plate 41 of the second connection jig 40*c*. While securing the short jump wires J1 in the same manner as that of the second bobbin 20*b*, the traverse device 46*d* moves to a third bobbin 20*c* from the second bobbin 20*b*, to thus complete the coil winding.

Figure 8C:
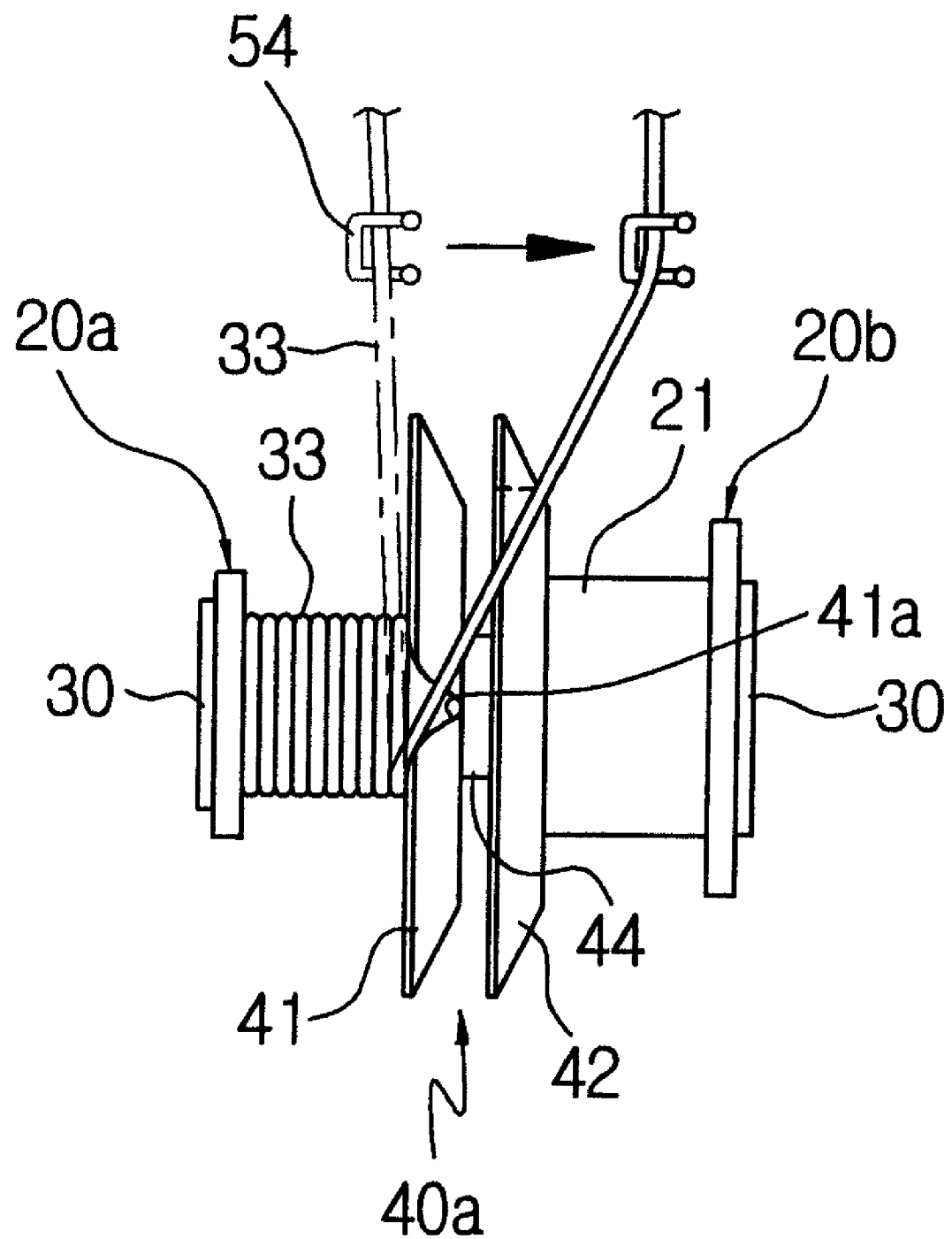
FIGS. 8C and 8D are diagrams for illustrating the operation in which the coil winding is made while securing the long jump wire between adjacent cores in the core group, respectively.
Figure 8D:
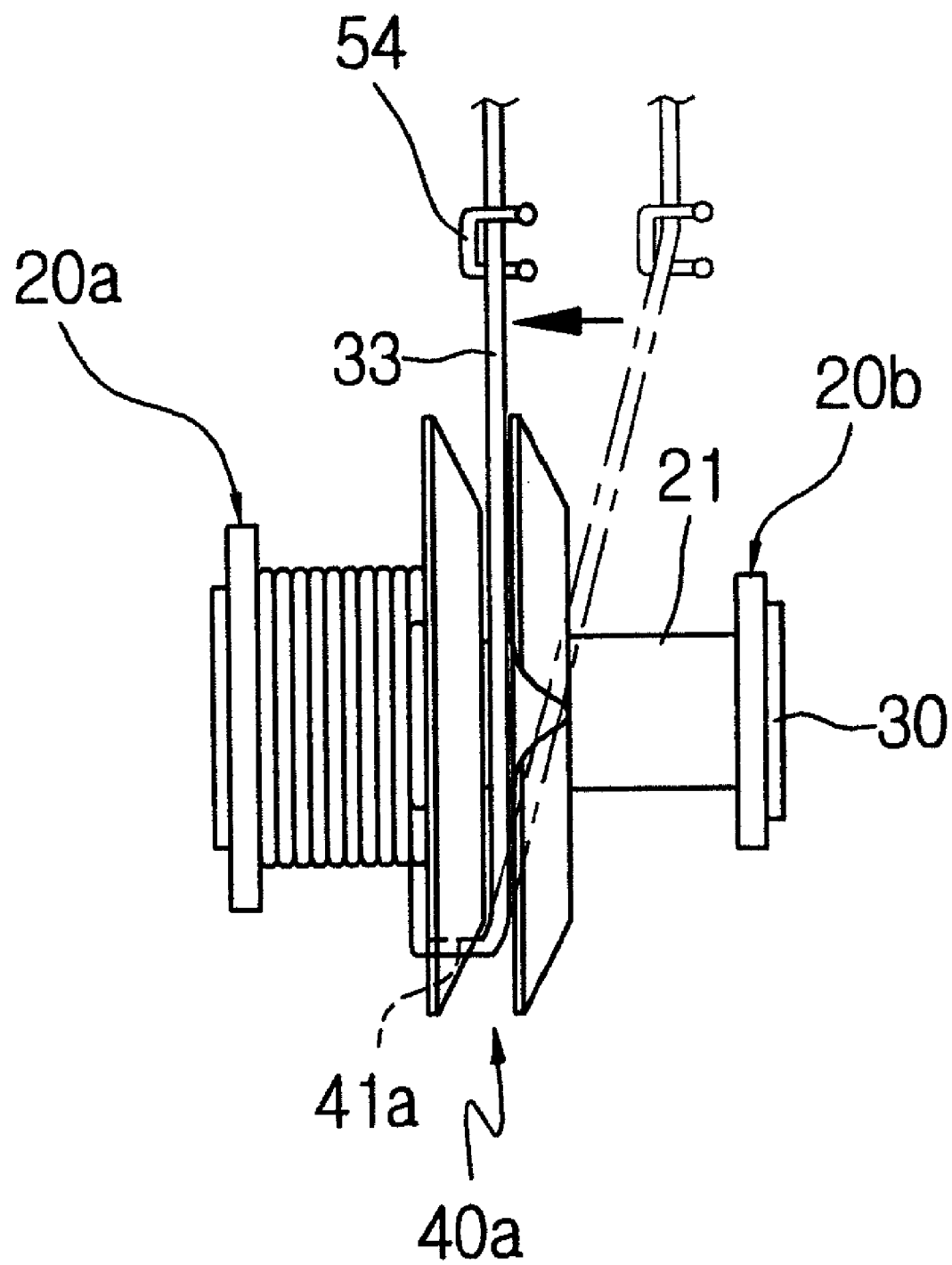

Thereafter, as shown in FIG. 8C, the traverse device 46*d* is moved to the intermediate position of a fourth bobbin 20*d*, and then the spindle is rotated by 90°. In the case that the 90° rotation is made, the coil 33 staying at the third bobbin 20*c* is moved to and position in the connector 44 of the third connection jig 40*a* through the inner guide groove 41*a* of the third connection jig 40*a*. As shown in FIG. 8D, the traverse device 46*d* is again moved to the intermediate position of the third connection jig 40*a*, and the spindle 51 is rotated three times. As a result, the long jump wires J2 is secured between the core group.

Thereafter, the traverse device 46*d* is moved to the intermediate position of the fourth bobbin 20*d*, and then the spindle 51 is rotated by 90°. In the case that the 90° rotation is made, the coil 31 staying at the third connection jig 40*a* is moved to and positioned in the fourth bobbin 20*d* through the outer guide groove 42*a* of the third connection jig 40*a*.

Then, the traverse device 46*d* is moved to the initial position of the fourth bobbin 20*d*, and the coil winding for the fourth to sixth bobbins 20*d*-20*f* is sequentially performed, in the same manner as those of the first to third bobbins 20*a*-20*c*. Thereafter, the traverse device 46*d* is moved from the sixth bobbin 20*f* to the seventh bobbin 20*g*, in the same manner as the above-described manner and the coil winding for the seventh to ninth bobbins 20*g*-20*f* is sequentially performed, in the same manner as that of the fourth to sixth bobbins 20*d*-20*f*.

Then, the coil 33 connected to the traverse device 46*d* is cut, and the chucking about the coil at the start point is released. Thereafter, the core/jig assembly 45 around which the coil has been wound is separated from the continuous winding machine 46. If the division core 30, that is, the bobbin is separated from the connection jig 40, three division cores u1-u3, u4-u6, and u7-u9 per each group are interconnected through the short jump wires J1 as shown in FIG. 5A. The division cores between the respective groups of three groups G1~G3 are interconnected through the long jump wires J2, to thereby obtain nine division cores u1-u9, v1-v9, and w1-w9.

In the above-described embodiment, the consecutive winding of the nine division cores which includes three division cores per each group has been described using a general purpose winding machine equipped with the single spindle. However, the present invention is not limited thereto, but may be made in various forms.

Hereinbelow, the assembly process of the stator 3 will be described based on the division core according to the above-described first embodiment of the present invention.

Firstly, a thermosetting resin, for example, a BMC (Bulk Molding Compound) such as polyester is molded to the outside of the stator core 30, excluding the inner and outer flanges 30*b* and 30*c* of the stator core 30, to then form a bobbin 20 as shown in FIGS. 3B and 3C.

Then, the twenty-seven division cores u1-u9, v1-v9, and w1-w9a are connected in series as shown in FIG. 7A, nine by nine each electrical phase, using the connection jigs for connecting the division cores shown in FIGS. 6A to 6D, to thereby be assembled into a coil assembly 45. The coil 33 is sequentially and continuously wound around the respective bobbins 20a-20i of the nine division cores by a coil continuous winding method using the continuous winding machine 46, to thereby prepare three sets of coil assemblies 33a-33c having the short jump wires J1 and the long jump wires J2, as shown in FIG. 5A.

Three sets of the coil assemblies 33a-33c are temporarily assembled into the positioning grooves 34a and 34b for the position determination which are formed in the annular grooves 32 of the mold 31 for nine core groups G1-G9 in a mode that the core groups G1-G3, G4-G6, and G7-G9 of the respective phases are alternately arranged for each phase in turn, as shown in FIG. 5B. Then, the coil assemblies are insert-molded using the BMC (Bulk Molding Compound).

If the above-described insert molding is performed using the BMC (Bulk Molding Compound) in order to cover the space between the respective twenty-seven division type core assemblies 300, and the upper/lower wound coil portions and bobbins 20 excluding the outer opposing surface of the inner and outer flanges 30b and 30c of each division core 30, to thereby obtain an annular integrated stator 3 shown in FIGS. 2A through 2C.

In this case, it is preferable that if an extension 2a is molded axially from the bottom of an annular stator supporter 2 which combines and supports the division type core assemblies 300, it can be used for coupling a housing 10, and plays a role of blocking the water leaked from a washing machine from flowing in into the motor.

Moreover, the conventional motor requires an additional insulator due to a high humidity environment of the washing time, at the time of mounting the stator in a washing machine. However, since the present invention uses the stator 3 of which the whole surface is molded with an insulator, the additional insulator is not required. The sharp portions doing an assembly worker an injury are hidden in the outer surface of the stator, to thereby secure the safety.

Moreover, it is preferable that when a plurality of division type core assemblies 300 are integrated, the coil 33 is wound around the bobbin 20 of each core 30 and thus a plurality of coil ends each of a semi-circle shape are formed in the upper and lower portions of each division type core assembly 300. If an injection molding is performed so that the BMC molding is made in this shape, concavo-convex regions 2p each of the semi-circle shape are formed for each division type core assembly 300, as shown in FIG. 2A. As a result, the stator supporter 2 on the stator upper surface is formed to have a number of concavo-convex regions (unevenness) 2p along a number of the division core assemblies 300 around which coils 33 are wound.

Since the integrated stator 3 which has been injection-molded into this kind of structure has been BMC-molded along a plurality of the coil ends of the semi-circle shape, the contact surface area contacting the air becomes broad and heat dissipation is effectively done. Moreover, the turbulent flow occurs from the concavo-convex regions of the coil ends during rotation of rotors 4 and 5, to thereby seek improvement of a cooling performance.

Furthermore, as shown in FIGS. 2A and 2B, three mount positioning holes 2b and six bolt mounting holes 2c are arranged at an equal interval along an axial extension 2a, and a plurality of ribs 2d which are formed in the surface where the mount positioning holes 2b and the bolt mounting holes 2c are formed have an effect of improving an intensity during mounting.

Moreover, a plurality of recesses 2e formed by a plurality of the ribs 2d and the recess 2f formed in the six bolt mounting holes 2c create the turbulent flow during rotation of the inner rotor 4 which is arranged in opposition to the recess 2f to thereby improve a cooling performance.

Furthermore, as shown in FIG. 2C, a plurality of large-size and small-size recesses 2g and 2h are formed in the rear side of the stator 3 by a plurality of the ribs 2f. If a plurality of the ribs 2f and a plurality of the large-size and small-size recesses 2g and 2h are formed by BMC, the thickness of BMC is formed into a thin plate, to thus reduce the weight at minimum, but increase the surface area and thus play a role of reinforcing a cooling efficiency.

Moreover, a plurality of the ribs 2d and 2f formed in the front/rear surfaces of the stator 3 plays a role of blocking crack which can occur during performing a BMC injection molding process from propagating.

In FIGS. 2A through 2C, a reference numeral 12 denotes a terminal block for supplying driving current to the stator coil 33 of a three phase driving mode for example. A reference numeral 13 denotes a rotor 50 which rotates in order to control the current supply for the stator coil 33, that is, a hall integrated circuit (IC) assembly generating a position signal for detecting the location of a magnet 4a of the inner rotor 4.

C. Structure of Rotor and Manufacturing Process

Figure 13A:
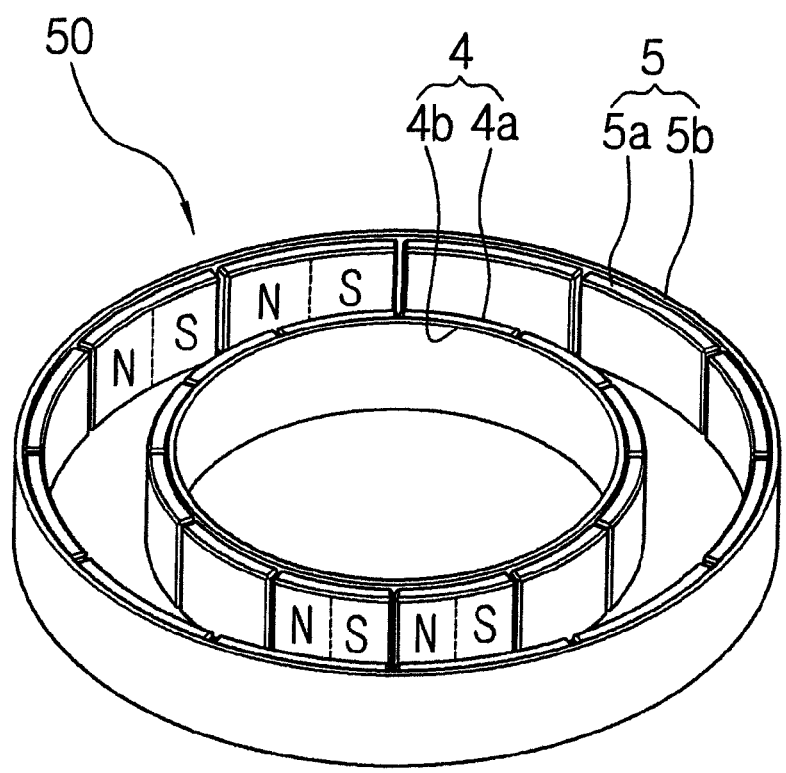
FIGS. 13A and 13B are perspective views illustrating the inner and outer rotor assemblies and an involute serration structure which are used for assembly of the double rotors of the present invention, respectively.
Figure 13B:
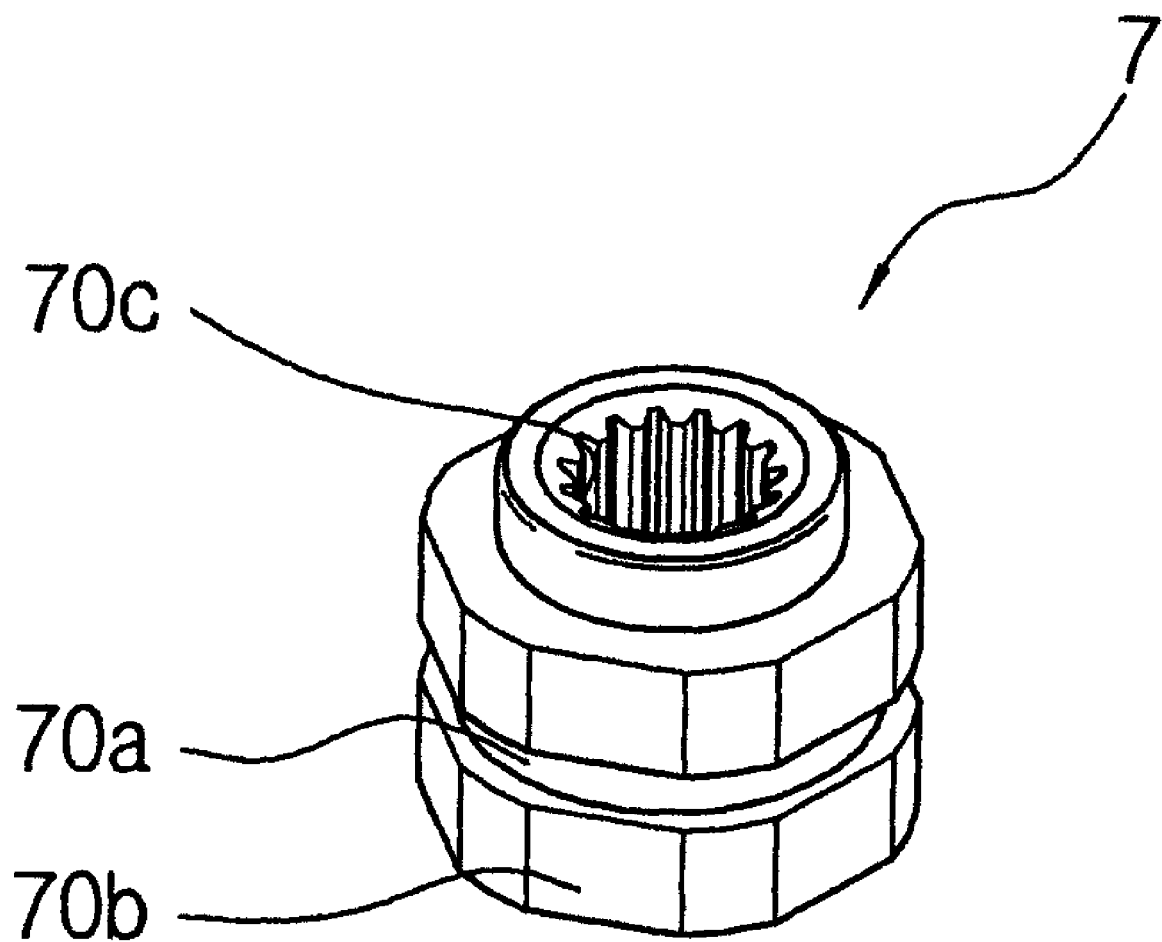

FIGS. 10A through 10E are a perspective view of the upper side, a partially cut-out front view, a plan view, a rear view, and a circumferentially sectionalized perspective view of a rotor according to the present invention, respectively. FIGS. 13A and 13B are a perspective view illustrating the inner and outer rotor assemblies and an involute serration structure which are used for assembly of the double rotors of the present invention, respectively.

As shown in FIGS. 1A, 1B, and 10A through 10E, a BLDC motor according to the present invention employs a structure of a double rotor 50 structure in which an inner rotor 4 where a plurality of magnets 4a and a ring-shaped inner yoke 4b are arranged and an outer rotor 5 where a plurality of magnets 5a and a ring-shaped outer yoke 5b are arranged, are connected to the rotational shaft 9 through an involute serration bushing 7 in the central portion by a rotor supporter 6.

As shown in FIG. 13A, in the case of the double rotor 50, a number of magnets which are segmented and magnetized in the outer side of the annular inner yoke 4b into the N (North) pole and the S (South) pole, respectively, for example, twelve magnets 4a are alternately arranged using an adhesive, to thereby form the inner rotor 4, and a number of magnets which are segmented and magnetized in the inner side of the annular outer yoke 5b into the N (North) pole and the S (South) pole, respectively, for example, twelve magnets 5a are alternately arranged using an adhesive, to thereby form the outer rotor 5. In this case, the magnets 4a and 5a which oppose the inner rotor 4 and the outer rotor 5 are arranged in order to have the opposite polarities, respectively.

Then, the involute serration bushing 7 is disposed in the injection mold so as to be positioned at the centers of the inner rotor 4 and the outer rotor 5, and then is insert-molded using a thermosetting resin, for example, BMC (Bulk Molding Compound) to thereby manufacture a rotor. In this case, the magnets of the inner rotor 4 and the outer rotor 5 are integrally fabricated into an inner shape, so that the magnets can be placed and fixed in the mold without undergoing any separate bonding process.

The inner rotor 4 and the outer rotor 5 are annularly molded at the outer surfaces thereof, excluding the opposite surfaces of magnets 4a and 5a facing each other at the time of an insert molding process, and the involute serration bushing 7 is annularly molded at the overall outer surface thereof, excluding the axial direction. In order to make the contact area wider in the axial direction, and enhance a coupling force, a circular recess 70a is formed in the middle of the outer circumferential surface of the bushing 7 in which a molding is made. Here, the outer circumferential surface 70b is formed of a twelve angular surface having twelve edges. Moreover, the throughhole 70c of the serration structure is formed in the central portion of the bushing 7 in order to be serration-connected with the rotational shaft 9.

Moreover, the involute serration bushing 7, the inner rotor 4, and the outer rotor 5, by an insert molding process, are mutually connected through a number of straight ribs which are radially extended from the central portion thereof, for example, twelve straight ribs 51, and a number of straight ribs 51 are mutually connected between the involute serration bushing 7 and the inner rotor 4, to then dispose a circular rib 52 therebetween in order to enhance a support stiffness. Consequently, a plurality of large-size and small-size holes 53 and 54 are alternately formed in the portion facing the upper portion of the stator 3 along the circumferential direction owing to the mutual crossing of the circular rib 52, the inner rotor 4, the outer rotor 5 and a plurality of the straight ribs 51.

Figure 10A:
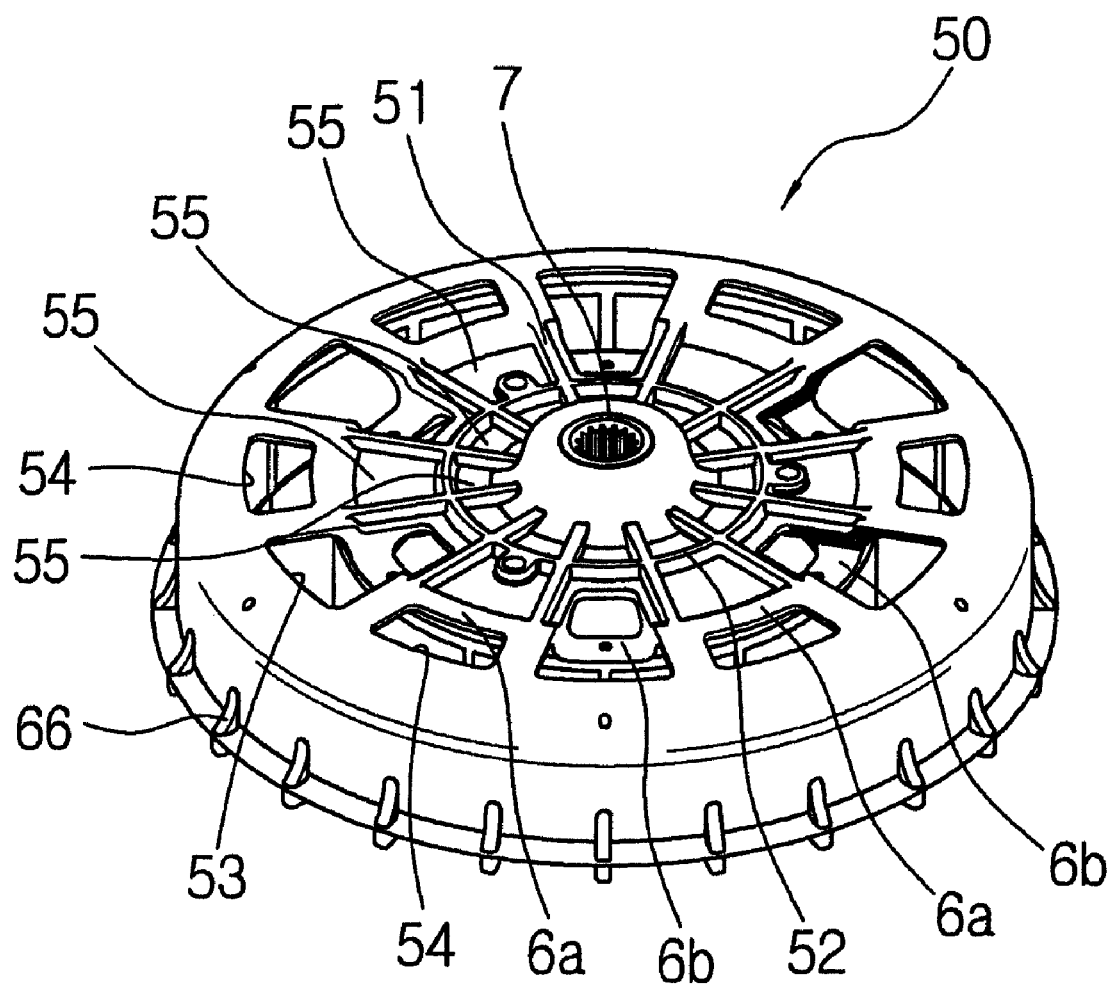
FIGS. 10A through 10E are a perspective view of the upper side, a partially cut-out front view, a plan view, a rear view, and a circumferentially sectionalized perspective view of a rotor according to the present invention, respectively.
Figure 11A:
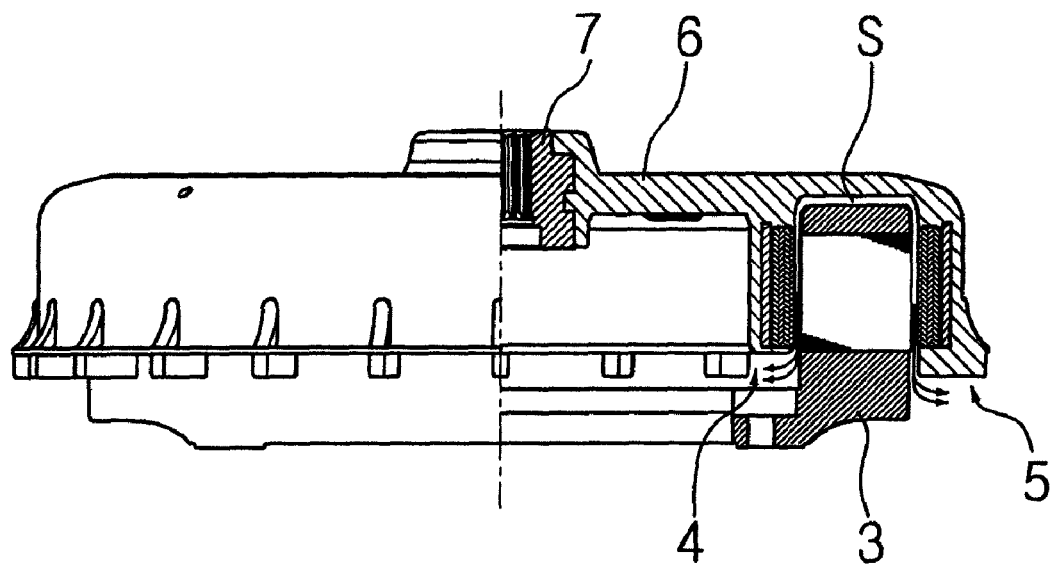
FIGS. 11A through 11D are a partially cut-out front view of a rotor for illustrating the flow of the air according to the rotation location of the rotor, respectively.
Figure 11B:
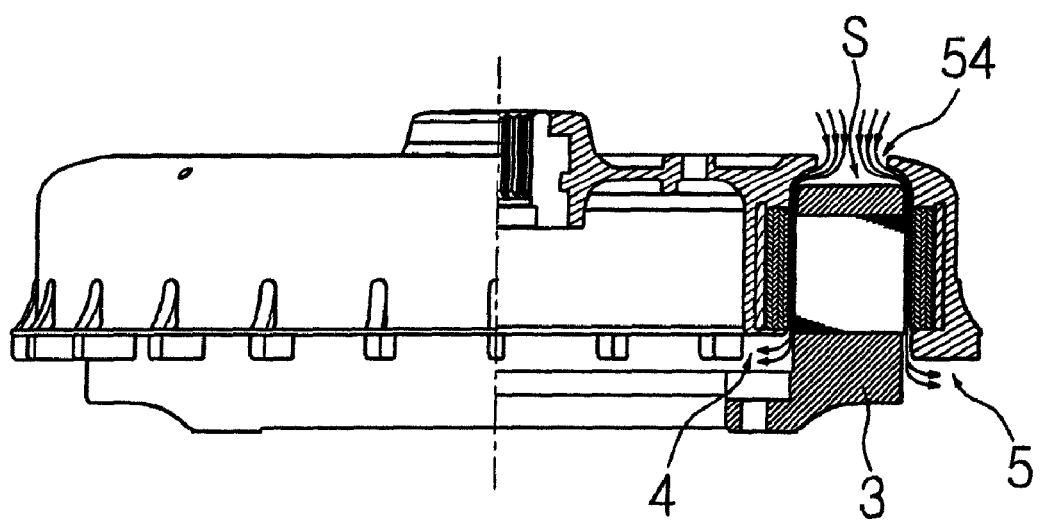
Figure 11C:
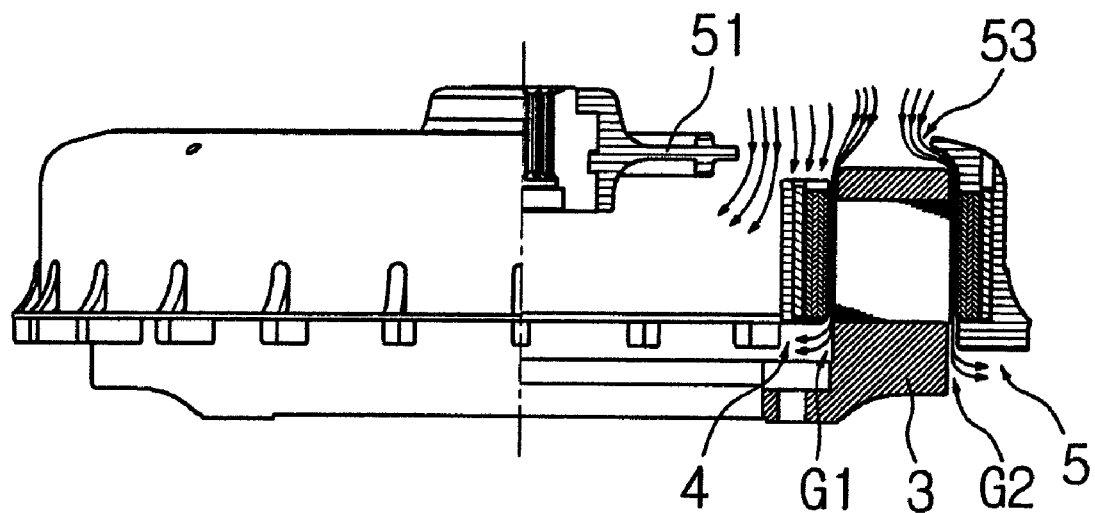
Figure 11D:
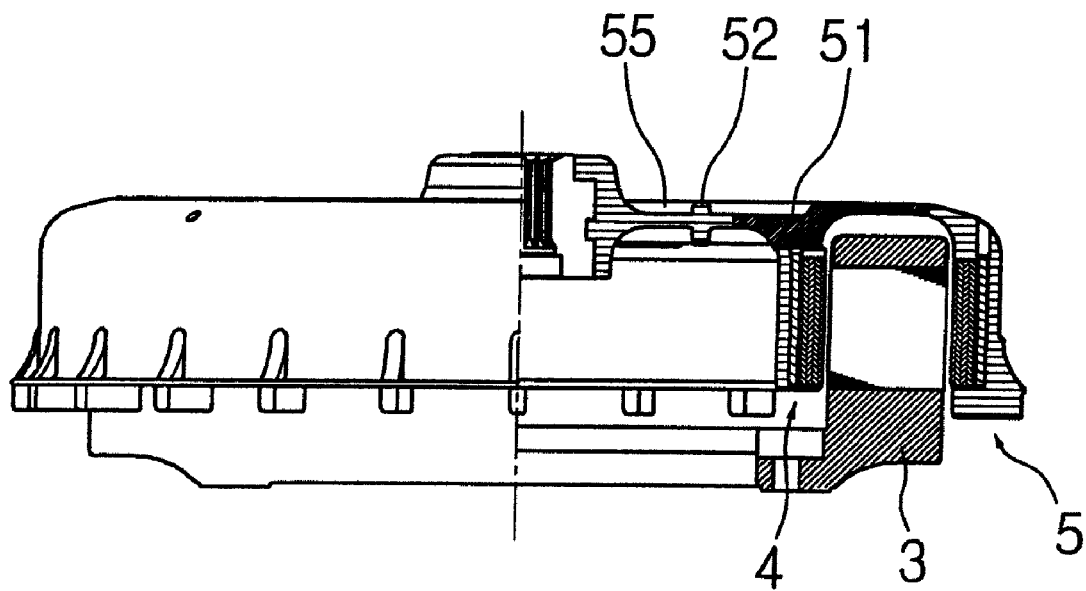

Furthermore, as shown in FIG. 10A, a number of grooves 6b are periodically formed in an annular molding support 6a supporting the inner rotor 4 among the rotor supporters 6. A plurality of large-size holes 53 including the recesses 6b play a role of a path through which the external air passes to the inner side of the inner rotor 4 and both sides of the magnetic gaps G1 and G2 as shown in FIG. 11C. Consequently, when the rotor 50 is rotated, the externally generated wind is transferred to the inner and outer magnets 4a and 5a and the stator 3 through the large-size holes 53, to thereby improve a cooling performance.

That is, the wind which enters the large-size holes 53 is discharged out through the inner side of the inner rotor 4 and the magnetic gaps G1 and G2 like the airflow of FIG. 11C. Further, the wind which enters the small-size holes 54 is discharged out through the magnetic gaps G1 and G2 like the airflow of FIG. 11B. In this case, the large-size holes 53 are preferably made to enlarge the cross-sectional area of the straight rib 51 perpendicularly to the circumferential direction during manufacturing the holes to thus improve a cooling effect. Further, the large-size holes 53 play a role of a window with which a user is capable of confirming the inner magnetic gap G1.

Consequently, the top of the stator 3, the space S opposing each other in the connectors between the inner and outer rotors 4 and 5, and the closed space like the magnetic gaps G1 and G2 of the inner and outer rotors 4 and 5 and the stator 3 are open to thereby enhance the cooling performance due to the double rotor structure.

Moreover, a plurality of sections which are formed owing to a plurality of the straight line ribs 51, the circular rib 52, and the annular molding supporter 6a generate the turbulent flow at the time of rotation of the rotors 50, to thereby improve the cooling performance, since the recesses 55 are formed on the top and bottom of the inner and outer side surfaces, and further due to the difference of the wind entering the large-size and small-size holes 53 and 54 which are alternately arranged.

In the meantime, it is necessary to employ a heat dissipation/cooling structure in especially, the rotor 50 in order to emit and cool the heat which is generated from the coil and the magnets due to the loss of the electric and magnetic force, by the driving current applied in the stator coil 33 at the time of driving the motor.

In the present invention, because the rotor 50 is manufactured with the thermosetting resin, it is easy to manufacture cooling blades (called fan blades) for heat dissipation in various forms. For example, various shapes of cooling blades 59 which can generate wind for the inner rotor 4, the outer rotor 5, or both rotors 4 and 5 are integrally fabricated, so that the cooling effect of the rotor 50 and the stator 3 can be improved.

Figure 12A:
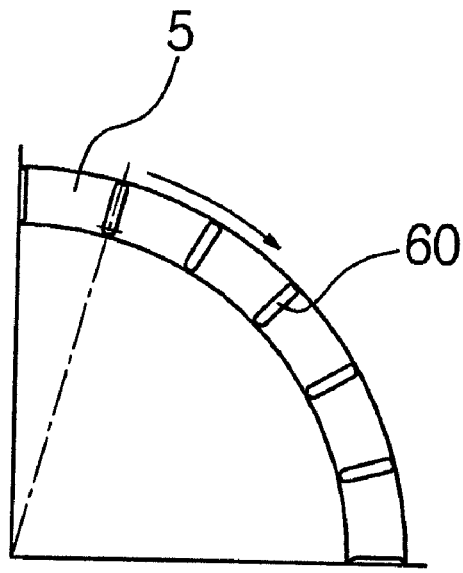
FIGS. 12A through 12E are diagrams showing a fan blade which can be applied in a rotor, respectively.
Figure 12B:
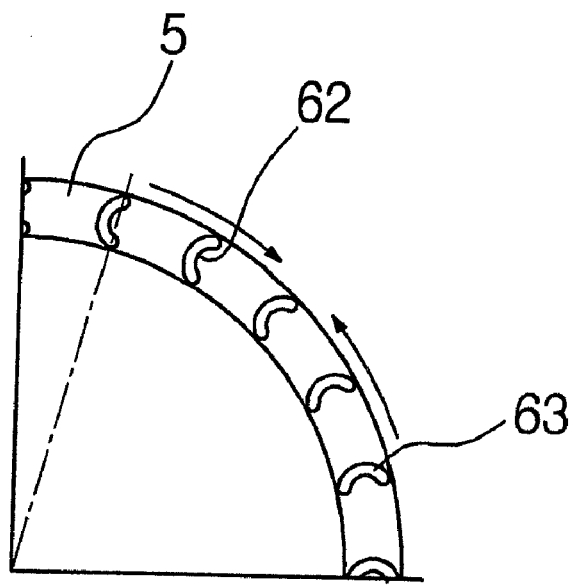

For example, since the cooling blades formed on the lower surface of the outer rotor 5 face the radial direction firstly as shown in FIG. 12A, a plurality of straight fans 60 can be used in which the angle formed by a reference line is 0°. Moreover, as shown in FIG. 12B, the cooling blades form the angle of 0° with respect to the reference line, but can adopt a structure of a plurality of Sirocco fans 62 where the circular recesses are formed along the rotational direction of the rotor to thereby generate a large amount of wind, or a structure of a plurality of turbo fan 63 where the recesses are formed into the opposite direction to the rotational direction of the rotor.

Figure 12C:
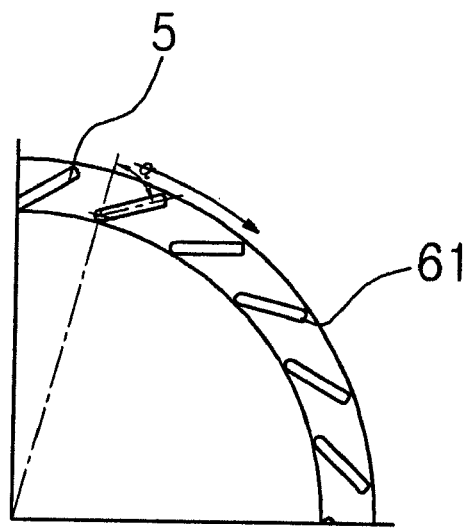
Figure 12D:
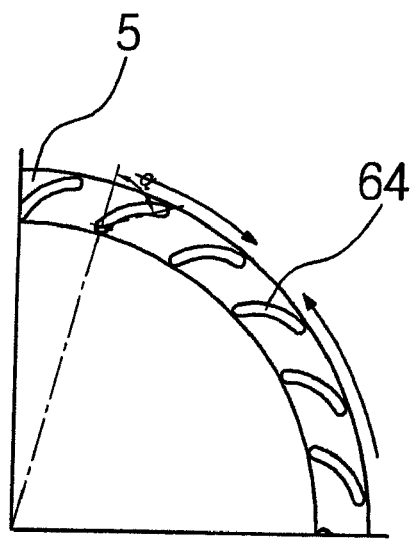
Figure 12E:
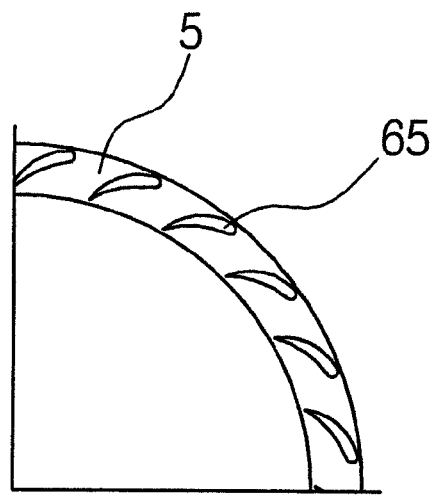

Furthermore, as shown in FIG. 12C, the cooling blades can adopt a structure of a plurality of rake-type fans 61 which are rotated by a predetermined angle α in the radial direction. That is, $-90° \leq \alpha \leq +90°$. Moreover, the cooling blades can adopt a structure of a plurality of curved fans 64 of which the shapes of the fans are curved, and which form a predetermined angle α with respect to the reference line in the radial direction as shown in FIG. 12D. However, it is possible that the cooling blades can adopt a structure of streamlined shape fans 65 shown in FIG. 12E. Moreover, the cooling blades can be formed of a plurality of triangle fans 66 having the form of a substantially right-angled triangle between the outer bottom side surface of the outer rotor 5 and the flange thereof as shown in FIG. 10A.

Consequently, a plurality of cooling blades (or fan blades) integrally formed in the lower surface of the outer rotor 5, perform air cooling voluntarily for the stator 3 at the time of rotation of the rotor 50.

As described above, the integrated double rotor 50 according to the present invention does not need a separate support plate, because a plurality of magnets 4a and 5a in the inner rotor 4 and the outer rotor 5 haven been integrated with a BMC (Bulk Molding Compound) rotor supporter 6 having a basic structure intensity.

Figure 10B:
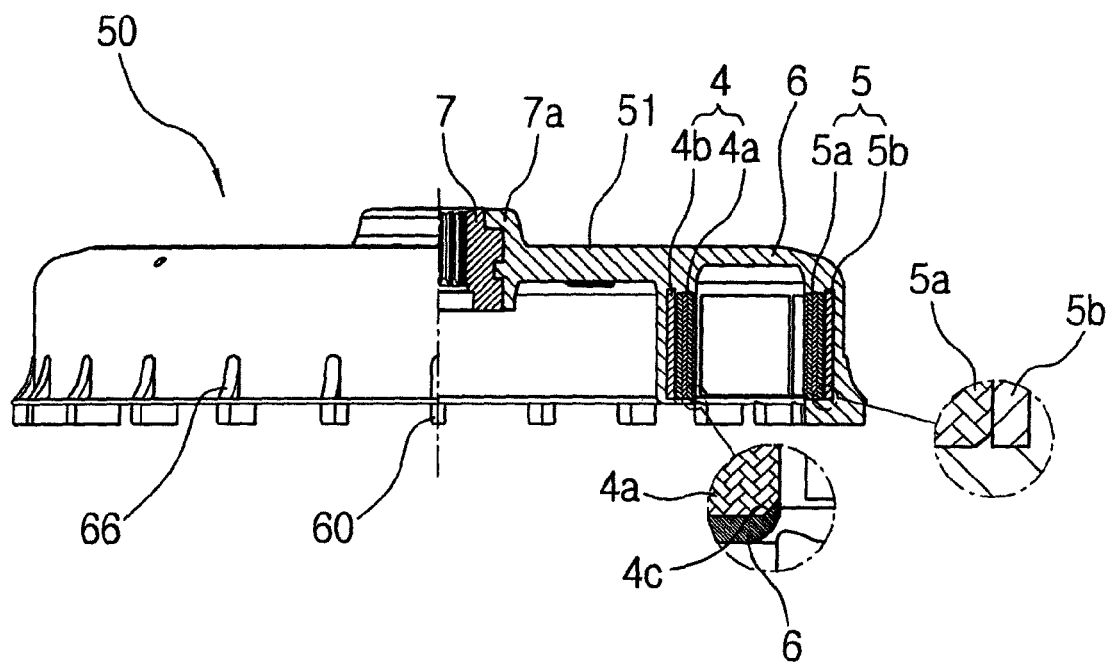
Figure 10C:
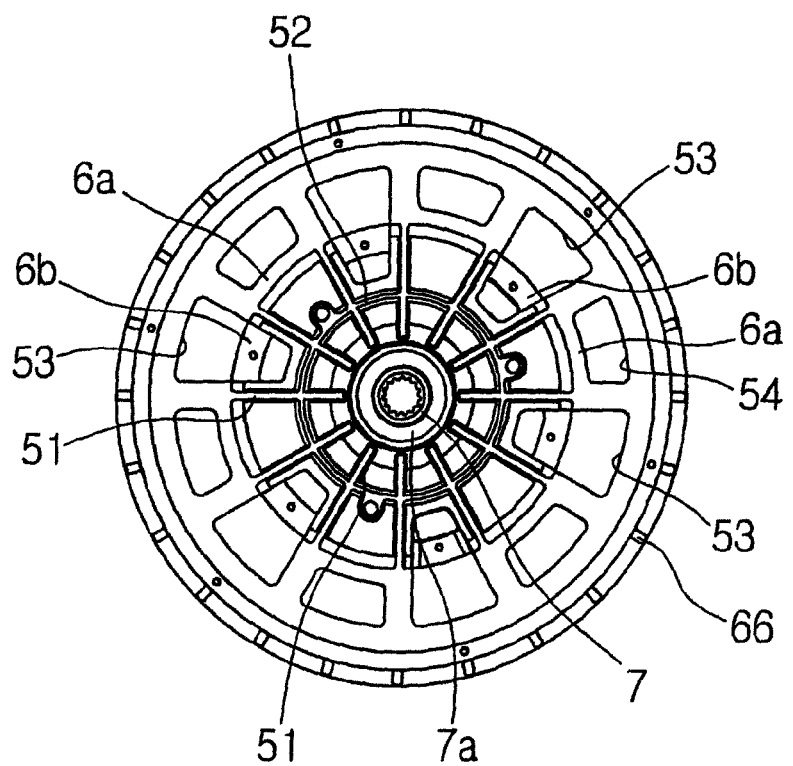
Figure 10D:
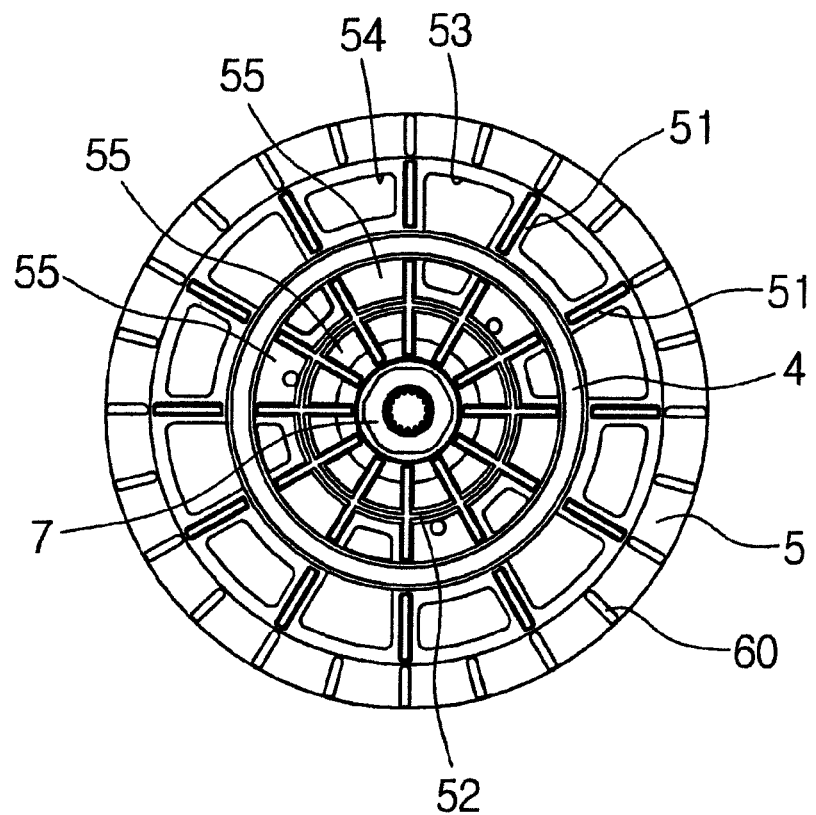
Figure 10E:
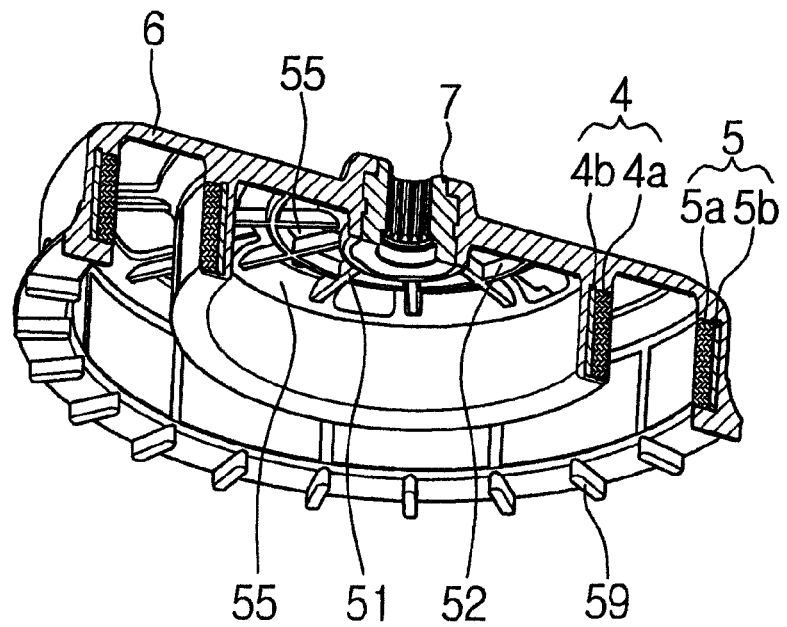

Moreover, in the present invention, a plurality of magnets 4a and 5a are fixed to the inner and outer yokes 4b and 5b, primarily by an adhesive. The BMC rotor supporter 6 additionally fixes magnets 4a and 5a as shown in FIG. 10B. In that way, the scattering and positional movement of the magnets 4a and 5a by the centrifugal force can be fundamentally prevented. In this case, such an effect of preventing the scattering and positional movement of the magnets can be further enhanced by giving the chamfer 4c to the opening surface of the magnets 4a and 5a.

Consequently, in the motor of the conventional inner rotor type structure, the additional components are required for the anti-scattering of the magnets, but the anti-scattering of the magnets can be solved by the BMC rotor supporter 6 in the present invention. Moreover, in the present invention, the magnets 4a and 5a and the inner and outer yokes 4b and 5b are surrounded by the BMC rotor supporter 6. Therefore, the damage of the magnets 4a and 5a which can occur at the assembly time of the stator 3 and rotor 50 can be prevented.

Moreover, since a plurality of magnets 4a and 5a of the inner rotor 4 and the outer rotor 5 are concentrically arranged by the insert molding, a deviation from roundness becomes high. Accordingly, when the rotors are assembled with the stator 3, it is possible to maintain the uniform magnetic gap.

In the case of the above-described BLDC motor 1 of the radial core type, the rotor 50 of the double rotor structure is rotated as the driving current is applied to the coil 33 of the stator 3. In this case, in the present invention, magnets 4a and 5a in the inner rotor 4 and the outer rotor 5 and the division core 30 in the division type core assembly 300 form one complete magnetic circuit which follows the arrow flow of FIG. 1B. Therefore, it is possible to make the perfect division of the stator core.

That is, as shown in FIG. 1B, in the present invention having the division type core structure, a magnetic circuit is formed according to the arrow flow following the direction of the magnet 4a of the inner rotor 4, the inner yoke 4b, the magnet 4a, the division core 30, the magnet 5a of the outer rotor 5, the outer yoke 5b, and the division core 30.

As described above, in order to form the magnetic circuit and have the perfect division core structure, it is necessary to make the progressing of the magnetic flux face the magnetic gaps G1 and G2. For this purpose, the interval between the adjacent division cores 30 is set wider than the magnetic gaps G1 and G2 between the rotors 4 and 5 and the stator 3.

Therefore, in the present invention, it is possible to make the stator core into a plurality of division cores 30. When the double rotor 50 is employed, the motor output and torque can be moreover increased compared with the motor of the single rotor.

Moreover, since the size of the division core 30 is small, the wastage rate of the silicon steel lamination becomes small and thus the material loss does not nearly exist and the shape thereof is simplified, to thereby make the manufacture easy. It is moreover possible that the winding around the division core 30 can be performed using a general purpose winding machine and thus the investment cost for a coil winding cost and a winding facility is reduced.

Furthermore, in the above-described embodiment, since the rotor and the stator are integrated using the resin, a durability, a moisture proof property, etc., are excellent and it is suitable for a drum driving source for a washing machine used in a high humidity environment but is not thus limited thereto. Moreover, it is possible to modify a mounting structure of the stator, according to an apparatus where a motor is applied.

II. Second Embodiment

Hereinbelow, the BLDC motor of the radial core type having a structure of double rotors according to a second embodiment of the present invention will be described.

Figure 14:
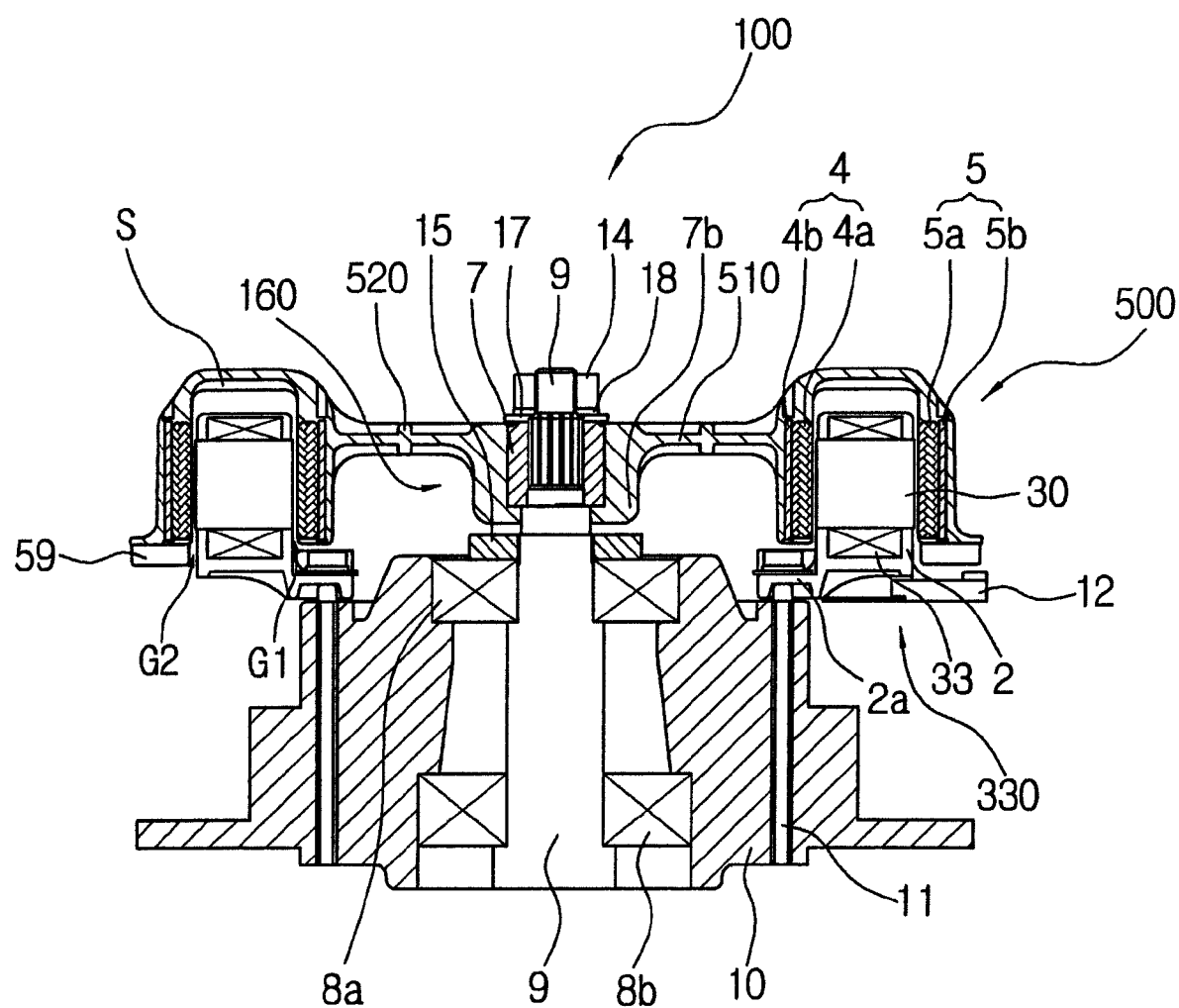
FIG. 14 is an axial sectional view of a BLDC motor of a radial core type having a structure of double rotors according to a second embodiment of the present invention.
Figure 15A:
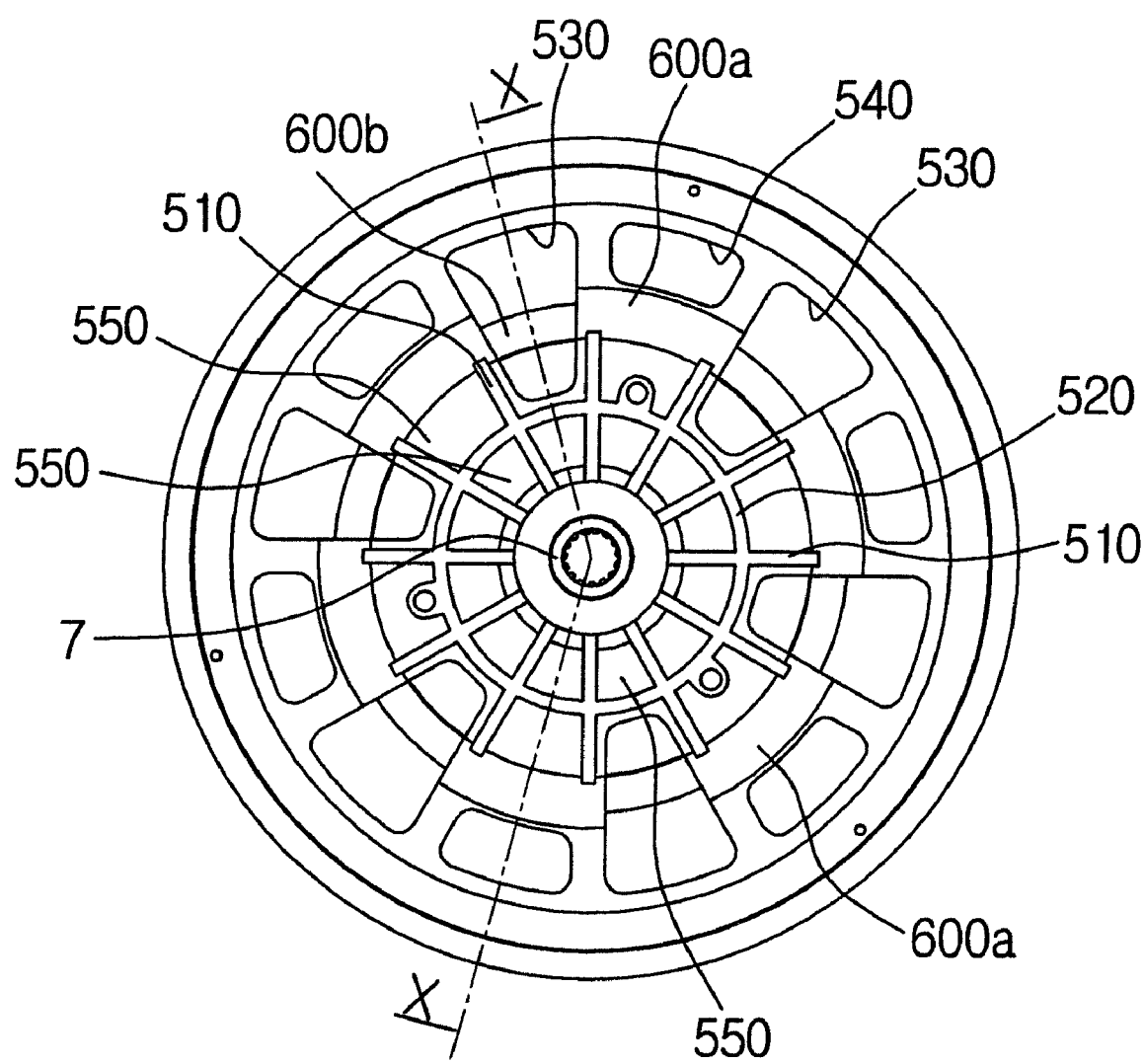
FIG. 15A is a plan view of double rotors shown in FIG. 14.
Figure 15B:
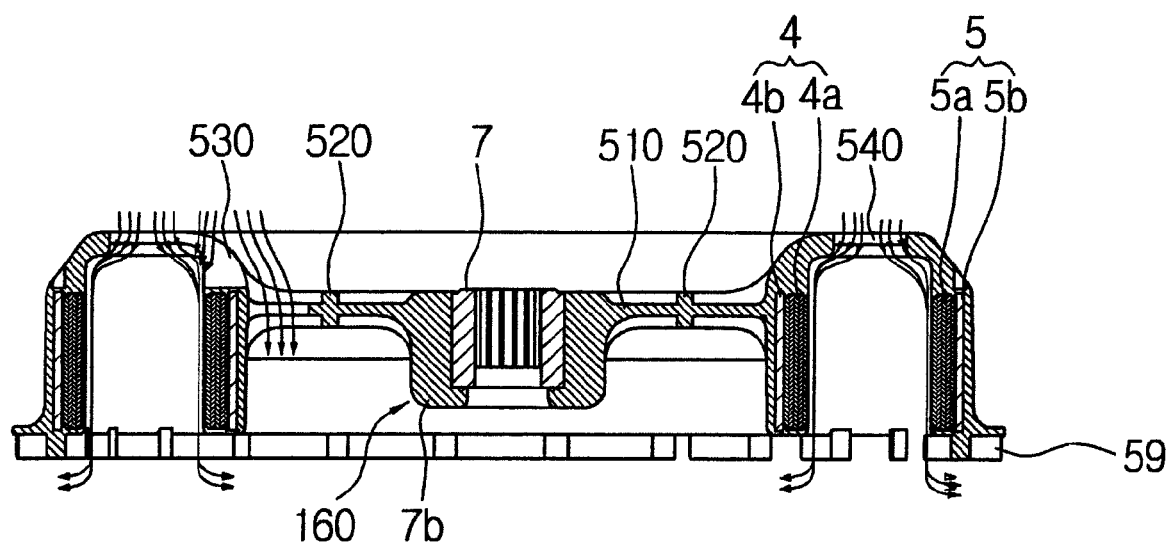
FIGS. 15B and 15C are a cross-sectional view and a rear view of the double rotors of FIG. 15A which is cut along a line X-X, respectively.
Figure 15C:
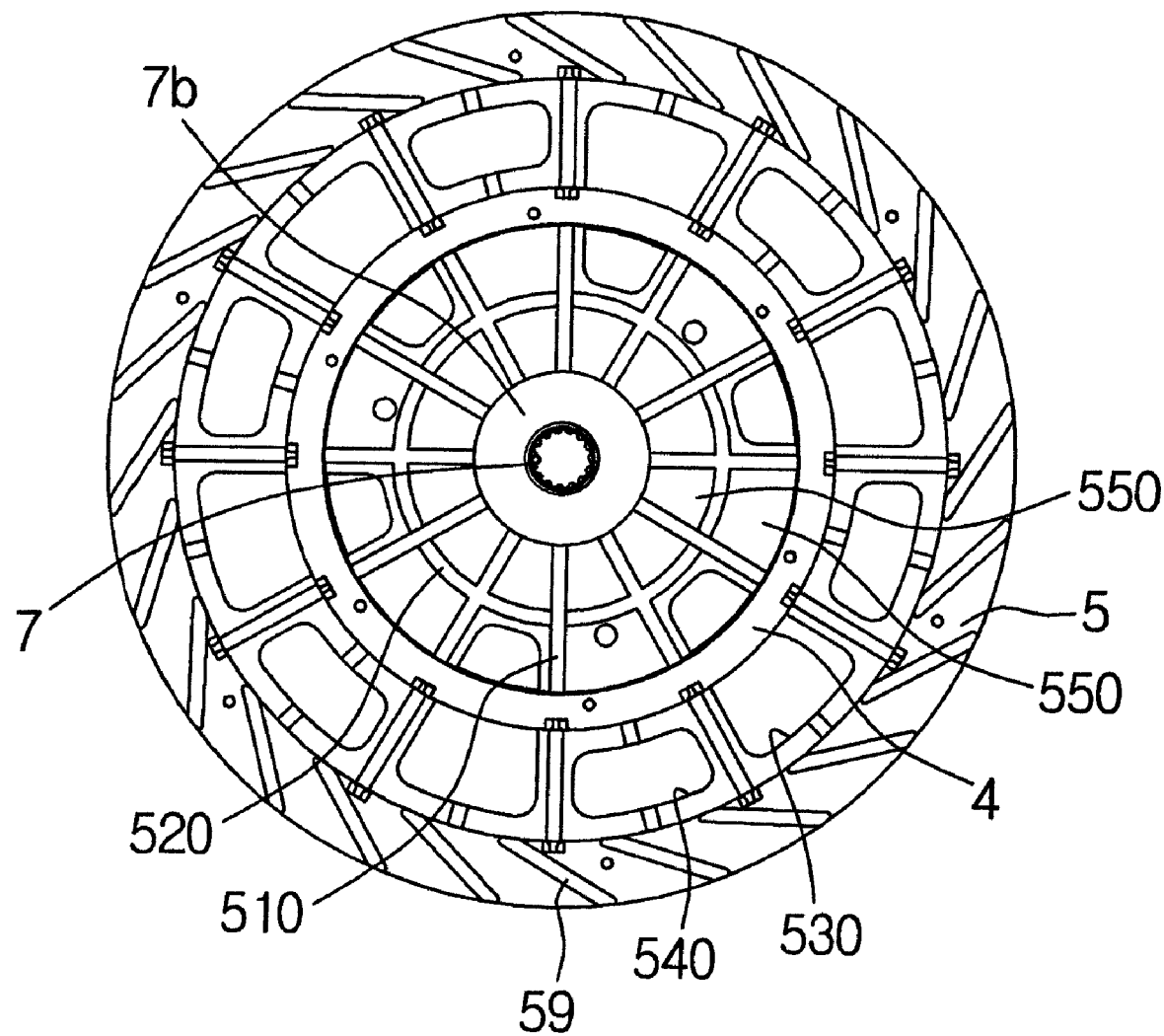
Figure 16A:
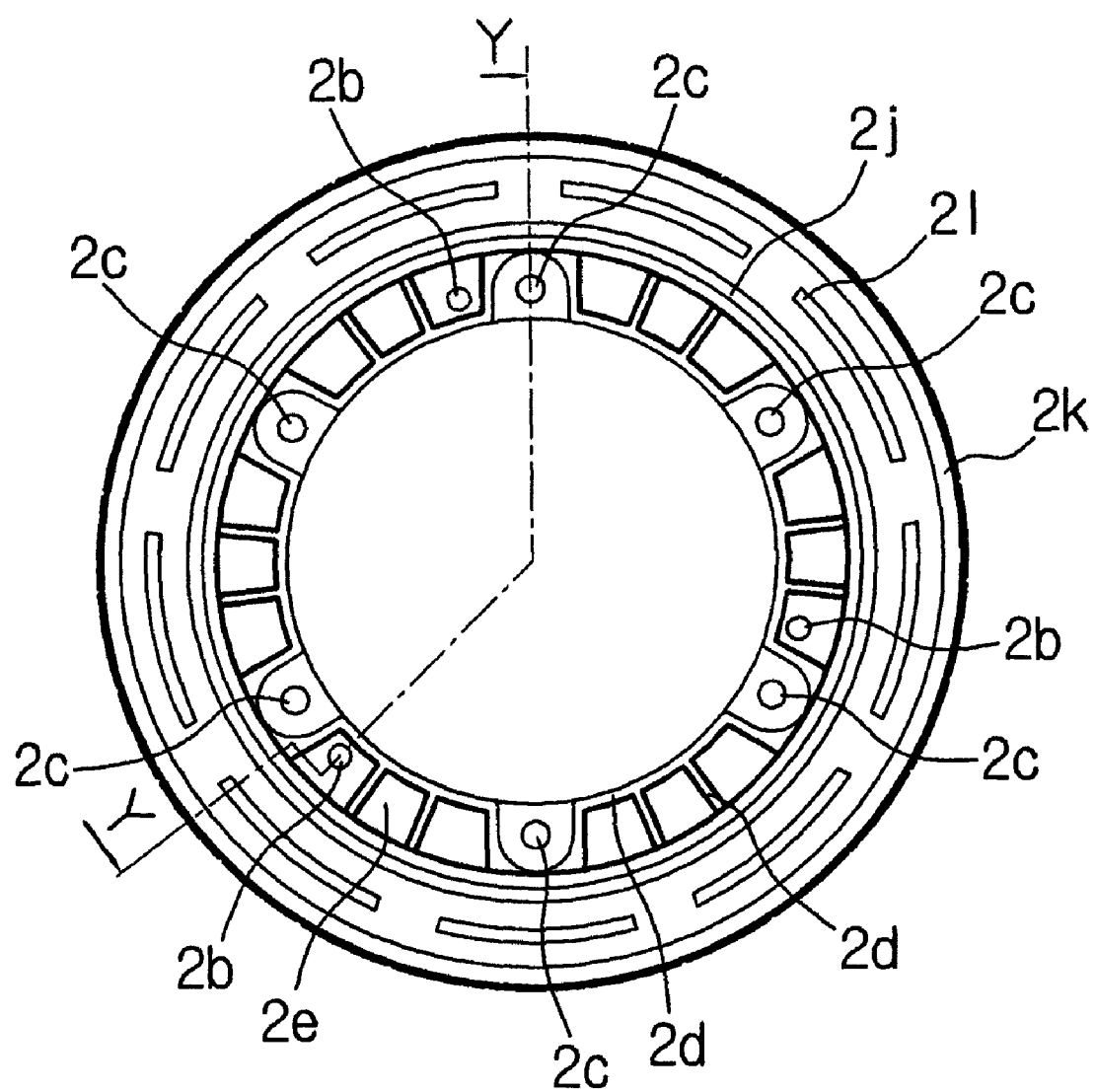
FIG. 16A is a plan view of a stator shown in FIG. 14.
Figure 16B:
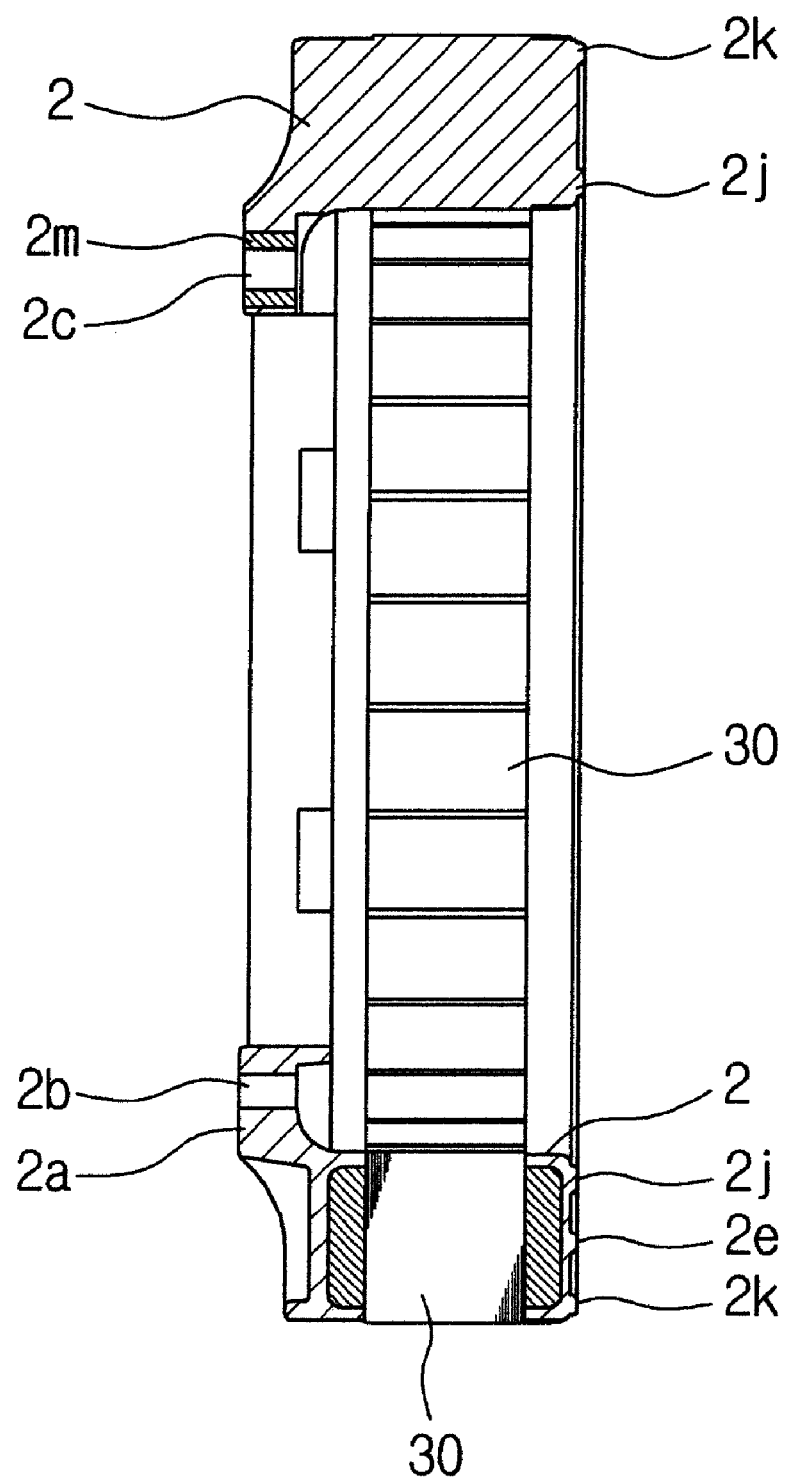
FIGS. 16B and 16C are a cross-sectional view and a rear view of the stator of FIG. 16A which is cut along a line Y-Y.
Figure 16C:
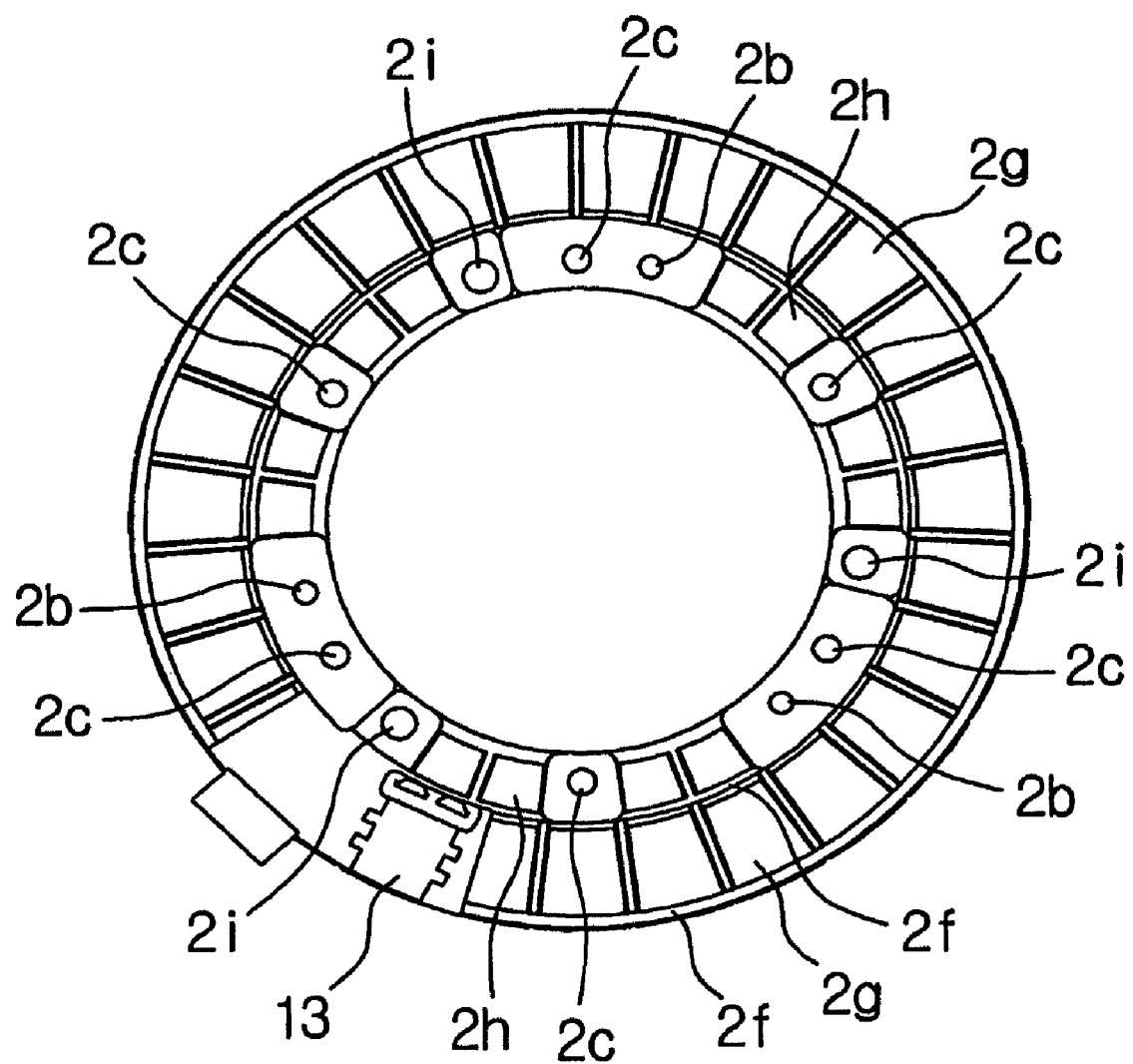

FIG. 14 is an axial sectional view of a BLDC motor of a radial core type having a structure of double rotors according to a second embodiment of the present invention. FIG. 15A is a plan view of double rotors shown in FIG. 14. FIGS. 15B and 15C are a cross-sectional view and a rear view of the double rotors of FIG. 15A which is cut along a line X-X, respectively. FIG. 16A is a plan view of a stator shown in FIG. 14. FIGS. 16B and 16C are a cross-sectional view and a rear view of the stator of FIG. 16A which is cut along a line Y-Y.

Referring to FIG. 14, the BLDC motor 100 of the radial core type double rotor structure according to the second embodiment of the present invention includes a stator 330 in which a plurality of division cores 30 are integrally formed by an annular stator supporter 2 which is manufactured by an insert molding method using a thermosetting resin after coils have been wound around the outer circumference of bobbins (not shown), an inner rotor 4 which has predetermined magnetic gaps G1 and G2 on the inner and outer circumferential portions of the stator 330 in which a plurality of magnets 4a and ring-shaped inner yokes 4b are disposed in an annular form, an outer rotor 5 in which a plurality of magnets 5a and ring-shaped outer yokes 5b are disposed, and a rotational shaft 9 whose one end is connected to the central portion of a rotor supporter 6 through an involute serration bushing 7 and whose other end is rotatably supported through bearings 8a and 8b, which is same as that of the first embodiment.

In the stator 330, a plurality of the division cores 30 which have been completely division type are integrally molded by an annular stator supporter 2 in an annular form. The stator supporter 2 includes an extension 2a extended toward the inner side thereof. The stator supporter 2 is supported by an anchoring bolt 11 at predetermined positions set by positioning holes or pins in for example, the housing 10 of a washing machine.

In addition, the inner rotor 4 and the outer rotor 5 in a double rotor 500 according to the second embodiment of the present invention are connected with the rotational shaft 9 through the involute serration bushing 7 on the central portion of the rotor supporter 6. The magnets 4a and 5a facing each other in the inner rotor 4 and the outer rotor 5 are disposed to have opposite polarities to each other.

Moreover, the rotational shaft 9 is rotatably supported by a pair of bearings 8a and 8b which are spaced at a predetermined distance in the housing. In order to prevent the rotor 500 from being separated, a plate washer 17, a spring washer 18, and a fixing nut 14 are sequentially engaged with the rotor 500. Moreover, a plate washer screw nut 15 is connected with the rotational shaft 9 in the outer side of the first bearing 8a, in order to prevent the first bearing 8a from being separated from the housing.

Therefore, the BLDC motor 100 of the second embodiment is also comprised of the double rotor 500 in which the inner rotor 4 and the outer rotor 5 are supported by the rotor supporter 6, and the single stator 330. The configuration of the magnetic circuit and principles in operation of the motor are identical with those of the first embodiment.

The second embodiment will be illustrated below with respect to the differences from the first embodiment.

The BLDC motor 100 of the second embodiment differs from that of the first embodiment. That is, the axial connector 160 of the rotor 500 combined with the rotational shaft 9 as shown in FIG. 14 is disposed the center of gravity of the rotor 500, in the rotor supporting structure, which can suppress the noise occurrence and vibration to the minimum by maintaining the rotational equilibrium at the time of rotation of the rotor 500.

That is, the axial connector 16 of the rotor 50 combined with the rotational shaft 9 in the first embodiment deviates a little bit from the center of gravity of the rotor 50 along the axial direction. The axial connector 16 is comprised of a bushing 7 combined with the rotational shaft 9, and a bushing supporter 7a made of a resin surrounding the bushing 7. The bushing supporter 7a is connected with the top of the rotor supporter 6 which integrally supports the inner and outer rotors 4 and 5 through a plurality of straight ribs 51.

Therefore, the bushing 7 delivering the rotational force of the rotor 50 to the rotational shaft 9 is located at the spot which deviates a little bit from the centroid of the rotor 50 along the axial direction in the first embodiment. Consequently, a deviation exists between the centers of magnets 4a and 5a and yokes 4b and 5b substantially determining the centroid of the rotor, and the center of the bushing 7. Thus, occurrence of the noise and vibration cannot be suppressed, and the power transmission efficiency is reduced.

In the meantime, in the second embodiment, the bushing 7 is combined with the rotational shaft 9, and the bushing 7 is supported by the bushing supporter 7b made of the thermosetting resin by the insert molding. The bushing supporter 7b is connected to the in-between of the rotor supporter 6 supporting the inner rotor 4 through a plurality of straight ribs 510 extended radially from the top of the bushing supporter. Consequently, the bushing 7 and the bushing supporter 7a are positioned in the centroid of the rotor 500.

Therefore, in the BLDC motor 100 of the second embodiment, and the axial connector 160 of the rotor 500 combined with the rotational shaft 9 is arranged in the centroid of the rotor 500 thereby maintaining the rotational equilibrium at the time of rotation of the rotor 500, and thus suppress occurrence of noise and vibration to the minimum, and enable an efficient power transmission. Moreover, the axial length of the motor can be shortened to the minimum in the case the axial connector 160 of the rotor 500 is arranged in the centroid of the rotor 500.

Moreover, as shown in FIGS. 15A to 15C, similarly to the double rotor 50 of the first embodiment, the inner rotor 4 and the outer rotor 5 in the double rotor 500 of the second embodiment are integrated by the rotor supporter 6 in the form of an inverse "U" shape. The rotor supporter 6 and the involute serration bushing 7 are mutually connected through twelve straight ribs 510 radially extending from the central portion of the double rotor. Also, the involute serration bushing 7 and the inner rotor 4a are mutually connected through a plurality of straight ribs 510. In order to enhance the support intensity, the circular rib 520 is arranged in connection with a plurality of the straight ribs 510.

Moreover, a plurality of large-size holes 530 and a plurality of small-size holes 540 for cooling the stator 330 located in the inside of the rotor 500 are alternately formed along the circumferential direction at portions facing the rotor supporter 6 and the upper portion of the stator 3. In this case, the recesses 600b are periodically formed in the annular molding supporter 600a supporting the inner rotor 4 along the circumferential direction as shown in FIG. 15A.

Furthermore, in the rotor 500 of the second embodiment, in comparison with the first embodiment, the supporting structure of a plurality of straight ribs 510 connecting between the bushing 7 and the inner rotor 4 is of a depression structure which is moved to the inner side of the rotor. Accordingly, the recesses 600b are arranged at the location where the top portion of the stator 330 and part of the inner side of the stator 330 are opened to the outside. A plurality of the large-size holes 530 including the recesses 600b form a wider path through which the external air passes through the inner side of the inner rotor 4 and both sides of the magnetic gaps G1 and G2. Consequently a more excellent cooling effect is obtained in comparison with that of the first embodiment.

Consequently, the large-size holes 530 delivers the externally generated wind to the inner and outer magnets 4a and 5a and the stator 330, when the rotor 500 is rotated. In addition, the wind which enters the small-size holes 540 passes through the magnetic gaps G1 and G2, to thereby improve a cooling performance.

Consequently, due to the double rotor structure, the closed spaces such as the top of the stator 3, the space S facing the connection portion between the inner and outer rotors 4 and 5, and the magnetic gaps G1 and G2 of the inner and outer rotors 4 and 5 and the stator 3 are opened to thereby improve the cooling performance.

Moreover, the recesses 550 are formed in the upper and lower surfaces of the inner and outer sides of a plurality of sections which are formed owing to a plurality of straight ribs 510, the circular ribs 520, and the annular molding supporter 600a. Further, due to the difference of the wind entering the large-size and small-size holes 530 and 540 which are alternately disposed, a turbulent flow is generated at the time of rotation of the rotor, to thereby improve the cooling performance.

In the meantime, the rake-type cooling blades 59 are integrally included on the bottom of the outer rotor 5 in the rotor 500 of the second embodiment, in order to perform the heat dissipation/cooling.

According to an environment under which the motor is applied, the individual shapes as well as the overall shape the cooling blades 59 should be appropriately designed to optimize the flow of the air and the air volume so as not to exceed the maximum allowable temperature when the maximum load is applied to the motor. For example, in the case that the motor is applied to a full-automatic washing machine, the low speed forward and reverse rotations are repeated during performing a washing course. Only a high speed forward rotation (or a high speed reverse rotation) should be performed during performing a dehydration course. Therefore, when the motor performs a long time washing course and thus performs the high speed forward rotation to perform the dehydration course at the state where the motor reaches a temperature to some extent, the motor reaches the maximum load and maximum temperature. Accordingly, it is preferable that the cooling blades 59 also have a fan structure of enhancing the cooling effect when the high speed forward rotation of the motor is made.

In the meantime, as shown in FIGS. 16A to 16C, in the stator 330 of the second embodiment similarly to the first embodiment, a plurality of division cores 30 are manufactured by winding the coil 33 around the circumference of the bobbin (not shown) and then insert-molding the coil 33 using the thermosetting resin. Consequently the coil 33 is integrally formed with the stator supporter 2 in an annular form.

In this case, in the stator 330 of the second embodiment, instead of forming the thickness of the stator supporter 2 into the thin plate as shown in FIGS. 16B and 16C, when the stator is molded using the thermosetting resin, annular ribs 2j and 2k are formed at the inner and outer sides of the stator, and a plurality of band form ribs 2l each having a predetermined length on the middle of annular ribs 2j and 2k are formed at the inner and outer sides thereof. Therefore, the stator 330 blocks the crack from propagating, which can occur at the time of the injection molding by forming the ribs 2j-2l, reducing the weight to the minimum, increasing the surface area, making the cooling efficiency high, and reinforcing the intensity.

Furthermore, as shown in FIGS. 16A to 16C, three mount positioning holes 2b and six bolt mounting holes 2c are arranged at an equal interval along an axial extension 2a, and three mount positioning pins 2i are formed in one side of the bolt mounting holes 2c at an equal interval.

Therefore, when the motor 100 is assembled in the housing 10 of the washing machine, the mount positioning hole 2b of the axial direction extension 2a is made to be congruent with the mount positioning pin 16, and then a washer is interposed in the bolt mounting hole 2c to tighten the anchoring bolt 11, in the case that the mount positioning pin 16 is planted in the housing 10 as a reference for determining the mounting location of the stator, as shown in FIG. 1A. However, on the contrary, in the case where the mount positioning hole is formed in the housing 10, the mount positioning pin 2i of the above-described axial direction extension 2a is made to be congruent with the mount positioning hole, and then a washer is interposed in the bolt mounting hole 2c to thereby tighten the anchoring bolt 11. In this case, preferably, the bushing 2m is inserted into the bolt mounting hole 2c, to endure the strong coupling force of the anchoring bolt 11.

Taking this point of view into consideration, the stator 330 of the second embodiment includes the mount positioning hole 2b, the six bolt mounting holes 2c, and the three mount positioning pins 2i in the axial extension 2a.

Moreover, as shown in FIG. 16A, in the upper surface of the axial extension 2a are formed a plurality of recesses 2e formed owing to a plurality of ribs 2d and the recesses formed in periphery of six bolt mounting hole 2c, in the same manner as that of the first embodiment. The plurality of recesses 2e formed owing to a plurality of ribs 2d and the recesses formed in periphery of six bolt mounting hole 2c creates the turbulence at the time of rotation of the inner rotor 4, to thereby improve the cooling performance.

Furthermore, as shown in FIG. 16C, a plurality of large-size and small-size recesses 2g and 2h are formed even in the rear side of the stator 3 by a plurality of ribs 2f. Accordingly, the thickness of the stator assembly 2 is made of a thin plate, so as to reduce the weight to the minimum, increase the surface area, make the cooling efficiency high, and reinforce the intensity.

The above-described second embodiment employs a depression type supporting structure that the axial connector of the rotor combined with the rotational shaft is disposed at the centroid of the inner side of the rotor. However, it is possible to support the axial connector of the rotor in the first embodiment in the form of a depression type structure.

Moreover, the first and second embodiments illustrated in the present invention have been described with respect to the drive motor for operating the washing machine for example, but the present invention can be modified to drive the other apparatuses such as radiators for vehicles.

As described above, in the present invention, the radial core type BLDC motor employs the double rotor structure. Accordingly, when the stator core is formed into the perfectly division cores, using the positioning structure formed in the mold itself, a plurality of division type core assemblies are automatically positioned and then injection-molded using the thermosetting resin by an insert molding mode. As a result, a separate core support plate is not used to assemble a plurality of division cores to thereby enhance an assembly productivity of stators.

Moreover, in the double rotor structure of the present invention, the cooling aperture is formed so that the cross-sectional area of the cooling aperture is as broad as possible which is perpendicular in the circumferential direction with the rotor supporter and the rib which connect the inner and outer rotors and the bushing. The cooling aperture is designed to alternately vary in size in turn. Accordingly, the support intensities of the rotor supporter and the rib are reinforced, and simultaneously a large amount of wind is generated to thus create the turbulent flow. The flow of the cooled air can be induced to the upper space of the stator and the magnetic gap between the inner and outer rotors and the stator and thus the heat generated from the rotors and the stator can be effectively cooled.

Furthermore, in the structure of the stator of the present invention, the contact area to the air is increased by forming a supporter using a resin along the semicircular curved surface of the coil which is wound around the bobbin when the stator is integrally molded using a thermosetting resin, and the turbulent flow is generated at the time of rotation of the rotor to thus improve the cooling performance. A plurality of bolt mounting holes and mounting positioning holes for fixing the stator and a plurality of throughholes formed by a plurality of radial ribs are included in the bearing housing, to thereby maintain the proper support intensity, reduce the material cost, seek the light weight, and produce the turbulence together with the cooling blades of the inner rotor at the time of rotation of the rotor, and to thus improve the cooling performance.

Moreover, in the present invention, one coil is consecutively wound around a plurality of division type stator cores corresponding to each phase by a continuous winding method and mutually connected. That is, when the stator cores are positioned on the mold, inconveniences that can be caused by the absence of the separate positioning component can be minimized.

Further, the present invention provides a BLDC motor including a skew core structure stator in which a coil winding process is easy since a division type core structure is employed even though the skew core structure has been employed, and each skew core can be integrally molded in an insert molding process using a thermosetting resin so as to be easily assembled, thereby reducing a cogging torque and noise/vibration Furthermore, in the present invention, the axial connector of the rotor combined with the rotational shaft is disposed at the centroid of the inner side of the rotor, to thus suppress generating of vibration at minimum at the time of rotation of the rotor, and to thus improve the cooling efficiency of the stator and the rotors.

Moreover, the present invention integrally molds the double rotor and stator by an insert molding process using the thermosetting resin, to thereby heighten a durability, reliability, and a water-proof performance. The thermosetting resin surrounding the double rotor and the stator is a heat-resistant material which can endure up to 600° C., to thereby heighten the safety from the fire hazard.

As described above, the present invention has been described with respect to particularly preferred embodiments. However, the present invention is not limited to the above embodiments, and it is possible for one who has an ordinary skill in the art to make various modifications and variations, without departing off the spirit of the present invention.

What is claimed is:

1. An apparatus for driving a drum or a tub for holding clothes to be washed in a washing machine comprising:
   a housing in the washing machine;
   a rotational shaft is rotatably mounted in the housing of the washing machine, wherein the drum or the tub is connected to a front portion of the rotational shaft projected into the housing;
   an integrated double rotor including an inner rotor and an outer rotor in which a plurality of N-pole and S-pole magnets are disposed alternately in annular form on different concentric circumferences in each rotor, and opposing magnets with a predetermined distance between the inner and outer rotors are disposed to have opposite polarities, and a rotor supporter molded using a thermosetting resin, so that the respective inner and outer rotors are annularly integrated, a trench space is formed between the inner rotor and the outer rotor, and an end extended from the inner rotor to the central portion is connected with the outer circumferential surface of a bushing combined with the rotational shaft; and an integrated stator wherein U, V, W phase coil assemblies formed of a number of core groups including a number of independent division cores on the outer portion of which bobbins are respectively formed, wherein for each phase coil assembly, coils are sequentially wound around each division core so that short jump wires are connected between the division cores in each division core group, and long jump wires are connected between the division core groups, wherein the division core groups of the U, V, W phase coil assemblies are alternately disposed in an annular form in sequence of the phases, wherein the respective division core groups are integrally formed into a single body in annular form by a stator support, and wherein one end of the integrated stator is disposed in the trench space between the inner and outer rotors and an extension axially extended from the other end of the integrated stator is fixed to the housing of the washing machine.

2. The driving apparatus of claim 1, wherein said rotor supporter comprises:
a number of large-size holes and small-size holes alternately disposed in order to guide external air to the trench space opposing an end of the stator between the inner and outer rotors in the inner side direction of the inner rotor and in a magnetic gap direction between the inner and outer rotors and the stator, and
a number of radial ribs disposed as axial couplers surrounding the outer circumferential surface of the bushing from the inner rotor to the central portion thereof.

3. The driving apparatus of claim 2, wherein a number of grooves are periodically formed at portions where an annular molding support supporting the inner rotor among the rotor supporters, meets a number of the large-size holes along the circumferential direction.

4. The driving apparatus of claim 2, wherein said axial coupler is disposed in a center of gravity of the double rotor.

5. The driving apparatus of claim 1, wherein the rotor of the motor further comprises a number of cooling blades integrally formed with the rotor supporter at the lower portion of the inner rotor and/or outer rotor for producing wind during rotation of the rotor.

6. The driving apparatus of claim 1, further comprising: a number of cooling blades integrally formed on the outer circumferential surface of the outer rotor, for producing wind during rotation of the rotor.

7. The driving apparatus of claim 1, wherein a number of grooves formed by a number of ribs are included in the axial extension of the stator support in order to produce a turbulent flow during rotation of the rotor to thus enhance a cooling performance, and a number of positioning holes and protrusions, and a number of bolt fitting holes are periodically disposed in the grooves at equal intervals in order to determine an assembly position when the stator is mounted in the housing of the washing machine.

8. The driving apparatus of claim 1, wherein the stator support on the stator upper surface is formed to have a number of concavo-convex regions along a number of the division core assembly shapes around which coils are wound so that heat can be emitted via a large contact surface area.

9. The driving apparatus of claim 1, wherein for each phase coil assembly, the division core groups of the U, V, W phase coil assemblies are alternately disposed in an annular form in sequence of the phases.

10. The driving apparatus of claim 1, wherein said bobbins for a number of the independent division cores comprises first and second coupling protrusions coupled with a number of pairs of positioning fixing grooves formed in opposition to the inner and outer walls of annular grooves when the bobbins are temporarily assembled into the annular grooves in the mold for an insert molding.

11. The driving apparatus of claim 1, wherein said stator coil is made of Cu or Al.

12. An apparatus for driving a drum or a tub for holding clothes to be washed in a washing machine comprising:
a housing in the washing machine;
an integrated double rotor including an inner rotor and an outer rotor in which N-pole and S-pole magnets of twenty-four poles are disposed alternately in an annular form on different concentric circumferences in each rotor, and opposing magnets with a predetermined distance between the inner and outer rotors are disposed to have opposite polarities, and a rotor supporter molded using a thermosetting resin, so that the respective inner and outer rotors are annularly integrated, and a trench space is formed between the inner rotor and the outer rotor, so that the rotor supporter is extended from the inner rotor to an axial coupler surrounding a bushing;
a rotational shaft whose one end is coupled with the bushing and other end is rotatably mounted in the housing of the washing machine, wherein the drum or the tub is connected to a front portion of the rotational shaft projected into the housing; and
an integrated stator wherein U, V, W phase coil assemblies formed of a number of core groups including a number of independent division cores on the outer portion of which bobbins are respectively formed, wherein for each phase coil assembly, the division core groups of the U, V, W phase coil assemblies are alternately disposed in an annular form in sequence of the phases, wherein the respective division core groups are integrally formed into a single body in annular form by a stator support, wherein one end of the integrated stator is disposed in the trench space between the inner and outer rotors, and wherein a number of division cores respectively included in the U, V, W phase coil assemblies are mutually connected by the sequentially wound coils.

13. The driving apparatus of claim 12, wherein said stator is made by an insert molding method using a thermosetting resin at a temporary assembled state, in which a number of core groups including a number of division cores adjacent to each other are disposed in a mold having a number of pairs of positioning fixing grooves alternately correspondingly formed in sequence of the phases.

14. The driving apparatus of claim 12, wherein said rotor supporter comprises:
a number of large-size holes and small-size holes alternately disposed in order to guide external air to the trench space opposing an end of the stator between the inner and outer rotors in the inner side direction the inner rotor and in a magnetic gap direction between the inner and outer rotors and the stator, and a number of radial ribs disposed as axial couplers.

15. An apparatus for driving a drum or a tub for holding clothes to be washed in a washing machine comprising:
a housing in the washing machine;
an integrated double rotor including an inner rotor and an outer rotor in which a plurality of N-pole and S-pole magnets are disposed alternately in annular form on different concentric circumferences in each rotor, and opposing magnets with a predetermined distance between the inner and outer rotors are disposed to have opposite polarities, and a rotor supporter molded using a thermosetting resin, so that the respective inner and outer rotors are annularly integrated, and a trench space is formed between the inner rotor and the outer rotor, so that the rotor supporter is extended from the inner rotor to an axial coupler surrounding a bushing;

a rotational shaft having one end coupled with the bushing and two points of the other end rotatably mounted in the housing of the washing machine, wherein the drum or the tub is connected to a front portion of the rotational shaft projected into the housing; and an integrated stator wherein for each phase, coils are sequentially wound around each division core in a sequential winding method, wherein the respective division cores are integrally formed into a single body in an annular form by a stator support, wherein one end of the integrated stator is disposed in the trench space between the inner and outer rotors and an extension axially extended from the other end of the integrated stator is fixed to the housing of the washing machine, and wherein said axial coupler is disposed in the center of gravity of the double rotor, wherein said rotor supporter comprises: a number of large-size holes and small-size holes are alternately disposed in order to guide external air to a recess space opposing an end of a stator between the inner and outer rotors in the inner side direction the inner rotor and in a magnetic gap direction between the inner and outer rotors and the stator, and a number of radial ribs disposed as axial couplers surrounding the outer circumferential surface of the bushing from the inner rotor to the central portion thereof.

16. The driving apparatus of claim 15, wherein the rotor of the motor further comprises a number of cooling blades integrally formed with the rotor supporter at the lower portion of the outer rotor for producing wind during rotation of the rotor.

17. The driving apparatus of claim 15, wherein a number of the division cores are skewed.

18. The driving apparatus of claim 15, wherein the interval between the adjacent division cores is set wider than the magnetic gap between the inner and outer rotors and the stator.

* * * * *